US009078281B2

(12) United States Patent
Matsuda et al.

(10) Patent No.: US 9,078,281 B2
(45) Date of Patent: Jul. 7, 2015

(54) WIRELESS STATION AND WIRELESS LAN SYSTEM

(75) Inventors: Makoto Matsuda, Ama-gun (JP);
Kiyotaka Ohara, Nagoya (JP); Norio Tagawa, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 12/659,123

(22) Filed: Feb. 25, 2010

(65) Prior Publication Data

US 2010/0202426 A1    Aug. 12, 2010

Related U.S. Application Data

(62) Division of application No. 10/969,066, filed on Oct. 21, 2004.

(30) Foreign Application Priority Data

Oct. 22, 2003  (JP) ................................ 2003-362230
Oct. 22, 2003  (JP) ................................ 2003-362231
Oct. 22, 2003  (JP) ................................ 2003-362232

(51) Int. Cl.
*H04W 4/00*      (2009.01)
*H04W 88/06*     (2009.01)
(Continued)

(52) U.S. Cl.
CPC ............. *H04W 88/06* (2013.01); *G06F 3/1203* (2013.01); *G06F 3/1204* (2013.01); *G06F 3/1226* (2013.01); *G06F 3/1236* (2013.01); *G06F 3/1285* (2013.01); *G06F 3/1292* (2013.01); *H04L 63/0442* (2013.01);
(Continued)

(58) Field of Classification Search
CPC ...... H04W 84/12; H04W 48/16; H04W 48/20; H04W 74/02; H04W 84/00; H04W 84/18; H04W 48/14; H04W 60/00; H04W 72/08; H04W 72/10; H04W 74/08; H04W 74/0808; H04W 88/02; H04B 17/0077; H04M 1/6066
USPC .................................. 455/418; 370/329, 338
See application file for complete search history.

(56) References Cited

U.S. PATENT DOCUMENTS 6,035,208 A  *  3/2000  Osawa ........................... 455/522
6,542,747 B1 *  4/2003  Syukri ........................... 455/450
(Continued)

FOREIGN PATENT DOCUMENTS

CN         1399490 A      2/2003
EP       1 309 127 A1     5/2003
(Continued)

OTHER PUBLICATIONS

ANSI/IEEE Std 802.11, 1999 Edition, Published 1999, pp. 1-528.*
(Continued)

*Primary Examiner* — Matthew Sams
(74) *Attorney, Agent, or Firm* — Oliff PLC

(57) ABSTRACT

A wireless LAN system in which data communication between a wireless station whose connection method as a method for wireless connection can be set to one of a plurality of connection methods and a wireless access point whose connection method has been preset to one of the connection methods is made possible by setting the connection method of the wireless station to a method identical with the connection method of the wireless access point.

21 Claims, 54 Drawing Sheets

(51) Int. Cl.
*G06F 3/12* (2006.01)
*H04L 29/06* (2006.01)
*H04W 28/18* (2009.01)
*H04W 12/02* (2009.01)
*H04W 12/06* (2009.01)
*H04W 76/02* (2009.01)
*H04W 84/12* (2009.01)
*H04W 84/18* (2009.01)

(52) U.S. Cl.
CPC .......... *H04L 63/0823* (2013.01); *H04W 12/02* (2013.01); *H04W 12/06* (2013.01); *H04W 28/18* (2013.01); *H04W 76/02* (2013.01); *H04W 84/12* (2013.01); *H04W 84/18* (2013.01)

(56) References Cited

U.S. PATENT DOCUMENTS

| | | | |
|---|---|---|---|
| 6,782,260 | B2 | 8/2004 | Nakakita et al. |
| 6,825,774 | B1* | 11/2004 | Groger ................. 340/12.22 |
| 6,865,371 | B2* | 3/2005 | Salonidis et al. ............ 455/41.1 |
| 7,006,837 | B2 | 2/2006 | Shiota et al. |
| 7,120,129 | B2 | 10/2006 | Ayyagari et al. |
| 7,174,157 | B2 | 2/2007 | Gassho et al. |
| 7,212,513 | B2 | 5/2007 | Gassho et al. |
| 7,231,215 | B2 | 6/2007 | Lewis et al. |
| 7,245,877 | B2* | 7/2007 | Liu et al. .................. 455/62 |
| 7,283,505 | B1 | 10/2007 | Meenan et al. |
| 7,342,906 | B1* | 3/2008 | Calhoun .................. 370/338 |
| 7,453,844 | B1* | 11/2008 | Lee et al. .................. 370/329 |
| 7,453,848 | B2* | 11/2008 | Jang .................. 370/329 |
| 7,468,960 | B2 | 12/2008 | Awater et al. |
| 2002/0007407 | A1* | 1/2002 | Klein .................. 709/225 |
| 2002/0061748 | A1 | 5/2002 | Nakakita et al. |
| 2002/0118664 | A1 | 8/2002 | Ishibashi et al. |
| 2002/0176366 | A1 | 11/2002 | Ayyagari et al. |
| 2002/0181418 | A1 | 12/2002 | Awater et al. |
| 2002/0196764 | A1 | 12/2002 | Shimizu |
| 2003/0023761 | A1 | 1/2003 | Jeansonne et al. |
| 2003/0091015 | A1 | 5/2003 | Gassho et al. |
| 2003/0092395 | A1 | 5/2003 | Gassho et al. |
| 2003/0096576 | A1* | 5/2003 | Salonidis et al. ............... 455/41 |
| 2003/0115339 | A1 | 6/2003 | Hodoshima |
| 2003/0119484 | A1* | 6/2003 | Adachi et al. .................. 455/411 |
| 2003/0131082 | A1 | 7/2003 | Kachi |
| 2003/0174690 | A1* | 9/2003 | Benveniste ................... 370/350 |
| 2003/0179734 | A1 | 9/2003 | Tsutsumi et al. |
| 2004/0017794 | A1* | 1/2004 | Trachewsky .................. 370/338 |
| 2004/0063455 | A1* | 4/2004 | Eran et al. .................. 455/525 |
| 2004/0063458 | A1* | 4/2004 | Hori et al. .................. 455/554.2 |
| 2004/0102192 | A1* | 5/2004 | Serceki .................. 455/434 |
| 2004/0236851 | A1* | 11/2004 | Kuan et al. .................. 709/224 |
| 2004/0259552 | A1 | 12/2004 | Ihori et al. |
| 2005/0020207 | A1* | 1/2005 | Hamada et al. .............. 455/41.2 |
| 2005/0054342 | A1* | 3/2005 | Otsuka .................. 455/426.2 |
| 2005/0096027 | A1 | 5/2005 | Takahashi et al. |
| 2005/0130647 | A1 | 6/2005 | Matsuda et al. |
| 2005/0272420 | A1 | 12/2005 | Matsuda et al. |
| 2006/0094414 | A1 | 5/2006 | Miyake et al. |
| 2006/0111103 | A1* | 5/2006 | Jeong et al. .................. 455/434 |
| 2006/0116170 | A1 | 6/2006 | Brahmbhatt et al. |

FOREIGN PATENT DOCUMENTS

| | | |
|---|---|---|
| JP | A 2000-022702 | 1/2000 |
| JP | A 2000-261461 | 9/2000 |
| JP | A-2000-261461 | 9/2000 |
| JP | A 2000-341262 | 12/2000 |
| JP | A 2002-159053 | 5/2002 |
| JP | A 2002-252620 | 9/2002 |
| JP | A 2003-005641 | 1/2003 |
| JP | A-2003-005641 | 1/2003 |
| JP | A 2003-046518 | 2/2003 |
| JP | A 2003-101546 | 4/2003 |
| JP | A 2003-101553 | 4/2003 |
| JP | A-2003-110567 | 4/2003 |
| JP | A 2003-143156 | 5/2003 |
| JP | A 2003-143262 | 5/2003 |
| JP | A 2003-152735 | 5/2003 |
| JP | A 2003-188886 | 7/2003 |
| JP | A 2003-204335 | 7/2003 |
| JP | A 2003-204338 | 7/2003 |
| JP | A 2003-218885 | 7/2003 |
| JP | A 2003-233449 | 8/2003 |
| JP | A 2003-274454 | 9/2003 |
| JP | A-2004-320162 | 11/2004 |
| JP | A-2005-086350 | 3/2005 |
| JP | A-2005-130124 | 5/2005 |
| WO | WO 03/071690 | 8/2003 |

OTHER PUBLICATIONS

Japanese Office Action with English-language Translation mailed Mar. 16, 2010 for Japanese Patent Application No. 2007-061907.
Japanese Office Action with English-language Translation mailed Mar. 16, 2010 for Japanese Patent Application No. 2007-061908.
Japanese Office Action with English-language Translation mailed Mar. 16, 2010 for Japanese Patent Application No. 2007-061909.
Office Action mailed Jun. 17, 2010 in U.S. Appl. No. 10/969,066.
Japanese Patent Office communication, dispatched Nov. 10, 2009 in Japanese Patent Application No. 2003-362232, (with English translation).
"Musen LAN-no Koko-ga Abunai! (These Are the Dangerous Points in Wireless LAN!)"—Part 1, Nikkei Internet Solutions, Published by Nikkei BP (Nikkei Business Publications, Inc.) vol. 64, issued on Oct. 22, 2002, p. 76-81.
"2002-nen-no Chumoku-gijutsu Musen LAN-no Subete (Remarkable Technologies in 2002—All About Wireless LAN)" Written by Manabu Takada and Kentarou Takahashi, Nikkei Network published by Nikkei BP (Nikkei Business Publications.
"IEEE Std 802.11, Part 1 1: Wireless LAN Medium Access Control (MAC) and Physical Layer (PHY) Specifications," ISO/IEC 8802-11 ANSI/IEEE Std 802.11, Jan. 1, 1999, pp. 1, 72-78 and 123.
Partial European Search Report completed Dec. 21, 2010 in European Application No. EP 04 25 6507.
Office Action issued in Chinese Application No. 200910211572.3 dated Apr. 17, 2012 (with translation).
Office Action issued in Japanese Application No. 2010-113363 dated Aug. 20, 2013 (with English translation).
Office Action issued in Japanese Application No. 2012-222753 dated Aug. 20, 2013 (with English translation).
Apr. 15, 2014 Office Action issued in Japanese Patent Application No. 2013-218431 with an English translation.
Oct. 20, 2014 Office Action issued in Chinese Application No. 201210344964.9 (with translation).
Jul. 4, 2014 Office Action issued in European Application No. 04 256 507.7.

* cited by examiner

FIG. 5

| DEVICE NAME | DEVICE ID | SSID | CONNECTION METHOD | RECEPTION LEVEL |
|---|---|---|---|---|
| DEVICE a | 1234xx | XXXXX | n – TH CHANNEL OF m – TH STANDARD | 10 |
| DEVICE b | 2345xx | YYYYY | n – TH CHANNEL OF m – TH STANDARD | 8 |
| DEVICE c | 3456xx | ZZZZZ | n – TH CHANNEL OF m – TH STANDARD | 5 |

FIG.28

| DEVICE ID | SSID | CONNECTION METHOD | RECEPTION LEVEL |
|---|---|---|---|
| 1234xx | XXXXX | n – TH CHANNEL OF m – TH STANDARD | 10 |
| 2345xx | YYYYY | n – TH CHANNEL OF m – TH STANDARD | 8 |
| 3456xx | ZZZZZ | n – TH CHANNEL OF m – TH STANDARD | 5 |

*REQUEST mn: n – TH CHANNEL IN m – TH WIRELESS LAN STANDARD

WIRELESS STATION AND WIRELESS LAN SYSTEM

INCORPORATION BY REFERENCE

This is a Division of application Ser. No. 10/969,066 filed Oct. 21, 2004, which in turn claims priority of Japanese Applications No. 2003-362230 filed Oct. 22, 2003, 2003-362231, filed Oct. 22, 2003 and 2003-262232, filed Oct. 22, 2003. The disclosure of the prior applications is hereby incorporated by reference herein in its entirety.

BACKGROUND OF THE INVENTION

The present invention relates to a wireless LAN system in which data communication between a wireless access point and a wireless station is made possible by setting the connection method of the wireless station to a method identical with the connection method of the wireless access point, a communication terminal usable in the wireless LAN system, and a communication program.

Nowadays, the so-called wireless LANs, realizing data communication among a plurality of wireless stations or data communication between a wireless station and an external network by use of radio waves, have become widespread.

In the wireless LANs, various communication methods, such as "infrastructure mode" in which each wireless station carries out radio communication via a repeater station and "ad hoc mode" in which wireless stations directly communicate with each other by radio, are employed. Each wireless station, configured to be capable of switching its communication method depending on the purpose, is generally used in the "infrastructure mode".

In a network employing the "infrastructure mode", the wireless station becomes capable of accessing a wireless access point by adjusting various settings (connection method, etc.) of its own. The "connection method" system a method of wireless connection which is specified by, for example, a wireless LAN standard (IEEE802.11b, -a, -g, etc.) employed for the wireless connection, a frequency range (the so-called "channel") employed in the wireless LAN standard, etc.

The above various settings of each wireless station would be completed easily if the wireless station had a user interface of high operability like that of a personal computer (hereinafter abbreviated as "PC").

However, with wireless stations equipped with a user interface of lower operability compared to that of a PC (e.g. printers providing services via a network), adjusting the settings through the user interface becomes an extremely complex and troublesome task.

To avoid the problem, there exist some wireless stations configured to support "remote setup". For example, the communication method of the wireless station (first wireless station) is changed to the "ad hoc mode" together with another wireless station (second wireless station) and the settings of the first wireless station are made indirectly from the second wireless station (remote setup) by exchanging data regarding the settings between the wireless stations. Or the wireless station is directly connected to a PC and the settings of the wireless station are made indirectly from the PC by the exchange of data regarding the settings between the wireless station and the PC.

However, even the remote setup described above is still a troublesome task to the user since the user is required to move the wireless stations (after switching the communication method to the "ad hoc mode") to positions allowing wireless communication or to move the PC to a position allowing the direct connection to the wireless station by a cable.

Especially when a wireless station which has been used in the "infrastructure mode" is employed for the remote setup, the user has to return the communication method of the wireless station from the "ad hoc mode" to the "infrastructure mode" after the remote setup is finished, which makes the task more troublesome.

As described above, in cases of wireless stations equipped with a user interface of lower operability compared to that of a PC (e.g. printers providing services via a network), the adjustment of the settings through the user interface takes time and trouble.

Recently, some techniques for reducing the time and trouble required for the task of setting have been proposed. In a technique, a network device such as a printer functioning as a wireless station is provided with a function as a wireless access point (relay station), and an independent wireless network is established by the function (relay function unit). From another wireless station connected to the wireless station via the wireless network, settings of the wireless station necessary for establishing connection with another wireless network by its wireless station function (terminal function unit) are adjusted indirectly, and then the function of the wireless station as a wireless access point is stopped. An example of such a technique is disclosed in Japanese Patent Provisional Publication No. 2003-143156.

By such a technique, the time and trouble necessary for the adjustment of various settings can be reduced for wireless stations that are not equipped with a user interface of high operability.

However, even though the technique mentioned above can reduce the time and trouble necessary for the task (moving the wireless stations after switching the communication method to the "ad hoc mode" to positions allowing wireless communication or moving the PC to a position allowing direct connection to the wireless station by a cable) accompanying the setting, setting operation itself (operations for adjusting the settings) has to be done by the user.

Building up a network by wireless LAN requires not only general settings regarding LAN (wired LAN) but also settings ("connection method") specific to wireless LAN. Since the wireless LAN settings require a wide range of expertise, even users with technical knowledge of wired LAN can not necessarily adjust the wireless LAN settings with ease. Thus, the adjustment of wireless LAN settings is extremely difficult for users unfamiliar with LAN itself.

As described above, the task of wireless LAN settings is presently a heavy load on the user and it is regarded as a factor blocking the prevalence of wireless LAN. Therefore, techniques capable of reducing the load of the task of wireless LAN settings on the user have been hoped for.

SUMMARY OF THE INVENTION

The present invention is advantageous in that the load of the task of wireless LAN settings on users as described above can be reduced.

According to an aspect of the invention, there is provided a wireless LAN system in which data communication between a wireless station whose connection method as a method for wireless connection can be set to one of a plurality of connection methods and a wireless access point whose connection method has been preset to one of the connection methods is made possible by setting the connection method of the wireless station to a method identical with the connection method of the wireless access point.

Specifically, the wireless station includes method switching system, announcement transmission system and method setting system. The method switching system switches the connection method of the wireless station for the wireless connection to the wireless access point to each of the connection methods in turn at preset time intervals. The announcement transmission system transmits announcement data, for announcing the switched connection method to devices around the wireless station, according to the switched connection method, on each switching of the connection method by the method switching system. The method setting system stops the connection method switching by the method switching system when notification data, for notifying the wireless station that wireless connection by use of the same connection method as the transmitted announcement data is possible, is received during a period between the transmission of the announcement data by the announcement transmission system and the connection method switching by the method switching system to the next connection method and thereby sets the connection method at the point of the stop of the connection method switching as the connection method for the wireless connection to the wireless access point. Meanwhile, the wireless access point includes notification transmission system which transmits the notification data to the wireless station when the announcement data transmitted according to the preset connection method is received from the wireless station.

While the timing for the method switching system of the wireless station to start the switching of the connection method is not particularly limited, the method switching system may be configured to start the switching when an instruction from outside is received and/or when the wireless station is started up. Alternatively or optionally, the setting of the connection method to the wireless station can be initiated simply by starting up the wireless station.

The notification transmission system may be configured to transmit a request reminder data, for reminding the wireless station to request permission of the wireless access point for wireless connection, to the wireless station as the notification data when the announcement data transmitted according to the preset connection method is received and thereafter transmit an association reply, giving the wireless station permission for the wireless connection, to the wireless station when an association request as data for requesting the permission for the wireless connection is received from the wireless station.

While the notification transmission system can transmit the notification data when the announcement data is received regardless of the content of the announcement data, the notification transmission system may also be configured to transmit the notification data to wireless stations transmitting the announcement data satisfying a prescribed condition according to the preset connection method.

While the content of the "prescribed condition" in this configuration is not particularly limited, since the wireless station switches the connection method repeatedly until it receives the notification data, "announcement data transmitted twice or more" (via the repetition of the connection method switching) may be employed as the condition, for example.

For this, the wireless access point may include announcement collection system which collects the announcement data transmitted according to the preset connection method for a prescribed period of time, and after the collection of the announcement data by the announcement collection system is finished, the notification transmission system may transmit the notification data to a wireless station transmitting announcement data according to the same connection method as announcement data included in the collected announcement data.

As the aforementioned "prescribed condition", "(announcement data of) the highest reception level" may also be employed.

For this, the wireless access point may include announcement collection system which collects the announcement data transmitted according to the preset connection method for a prescribed period of time, and the notification transmission system may transmit the notification data to a wireless station transmitting announcement data according to the same connection method as announcement data having the highest reception level among the announcement data collected by the announcement collection system.

The notification transmission system of the wireless access point may also be configured to transmit the notification data to a wireless station transmitting announcement data that is selected from the announcement data, transmitted according to the preset connection method, based on an instruction from outside.

The wireless access point may include announcement collection system which collects the announcement data transmitted according to the preset connection method for a prescribed period of time, and after the collection of the announcement data by the announcement collection system is finished, the notification transmission system may transmit the notification data to a wireless station transmitting announcement data according to the same connection method as announcement data that is selected from the collected announcement data based on an instruction from outside.

The announcement data collected by the announcement collection system may be stored in memory, etc. so that the connection method, for example, can be identified. In this case, the notification transmission system may be configured to transmit the notification data to a wireless station transmitting announcement data that is selected from the collected announcement data based on the instruction from outside.

The "instruction from outside" in this configuration, for example, a particular operation by the user to an operation unit of the wireless access point. For this, a configuration described below is possible.

That is, the wireless access point includes first user selection system which lets a user select one or more wireless stations from the wireless stations transmitting the announcement data collected by the announcement collection system, after the collection of the announcement data by the announcement collection system is finished, and the notification transmission system transmits the notification data to the one or more wireless stations selected by the user through the first user selection system.

For using a particular operation by the user as the "instruction from outside", a configuration as follows is possible.

That is, the announcement transmission system of the wireless station transmits the announcement data associating identification data for identifying the wireless station with the announcement data. The announcement collection system of the wireless access point collects the announcement data together with the identification data associated with the announcement data. The wireless access point includes second user selection system which lets a user select one or more pieces of the identification data from the identification data associated with the announcement data collected by the announcement collection system, after the collection of the announcement data by the announcement collection system is finished. The notification transmission system transmits the notification data to one or more wireless stations identified by the identification data selected by the user through the second user selection system.

The "instruction from outside" may also mean data transmitted from a communication terminal which is connected to the wireless access point to communicate data. For this, a configuration described below is possible.

That is, the notification transmission system of the wireless access point is configured to determine the wireless station to which the notification data should be transmitted according to an instruction from a communication terminal which is connected to the wireless access point to communicate data.

In this composition, the communication of the instruction with the communication terminal can be realized by, for example, a configuration as follows.

That is, in a wireless LAN system, the wireless access point includes announcement collection system and listing transmission system. The announcement collection system collects the announcement data transmitted according to the preset connection method for a prescribed period of time and thereby stores data indicating correspondence between the collected announcement data and wireless stations which transmitted the collected announcement data in a storage unit. The listing transmission system transmits listing data, representing a list of wireless stations whose correspondence has been stored in the storage unit by the announcement collection system, to the communication terminal when request data requesting the list of the wireless stations is received from the communication terminal. After the listing data is transmitted to the communication terminal by the listing transmission system and selection data, representing one or more wireless stations selected at the communication terminal from the list represented by the listing data, is received from the communication terminal, the notification transmission system transmits the notification data to a wireless station when announcement data, transmitted according to the same connection method as announcement data corresponding to one of the wireless stations represented by the selection data, is received from the wireless station. Meanwhile, the communication terminal includes request transmission system, third user selection system and selection transmission system. The request transmission system transmits the request data to the wireless access point. The third user selection system lets a user select one or more wireless stations from the list represented by the listing data when the listing data is received from the wireless access point after the request data is transmitted to the wireless access point by the request transmission system. The selection transmission system transmits the selection data, representing the one or more wireless stations selected by the user through the third user selection system, to the wireless access point.

Optionally, the announcement transmission system of the wireless station transmits the announcement data associating identification data for identifying the wireless station with the announcement data. The wireless access point includes announcement collection system and listing transmission system. The announcement collection system collects the announcement data transmitted according to the preset connection method together with the identification data associated with the announcement data for a prescribed period of time and thereby stores data indicating correspondence between the identification data and wireless stations which transmitted the collected announcement data in a storage unit. The listing transmission system transmits listing data, representing a list of identification data whose correspondence has been stored in the storage unit by the announcement collection system, to the communication terminal when request data requesting the list of the identification data is received from the communication terminal. After the listing data is transmitted to the communication terminal by the listing transmission system and selection data, representing one or more pieces of the identification data selected at the communication terminal from the list represented by the listing data, is received from the communication terminal, the notification transmission system transmits the notification data to a wireless station when announcement data, transmitted according to the same connection method as announcement data corresponding to a piece of the identification data represented by the selection data, is received from the wireless station. Meanwhile, the communication terminal includes request transmission system, fourth user selection system and selection transmission system. The request transmission system transmits the request data to the wireless access point. The fourth user selection system lets a user select one or more pieces of the identification data from the list represented by the listing data when the listing data is received from the wireless access point after the request data is transmitted to the wireless access point by the request transmission system. The selection transmission system transmits the selection data, representing the one or more pieces of identification data selected by the user through the fourth user selection system, to the wireless access point.

Incidentally, the announcement collection system in this composition collects the announcement data received from wireless stations for a prescribed period of time, as mentioned above.

The announcement data collected by the announcement collection system may be stored in memory, etc. so that the correspondence between the identification data and the connection method corresponding to the announcement data (or the announcement data itself), for example, can be identified. In this case, the listing transmission system may be configured to transmit the listing data, representing a list of identification data which can be identified by the stored correspondences, to the communication terminal.

Each user selection system mentioned above may be a system for letting the user make a selection. For example, the user is informed through a display unit, printing unit, speaker, etc. that a selection should be made from options (wireless stations, identification data) by use of an operation unit, and the user makes a selection from the options with the operation unit based on the information.

Among the wireless access points described above, those including the announcement collection system may be configured as follows.

That is, the announcement transmission system of the wireless station transmits the announcement data associating identification data for identifying the wireless station with the announcement data. The announcement collection system of the wireless access point collects the announcement data together with the identification data associated with the announcement data. The notification transmission system transmits the notification data only to wireless stations transmitting announcement data associated with the same identification data as announcement data already collected by the announcement collection system.

The announcement collection system may be configured such that, after the collection of the announcement data by the announcement collection system is finished, the notification transmission system transmits the notification data to a wireless station when announcement data, transmitted according to the same connection method as announcement data included in the collected announcement data, is received from the wireless station.

Therefore, for letting the wireless LAN system carry out data communication normally without the need of operations by the user, the wireless access point may include encryption switching system which switches an encryption method employed for the data communication with each wireless station. In cases where the wireless access point has been set to a state for executing the data communication by encrypting data with a first encryption key after the transmission of the notification data by the notification transmission system, the encryption switching system switches the encryption method to a method executing the data communication without encryption only for data communication with each wireless station to which the notification data has been transmitted.

As another configuration for letting the wireless. LAN system carry out data communication normally without the need of operations by the user, a configuration described below is also possible.

That is, the notification transmission system of the wireless access point is configured to transmit the notification data attaching a second encryption key, which is different from a first encryption key being employed for encrypting the data communication by the wireless access point, to the notification data. The wireless access point includes encryption switching system which, after the transmission of the notification data by the method notification system, switches an encryption method employed for data communication with each wireless station to which the notification data has been transmitted, to a method executing the data communication by encrypting data with the second encryption key. The wireless station includes encryption setting system which, after the reception of the notification data from the wireless access point, sets the wireless station to execute the data communication with the wireless access point by encrypting data with the second encryption key attached to the notification data.

In order to increase the security level of the data communication between the wireless access point and the wireless station, a configuration described below can be employed, for example. That is, the wireless station includes: encryption key acquisition system which acquires the first encryption key from the communication terminal via the wireless access point by the public key cryptosystem; and encryption alteration system which alters settings of the wireless station so that data communication with the wireless access point will be executed employing the encryption with the first encryption key, by releasing the wireless connection with the wireless access point and reestablishing the wireless connection employing the encryption with the first encryption key when the first encryption key is acquired from the communication terminal by the encryption key acquisition system. The communication terminal includes encryption key transfer system which transfers the first encryption key to the wireless station via the wireless access point by the public key cryptosystem. The encryption switching system of the wireless access point does not execute the switching of the encryption method after the wireless connection with the wireless station is released.

Optionally, the encryption key transfer system of the communication terminal is configured to transfer an authentication message/signal to the wireless station by the public key cryptosystem prior to the transfer of the first encryption key. The communication terminal includes confirmation operation system which lets a user who confirmed the authentication message/signal outputted by the wireless station carry out a confirmation operation after the authentication message/signal is transferred to the wireless station by the encryption key transfer system. The encryption key transfer system is configured to transfer the first encryption key when the confirmation operation is carried out through the confirmation operation system. The encryption key acquisition system of the wireless station is configured to acquire the authentication message/signal which is transferred from the communication terminal by the public key cryptosystem prior to the first encryption key. The wireless station includes message/signal output system which outputs the authentication message/signal acquired by the encryption key acquisition system. The encryption key acquisition system acquires the first encryption key which is transferred from the communication terminal after the confirmation operation to the communication terminal is carried out by the user confirming the authentication message/signal outputted by the message output system. It should be noted that the message may have a form of signal.

In a particular case, the wireless access point may include mode switching system capable of switching the operation mode of the wireless access point to either one selected from a support mode supporting the setting of the connection method of each wireless station by executing the transmission of the notification data by the notification transmission system and a normal mode not supporting the setting of the connection method without executing the transmission of the notification data by the notification transmission system.

While the trigger for the switching of the operation mode by the mode switching system in this configuration is not particularly limited, the mode switching system may switch the operation mode in response to an instruction from outside.

Optionally, the mode switching system may switch the operation mode to the normal mode when a prescribed period of time has passed since the switching of the operation mode to the support mode.

Further optionally, the mode switching system may also be configured to switch the operation mode to the normal mode when the notification data has been transmitted by the reply notification transmission system for a prescribed number of times since the switching of the operation mode to the support mode.

Further optionally, the wireless station may include content judgment system and non-setting system. The content judgment system judges whether or not content of current settings regarding the connection method for the wireless connection to the wireless access point requires new setting of the connection method for the wireless connection to the wireless access point via the switching by the method switching system, the transmission of the announcement data by the announcement transmission system and the setting by the method setting system. The non-setting system prevents the switching by the method switching system, the transmission of the announcement data by the announcement transmission system and the setting by the method setting system when the content judgment system judges that the content of the current settings does not require the new setting.

Still optionally, the wireless station includes content judgment system which judges whether or not content of current settings regarding the connection method for the wireless connection to the wireless access point requires new setting of the connection method for the wireless connection to the wireless access point via the switching by the method switching system, the transmission of the announcement data by the announcement transmission system and the setting by the method setting system. The announcement transmission system is configured to transmit the announcement data in a state specifying the result of the judgment by the content judgment system on the necessity of the new setting of the connection method. The notification transmission system of the wireless access point transmits the notification data only when the announcement data received from the wireless station is data capable of specifying that the new setting of the connection method is necessary.

According to another aspect of the invention, there is provided a wireless LAN system in which data communication between a wireless station whose connection method as a method for wireless connection can be set to one of a plurality of connection methods and a wireless access point whose connection method has been preset to one of the connection methods is made possible by setting the connection method of the wireless station to a method identical with the connection method of the wireless access point.

Specifically, the wireless access point includes reply request system and method notification system. The reply request system transmits reply request data, for requesting a reply, to the wireless station according to each of the connection methods. The method notification system transmits notification data, for notifying the wireless station of the connection method preset to the wireless access point, to the wireless station according to the same connection method as reply data when the reply data as the reply to the reply request data is received after the transmission of the reply request data by the reply request system. Meanwhile, the wireless station includes reply transmission system and method setting system. The reply transmission system transmits the reply data to the wireless access point when the request data transmitted from the wireless access point according to a connection method preset to the wireless station is received. The method setting system sets the connection method of the wireless station for the wireless connection to the wireless access point to the connection method notified by the notification data when the notification data transmitted according to the connection method preset to the wireless station is received after the transmission of the reply data by the reply transmission system.

The method notification system may be configured to transmit a request reminder data, for reminding the wireless station to request permission for wireless connection, to the wireless station as the notification data, and thereafter transmit an association reply, giving the wireless station permission for the wireless connection, to the wireless station when an association request as data for requesting the permission for the wireless connection is received from the wireless station.

In the wireless access point described above, the reply request system is a system for transmitting the reply request data according to each of the connection methods, and its composition for the transmission of the reply request data is not limited.

For example, in cases where the wireless access point includes method switching system which switches the connection method of the wireless access point to each of the connection methods in turn at preset time intervals and thereafter returns the connection method to the connection method preset to the wireless access point, the reply request data may be transmitted according to each connection method switched and set by the method switching system on each switching of the connection method by the method switching system. In this case, the method notification system may transmit the notification data according to the connection method set at the point of the reception of the reply data when the reply data is received between the transmission of the reply request data by the reply request system and the switching of the connection method to the next connection method by the method switching system.

In this composition, while the timing for the method switching system of the wireless access point to start the switching of the connection method is not particularly limited, the method switching system may be configured to start the switching when an instruction from outside is received.

Incidentally, the "instruction from outside" in this composition system, for example, a particular operation by the user to an operation unit of the wireless access point, data transmitted from a communication terminal which is connected to the wireless access point to communicate data, etc.

The reply request system may also be configured to transmit the reply request data according to the connection method preset to the wireless access point before the switching of the connection method by the method switching system is started.

In this composition, since the transmission of the reply request data according to the connection method preset to the wireless access point is carried out at the beginning, it is preferable that the method switching system be configured not to switch the connection method to the preset connection method.

In the wireless station described above, the method setting system is a system for setting the connection method for the wireless connection to the wireless access point, and its composition for the setting of the connection method is not limited particularly. For example, in cases where the wireless station includes notification collection system which collects the notification data transmitted according to the connection method preset to the wireless station for a prescribed period of time, the method setting system may be configured to set a connection method notified by the notification data having the highest reception level among the notification data collected by the notification collection system as the connection method of the wireless station for the wireless connection to the wireless access point, after the collection of the notification data by the notification collection system is finished.

Incidentally, the notification collection system in this composition is a system for collecting the notification data. The notification data collected by the notification collection system may be stored in memory, etc. so that the correspondence of the notification data with, for example, the source (i.e. the wireless access point transmitting the notification data), the connection method and the reception level of the notification data can be specified. In this case, the method setting system may be configured to switch the connection method to a connection method corresponding to notification data of the highest reception level based on the stored correspondences.

While the method notification system of the wireless access point can transmit the notification data when the reply data is received regardless of the content of the reply data, the method notification system may also be configured to transmit the notification data to wireless stations returning the reply data satisfying a prescribed condition.

For this, the wireless access point may include reply collection system which collects the reply data for a prescribed period of time after the transmission of the reply request data by the reply request system is started, and the method notification system may transmit the notification data to a wireless station returning reply data having the highest reception level among the reply data collected by the reply collection system, after the collection of the reply data by the reply collection system is finished.

Incidentally, the reply collection system in this composition is a system for collecting the reply data after the transmission of the reply request data is started. The reply data collected by the reply collection system may be stored in memory, etc. so that the correspondence of, for example, the source (transmitter), the connection method and the reception level of the reply data can be specified. In this case, the method notification system may be configured to transmit the notification data according to a connection method corresponding to the highest reception level based on the stored correspondences.

The method notification system of the wireless access point may be configured to transmit the notification data to a wireless station returning reply data that is selected from all the reply data, returned after the transmission of the reply request data by the reply request system is started, based on an instruction from outside.

The wireless access point may include reply collection system which collects the reply data for a prescribed period of time after the transmission of the reply request data by the reply request system is started, and the method notification system may transmit the notification data to a wireless station returning reply data that is selected from all the reply data collected by the reply collection system based on an instruction from outside after the collection of the reply data by the reply collection system is finished.

Incidentally, the reply collection system in this composition collects the reply data for a prescribed period of time after the transmission of the reply request data is started, as mentioned above. The reply data collected by the reply collection system may be stored in memory, etc. so that the connection method and the source of the reply data, for example, can be identified. In this case, the method notification system transmits the notification data to the wireless station returning reply data that is selected from all the collected reply data based on the instruction from outside.

The "instruction from outside" in this composition system, for example, a particular operation by the user to an operation unit of the wireless access point. For this, a configuration described below is possible.

That is, the wireless access point may include first user selection system which lets a user select one or more wireless stations from the wireless stations returning the reply data collected by the reply collection system, after the collection of the reply data by the reply collection system is finished. The method notification system transmits the notification data to the one or more wireless stations selected by the user through the first user selection system.

For using a particular operation by the user as the "instruction from outside", a configuration as follows is possible.

Namely, the reply transmission system of the wireless station transmits the reply data associating identification data for identifying the wireless station with the reply data. Meanwhile, the reply collection system of the wireless access point collects the reply data together with the identification data associated with the reply data. The wireless access point includes second user selection system which lets a user select one or more pieces of the identification data from the identification data associated with the reply data collected by the reply collection system, after the collection of the reply data by the reply collection system is finished. The method notification system transmits the notification data to one or more wireless stations identified by the identification data selected by the user through the second user selection system.

Alternatively, the method notification system of the wireless access point is configured to determine the wireless station to which the notification data should be transmitted according to an instruction from a communication terminal which is connected to the wireless access point to communicate data.

In this composition, the communication of the instruction with the communication terminal can be realized by, for example, a configuration as follows.

That is, the wireless access point may include reply collection system and listing transmission system. The reply collection system collects the reply data for a prescribed period of time after the transmission of the reply request data by the reply request system is started and thereby stores data indicating correspondence between the collected reply data and wireless stations which transmitted the collected reply data in a storage unit. The listing transmission system transmits listing data, representing a list of wireless stations whose correspondence has been stored in the storage unit by the reply collection system, to the communication terminal when listing request data requesting the list of the wireless stations is received from the communication terminal. After the listing data is transmitted to the communication terminal by the listing transmission system and selection data, representing one or more wireless stations selected at the communication terminal from the list represented by the listing data, is received from the communication terminal, the method notification system transmits the notification data to the one or more wireless stations represented by the selection data. The communication terminal includes listing request system, third user selection system and selection transmission system. The listing request system transmits the listing request data to the wireless access point. The third user selection system lets a user select one or more wireless stations from the list represented by the listing data when the listing data is received from the wireless access point after the listing request data is transmitted to the wireless access point by the listing request system. The selection transmission system transmits the selection data, representing the one or more pieces of identification data selected by the user through the third user selection system, to the wireless access point.

The reply collection system in this configuration collects the reply data for a prescribed period of time after the transmission of the reply request data is started, as mentioned above. The reply data collected by the reply collection system may be stored in memory, etc. so that the connection method and the source of the reply data, for example, can be identified. In this case, the method notification system transmits the notification data to the wireless station returning reply data that is selected from all the collected reply data based on the instruction from outside.

Optionally, the reply transmission system of the wireless station may transmit the reply data associating identification data for identifying the wireless station with the reply data. The wireless access point includes reply collection system and listing transmission system. The reply collection system collects the reply data together with the identification data associated with the reply data for a prescribed period of time after the transmission of the reply request data by the reply request system is started and thereby stores data indicating correspondence between the identification data and wireless stations which transmitted the collected reply data in a storage unit. The listing transmission system transmits listing data, representing a list of identification data whose correspondence has been stored in the storage unit by the reply collection system, to the communication terminal when listing request data requesting the list of the identification data is received from the communication terminal. After the listing data is transmitted to the communication terminal by the listing transmission system and selection data, representing one or more pieces of the identification data selected at the communication terminal from the list represented by the listing data, is received from the communication terminal, the method notification system transmits the notification data to one or more wireless stations corresponding to the one or more pieces of identification data represented by the selection data. The communication terminal includes listing request system, fourth user selection system and selection transmission system. The listing request system transmits the listing request data to the wireless access point. The fourth user selection system lets a user select one or more pieces of the identification data from the list represented by the listing data when the listing data is received from the wireless access point after the listing request data is transmitted to the wireless access point by the listing request system. The selection transmission system transmits the selection data, representing the one or more wireless stations selected by the user through the fourth user selection system, to the wireless access point.

The reply collection system in this configuration collects the reply data for a prescribed period of time after the transmission of the reply request data is started, as mentioned above. The reply data collected by the reply collection system may be stored in memory, etc. so that the correspondence between the identification data and the connection method corresponding to the reply data (or the reply data itself), for example, can be identified. In this case, the listing transmission system transmits listing data, representing a list of identification data which can be identified by the stored correspondences, to the communication terminal.

Each user selection system mentioned above is a system for letting the user make a selection. For example, the user is informed through a display unit, printing unit, speaker, etc. that a selection should be made from options (wireless stations, identification data) by use of an operation unit, and the user makes a selection from the options with the operation unit based on the information.

Therefore, for letting the wireless LAN system carry out data communication normally without the need of operations by the user, the wireless access point may include encryption switching system which switches an encryption method employed for the data communication with each wireless station. In cases where the wireless access point has been set to a state for executing the data communication by encrypting data with a first encryption key after the transmission of the notification data by the method notification system, the encryption switching system switches the encryption method to a method executing the data communication without encryption only for data communication with each wireless station to which the notification data has been transmitted.

As another configuration for letting the wireless LAN system carry out data communication normally without the need of operations by the user, a configuration described below is also possible.

Optionally, the method notification system of the wireless access point may be configured to transmit the notification data attaching a second encryption key, which is different from a first encryption key being employed for encrypting the data communication by the wireless access point, to the notification data. The wireless access point includes encryption switching system which, after the transmission of the notification data by the method notification system, switches an encryption method employed for data communication with each wireless station to which the notification data has been transmitted, to a method executing the data communication by encrypting data with the second encryption key. The wireless station includes encryption setting system which, after the reception of the notification data from the wireless access point, sets the wireless station to execute the data communication with the wireless access point by encrypting data with the second encryption key attached to the notification data.

While the configurations realize data communication between the wireless access point and the wireless station even when the wireless access point is configured to execute data communication employing encryption, the security level of the data communication between the wireless access point and the wireless station is not sufficiently high since the configuration employs no encryption and the configuration may involve a possibility of a leak of the second encryption key while it is transmitted from the wireless access point to the wireless station.

In order to increase the security level of the data communication between the wireless access point and the wireless station, a configuration can be employed, for example. In the wireless LAN system described below, the wireless station includes: encryption key acquisition system which acquires the first encryption key from the communication terminal via the wireless access point by the public key cryptosystem; and encryption alteration system which alters settings of the wireless station so that data communication with the wireless access point will be executed employing the encryption with the first encryption key, by releasing the wireless connection with the wireless access point and reestablishing the wireless connection employing the encryption with the first encryption key when the first encryption key is acquired from the communication terminal by the encryption key acquisition system. The communication terminal includes encryption key transfer system which transfers the first encryption key to the wireless station via the wireless access point by the public key cryptosystem. The encryption switching system of the wireless access point does not execute the switching of the encryption method after the wireless connection with the wireless station is released.

In some case, the encryption key transfer system of the communication terminal may be configured to transfer an authentication message or signal which indicates transferring of the first encryption key to the wireless station by the public key cryptosystem, and the wireless station may include a message/signal output system which outputs the authentication message or signal acquired by the encryption key acquisition system.

That is, the encryption key transfer system of the communication terminal is configured to transfer an authentication message/signal to the wireless station by the public key cryptosystem prior to the transfer of the first encryption key. The communication terminal includes confirmation operation system which lets a user who confirmed the authentication message/signal outputted by the wireless station carry out a confirmation operation after the authentication message/signal is transferred to the wireless station by the encryption key transfer system. The encryption key transfer system is configured to transfer the first encryption key when the confirmation operation is carried out through the confirmation operation system. The encryption key acquisition system of the wireless station is configured to acquire the authentication message/signal which is transferred from the communication terminal by the public key cryptosystem prior to the first encryption key. The wireless station includes message/signal output system which outputs the authentication message/signal acquired by the encryption key acquisition system. The encryption key acquisition system acquires the first encryption key which is transferred from the communication terminal after the confirmation operation to the communication terminal is carried out by the user confirming the authentication message/signal outputted by the message output system.

Incidentally, the above "authentication message" is a message for letting the user confirm a correct wireless station to which the first encryption key should be transferred from the communication terminal. The content of the authentication message is outputted by the wireless station for the confirmation by the user.

The message output system of the wireless station is a system for outputting the authentication message by use of a display unit, printing unit, speaker, etc.

As explained above, the wireless access point is configured to execute the transmission of the notification data by the method notification system and thereby let the wireless station set its connection method, that is, to support the setting of the connection method at the wireless station. However, the wireless access point may also be configured to execute the support in a particular state only.

Specifically, the wireless access point may include mode switching system capable of switching the operation mode of the wireless access point to either one selected from a support mode supporting the setting of the connection method of each wireless station by executing the transmission of the notification data by the method notification system and a normal mode not supporting the setting of the connection method without executing the transmission of the notification data by the method notification system.

While the trigger for the switching of the operation mode by the mode switching system in this configuration is not particularly limited, the mode switching system may switch the operation mode in response to an instruction from outside.

Optionally, the mode switching system may switch the operation mode to the normal mode when a prescribed period of time has passed since the switching of the operation mode to the support mode.

Further optionally, the mode switching system may also be configured to switch the operation mode to the normal mode when the notification data has been transmitted by the method notification system for a prescribed number of times since the switching of the operation mode to the support mode.

In a wireless LAN system, the wireless station may optionally include content judgment system and operation suspension system. The content judgment system judges whether or not content of current settings regarding the connection method for the wireless connection to the wireless access point requires new setting of the connection method for the wireless connection to the wireless access point via the reply by the reply transmission system and the setting by the method setting system. The operation suspension system prevents the reply by the reply transmission system and/or the setting by the method setting system when the content judgment system judges that the content of the current settings does not require the new setting.

Further optionally, the wireless station includes content judgment system which judges whether or not content of current settings regarding the connection method for the wireless connection to the wireless access point requires new setting of the connection method for the wireless connection to the wireless access point via the reply by the reply transmission system and the setting by the method setting system. The reply transmission system is configured to transmit the reply data in a state specifying the result of the judgment by the content judgment system on the necessity of the new setting of the connection method. The method notification system of the wireless access point transmits the notification data only when the reply data received from the wireless station is data capable of specifying that the new setting of the connection method is necessary.

According to a further aspect of the invention, there is provided a wireless LAN system in which data communication between a wireless station whose connection method as a method for wireless connection can be set to one of a plurality of connection methods and a wireless access point whose connection method has been preset to one of the connection methods is made possible by setting the connection method of the wireless station to a method identical with the connection method of the wireless access point.

Specifically, the wireless access point includes announcement transmission system. The announcement transmission system transmits announcement data, for announcing that the connection method of the wireless access point has been set to a particular one selected from the connection methods, according to each of the connection methods. Meanwhile, the wireless station includes method setting system. The method setting system sets the connection method of the wireless station for the wireless connection to the wireless access point to the particular connection method announced by the announcement data when the announcement data transmitted according to a preset connection method is received from the wireless access point.

Optionally, the announcement transmission system of the wireless access point may transmit data for requesting a reply made according to the particular connection method, as the announcement data. The wireless access point includes connection permission system which establishes the wireless connection with the wireless station by transmitting a request reminder data for letting the wireless station request permission for the wireless connection to the wireless access point when reply data returned from the wireless station according to the announcement data is received after the transmission of the announcement data is started by the announcement transmission system and thereafter transmitting connection permission data indicating permission for the wireless connection to the wireless access point when permission request data as data for requesting the permission for the wireless connection is received from the wireless station. Meanwhile, the wireless station includes: reply system which returns the reply data representing the reply requested by the announcement data to the wireless access point according to the particular connection method announced by the announcement data when the announcement data is received from the wireless access point; and connection establishment system which establishes the wireless connection with the wireless access point via the transmission of the permission request data and the reception of the connection permission data when the request reminder data transmitted by the wireless access point is received after the reply system transmitted the reply data to the wireless access point.

In the wireless access point described above, the announcement transmission system is a system for transmitting the announcement data according to each of the connection methods, and its composition for the transmission of the announcement data is not limited particularly.

For example, in cases where the wireless access point includes method switching system which temporarily switches the connection method of the wireless access point to each of the connection methods, the announcement data may be transmitted according to each connection method switched and set by the method switching system during each period in which the connection method is temporarily switched by the method switching system to the connection method.

In this composition, the length of the period in which the method switching system switches the connection method from the preset connection method should be as short as possible, as long as time necessary for the transmission of the announcement data can be secured. During the period in which the connection method is changed from the preset connection method, the wireless access point generally can not carry out data communication which should be conducted according to the preset connection method. Therefore, the shortness of the period (in which the connection method is changed) is advantageous for avoiding the inconvenience of the interruption of data communication which should be conducted according to the preset connection method.

In this composition, while the timing for the method switching system of the wireless access point to start the switching of the connection method is not particularly limited, the method switching system may be configured to start the switching when an instruction from outside is received.

Incidentally, the "instruction from outside" in this composition system, for example, a particular operation by the user to an operation unit of the wireless access point, data transmitted from a communication terminal which is connected to the wireless access point to communicate data, etc.

Further optionally, the announcement transmission system may also be configured to transmit the announcement data according to a preset connection method before the switching of the connection method by the method switching system is started.

In this composition, since the transmission of the announcement data according to the preset connection method is carried out at the beginning, it is preferable that the method switching system be configured not to switch the connection method to the preset connection method.

In the wireless station described above, the method setting system is a system for setting the connection method for the wireless connection to the wireless access point, and its composition for the setting of the connection method is not limited particularly. For example, in cases where the wireless station includes announcement collection system which collects the announcement data transmitted according to the preset connection method for a prescribed period of time, the method setting system may be configured to set a connection method announced by announcement data having the highest reception level among the announcement data collected by the announcement collection system as the connection method of the wireless station for the wireless connection to the wireless access point, after the collection of the announcement data by the announcement collection system is finished.

Incidentally, the announcement collection system in this composition is a system for collecting the announcement data. The announcement data collected by the announcement collection system may be stored in memory, etc. so that the correspondence of the announcement data with, for example, the source (i.e. the wireless access point transmitting the announcement data), the connection method and the reception level of the announcement data can be specified. In this case, the method setting system may be configured to switch the connection method to a connection method corresponding to announcement data of the highest reception level based on the stored correspondences.

Such setting of the connection method (for the connection to the wireless access point) specified by the announcement data having the highest reception level is advantageous for preventing erroneous setting of the connection method of the wireless station to a false connection method different from the method for the connection to the correct wireless access point.

While the connection permission system of the wireless access point can transmit the request reminder data when the reply data is received regardless of the content of the reply data, the connection permission system may also be configured to transmit the request reminder data to wireless stations returning the reply data satisfying a prescribed condition.

By such composition, the wireless access point is allowed to establish wireless connection only with wireless stations returning the reply data satisfying the prescribed condition, via the transmission of the request reminder data.

While the content of the "prescribed condition" in this configuration is not particularly limited, "(reply data of) the highest reception level" may be employed as the condition, for example.

For this, the wireless access point may include reply collection system which collects the reply data for a prescribed period of time after the transmission of the announcement data by the announcement transmission system is started, and the connection permission system may transmit the request reminder data to a wireless station returning reply data having the highest reception level among the reply data collected by the reply collection system, after the collection of the reply data by the reply collection system is finished.

Therefore, erroneous transmission of the request reminder data to a false wireless station (different from the wireless station with which wireless connection should be established) and erroneous establishment of the wireless connection with the false wireless station can be avoided only by putting the wireless station and the wireless access point sufficiently in the vicinity of each other for gaining enough reception level during the radio communication.

Incidentally, the reply collection system in this composition is a system for collecting the reply data after the transmission of the announcement data is started. The reply data collected by the reply collection system may be stored in memory, etc. so that the correspondence of, for example, the source (transmitter), the connection method and the reception level of the reply data can be specified. In this case, the connection permission system may be configured to transmit the request reminder data according to a connection method corresponding to the highest reception level based on the stored correspondences.

The connection permission system of the wireless access point may be configured to transmit the request reminder data to a wireless station returning reply data that is selected from all the reply data, returned after the transmission of the announcement data by the announcement transmission system is started, based on an instruction from outside.

The wireless access point may include reply collection system which collects the reply data for a prescribed period of time after the transmission of the announcement data by the announcement transmission system is started, and the connection permission system may transmit the request reminder data to a wireless station returning reply data that is selected from all the reply data collected by the reply collection system based on an instruction from outside after the collection of the reply data by the reply collection system is finished.

Incidentally, the reply collection system in this composition collects the reply data for a prescribed period of time after the transmission of the announcement data is started, as mentioned above. The reply data collected by the reply collection system may be stored in memory, etc. so that the connection method and the source of the reply data, for example, can be identified. In this case, the connection permission system transmits the request reminder data to the wireless station returning reply data that is selected from all the collected reply data based on the instruction from outside.

The "instruction from outside" in this composition system, for example, a particular operation by the user to an operation unit of the wireless access point. For this, a configuration described below is possible.

In a wireless LAN system, the wireless access point may include first user selection system which lets a user select one or more wireless stations from the wireless stations returning the reply data collected by the reply collection system, after the collection of the reply data by the reply collection system is finished. The connection permission system transmits the request reminder data to the one or more wireless stations selected by the user through the first user selection system.

For using a particular operation by the user as the "instruction from outside", a configuration described below is possible.

That is, the reply system of the wireless station transmits the reply data associating identification data, for identifying the wireless station, with the reply data. Meanwhile, the reply collection system of the wireless access point collects the reply data together with the identification data associated with the reply data. The wireless access point includes second user selection system which lets a user select one or more pieces of the identification data from the identification data associated with the reply data collected by the reply collection system, after the collection of the reply data by the reply collection system is finished. The connection permission system transmits the request reminder data to one or more wireless stations identified by the identification data selected by the user through the second user selection system.

The "instruction from outside" in the aforementioned configuration may also mean data transmitted from a communication terminal which is connected to the wireless access point to communicate data. For this, a configuration described below is possible.

That is, the connection permission system of the wireless access point is configured to determine the wireless station to which the request reminder data should be transmitted according to an instruction from a communication terminal which is connected to the wireless access point to communicate data.

By such composition, the wireless access point is allowed to establish wireless connection only with the wireless station returning the reply data that is selected (from the reply data collected during a prescribed period of time) based on the instruction from the communication terminal, via the transmission of the request reminder data.

In this composition, the communication of the instruction with the communication terminal can be realized by, for example, a configuration described below.

That is, the wireless access point may include reply collection system and listing transmission system. The reply collection system collects the reply data for a prescribed period of time after the transmission of the announcement data by the announcement transmission system is started and thereby stores data indicating correspondence between the collected reply data and wireless stations which transmitted the collected reply data in a storage unit. The listing transmission system transmits listing data, representing a list of wireless stations whose correspondence has been stored in the storage unit by the reply collection system, to the communication terminal when listing request data requesting the list of the wireless stations is received from the communication terminal. After the listing data is transmitted to the communication terminal by the listing transmission system and selection data, representing one or more wireless stations selected at the communication terminal from the list represented by the listing data, is received from the communication terminal, the connection permission system transmits the request reminder data to the one or more wireless stations represented by the selection data. The communication terminal includes listing request system, third user selection system and selection transmission system. The listing request system transmits the listing request data to the wireless access point. The third user selection system lets a user select one or more wireless stations from the list represented by the listing data when the listing data is received from the wireless access point after the listing request data is transmitted to the wireless access point by the listing request system. The selection transmission system transmits the selection data, representing the one or more wireless stations selected by the user through the third user selection system, to the wireless access point.

The reply collection system in this configuration collects the reply data for a prescribed period of time after the transmission of the announcement data is started, as mentioned above. The reply data collected by the reply collection system may be stored in memory, etc. so that the connection method and the source of the reply data, for example, can be identified. In this case, the connection permission system transmits the request reminder data to the wireless station returning reply data that is selected from all the collected reply data based on the instruction from outside.

In the composition described above, the communication of the instruction with the communication terminal can also be realized by, for example, a configuration described below.

That is, the reply system of the wireless station transmits the reply data associating identification data, for identifying the wireless station, with the reply data. The wireless access point includes reply collection system and listing transmission system. The reply collection system collects the reply data together with the identification data associated with the reply data for a prescribed period of time after the transmission of the announcement data by the announcement transmission system is started and thereby stores data indicating correspondence between the identification data and wireless stations which transmitted the collected reply data in a storage unit. The listing transmission system transmits listing data, representing a list of identification data whose correspondence has been stored in the storage unit by the reply collection system, to the communication terminal when listing request data requesting the list of the identification data is received from the communication terminal. After the listing data is transmitted to the communication terminal by the listing transmission system and selection data, representing one or more pieces of the identification data selected at the communication terminal from the list represented by the listing data, is received from the communication terminal, the connection permission system transmits the request reminder data to one or more wireless stations corresponding to the one or more pieces of identification data represented by the selection data. The communication terminal includes listing request system, fourth user selection system and selection transmission system. The listing request system transmits the listing request data to the wireless access point. The fourth user selection system lets a user select one or more pieces of the identification data from the list represented by the listing data when the listing data is received from the wireless access point after the listing request data is transmitted to the wireless access point by the listing request system. The selection transmission system transmits the selection data, representing the one or more pieces of identification data selected by the user through the fourth user selection system, to the wireless access point.

The reply collection system in this configuration collects the reply data for a prescribed period of time after the transmission of the announcement data is started, as mentioned above. The reply data collected by the reply collection system may be stored in memory, etc. so that the correspondence between the identification data and the connection method corresponding to the reply data (or the reply data itself), for example, can be identified. In this case, the listing transmission system transmits listing data, representing a list of identification data which can be identified by the stored correspondences, to the communication terminal.

Each user selection system mentioned above is a system for letting the user make a selection. For example, the user is informed through a display unit, printing unit, speaker, etc. that a selection should be made from options (wireless stations, identification data) by use of an operation unit, and the user makes a selection from the options with the operation unit based on the information.

In the wireless LAN systems described above, even if the wireless station is connected to the wireless access point by wireless connection, if the wireless access point is configured to carry out data communication employing encryption, normal data communication is generally impossible without similarly configuring the wireless station to execute the data communication employing the encryption.

Therefore, for letting the wireless LAN system carry out data communication normally without the need of operations by the user, the wireless access point may include encryption switching system which switches an encryption method employed for the data communication with each wireless station. In cases where the wireless access point has been set to a state for executing the data communication by encrypting data with a first encryption key after the transmission of the request reminder data by the connection permission system, the encryption switching system switches the encryption method to a method executing the data communication without encryption only for data communication with each wireless station to which the request reminder data has been transmitted.

As another configuration for letting the wireless LAN system carry out data communication normally without the need of operations by the user, a configuration described below is also possible.

That is, the connection permission system of the wireless access point is configured to transmit the request reminder data attaching a second encryption key, which is different from a first encryption key being employed for encrypting the data communication by the wireless access point, to the request reminder data. The wireless access point includes encryption switching system which, after the transmission of the request reminder data by the connection permission system, switches an encryption method employed for data communication with each wireless station to which the request reminder data has been transmitted, to a method executing the data communication by encrypting data with the second encryption key. The wireless station includes encryption setting system which, after the reception of the request reminder data from the wireless access point, sets the wireless station to execute the data communication with the wireless access point by encrypting data with the second encryption key attached to the request reminder data.

In order to increase the security level of the data communication between the wireless access point and the wireless station, a configuration described below can be employed, for example. That is, the wireless station includes: encryption key acquisition system which acquires the first encryption key from the communication terminal via the wireless access point by the public key cryptosystem; and encryption alteration system which alters settings of the wireless station so that data communication with the wireless access point will be executed employing the encryption with the first encryption key, by releasing the wireless connection with the wireless access point and reestablishing the wireless connection employing the encryption with the first encryption key when the first encryption key is acquired from the communication terminal by the encryption key acquisition system. The communication terminal includes encryption key transfer system which transfers the first encryption key to the wireless station via the wireless access point by the public key cryptosystem. The encryption switching system of the wireless access point does not execute the switching of the encryption method after the wireless connection with the wireless station is released.

In this configuration, when the communication terminal transfers the first encryption key to the wireless station, it is desirable that the communication terminal can confirm that the wireless station is a correct wireless station to which the first encryption key should be transferred. For this, a configuration described below is possible, for example.

That is, the encryption key transfer system of the communication terminal is configured to transfer an authentication message to the wireless station by the public key cryptosystem prior to the transfer of the first encryption key. The communication terminal includes confirmation operation system which lets a user who confirmed the authentication message outputted by the wireless station carry out a confirmation operation after the authentication message is transferred to the wireless station by the encryption key transfer system. The encryption key transfer system is configured to transfer the first encryption key when the confirmation operation is carried out through the confirmation operation system. The encryption key acquisition system of the wireless station is configured to acquire the authentication message which is transferred from the communication terminal by the public key cryptosystem prior to the first encryption key. The wireless station includes message output system which outputs the authentication message acquired by the encryption key acquisition system. The encryption key acquisition system acquires the first encryption key which is transferred from the communication terminal after the confirmation operation to the communication terminal is carried out by the user confirming the authentication message outputted by the message output system.

The message output system of the wireless station may be a system for outputting the authentication message by use of a display unit, printing unit, speaker, etc.

As explained above, the wireless access point is configured to execute the transmission of the announcement data by the announcement transmission system and thereby let the wireless station set its connection method, that is, to support the setting of the connection method at the wireless station. However, the wireless access point may also be configured to execute the support in a particular state only.

Specifically, the wireless access point may include mode switching system capable of switching the operation mode of the wireless access point to either one selected from a support mode supporting the setting of the connection method of each wireless station by executing the transmission of the announcement data by the announcement transmission system and a normal mode not supporting the setting of the connection method without executing the transmission of the announcement data by the announcement transmission system.

While the trigger for the switching of the operation mode by the mode switching system in this configuration is not particularly limited, the mode switching system may switch the operation mode in response to an instruction from outside.

Incidentally, the "instruction from outside" in this composition system, for example, a particular operation by the user to an operation unit of the wireless access point, data transmitted from a communication terminal which is connected to the wireless access point to communicate data, etc.

Optionally, the mode switching system may switch the operation mode to the normal mode when a prescribed period of time has passed since the switching of the operation mode to the support mode.

Further optionally, the mode switching system may also be configured to switch the operation mode to the normal mode when the announcement data has been transmitted by the announcement transmission system for a prescribed number of times since the switching of the operation mode to the support mode.

Still optionally, the wireless station may include content judgment system and operation suspension system. The content judgment system judges whether or not content of current settings regarding the connection method for the wireless connection to the wireless access point requires new setting of the connection method for the wireless connection to the wireless access point via the setting by the method setting system. The operation suspension system prevents the setting by the method setting system when the content judgment system judges that the content of the current settings does not require the new setting.

Incidentally, the operation suspension system in this composition is a system for preventing the setting by the method setting system, and its composition for the prevention of the setting is not limited particularly. For example, the operation suspension system may be configured to suspend the setting operation of the method setting system.

According to a further aspect of the invention, there is provided a communication terminal which functions as the wireless station for any one of the configurations of the wireless LAN system described above.

According to another aspect of the invention, there is provided a communication terminal which functions as the wireless access point for any one of the configurations of the Optionally, there is provided a program for instructing a computer system to execute processes necessary for functioning as any one of the configurations described above.

Incidentally, each communication program described above is a program composed of a sequence of instructions suitable for being processed by the computer system, for letting the computer system execute the function of each of the wireless station, the wireless access point and the communication terminal. The program is supplied to a wireless access point, wireless station or communication terminal (hereinafter referred to as a "communication terminal, etc."), a computer system, or a user of each device via a record medium (FD, CD-ROM, memory card, etc.) or a communication network (the Internet, etc.). As the computer system for executing the program, a computer system built in a communication terminal, etc., a computer system connected with a communication terminal, etc. via a wireless/wired communication path to communicate data, etc. can be employed.

The present invention also relates to functions equivalents to the functions explained above in relation to a wireless LAN system, a communication terminal and a computer system achieving such a system/device. The present invention also relates to a computer program comprising program code means for realizing all or part of the functions equivalent to those explained above. Such program code means may be stored on a computer-readable recording medium or distributed through a network and is executed by a computer when all or part of the function is to be realized.

BRIEF DESCRIPTION OF THE ACCOMPANYING DRAWINGS

FIG. 5 is a table showing data structure of a data table;

FIG. 28 is a table showing data structure of a data table;

DETAILED DESCRIPTION OF THE EMBODIMENTS

In the following, embodiments and modifications of a wireless LAN system including a plurality of network devices (hereinafter simply referred to as "devices") connected by a LAN will be described.

Embodiment 1

Figure 1:
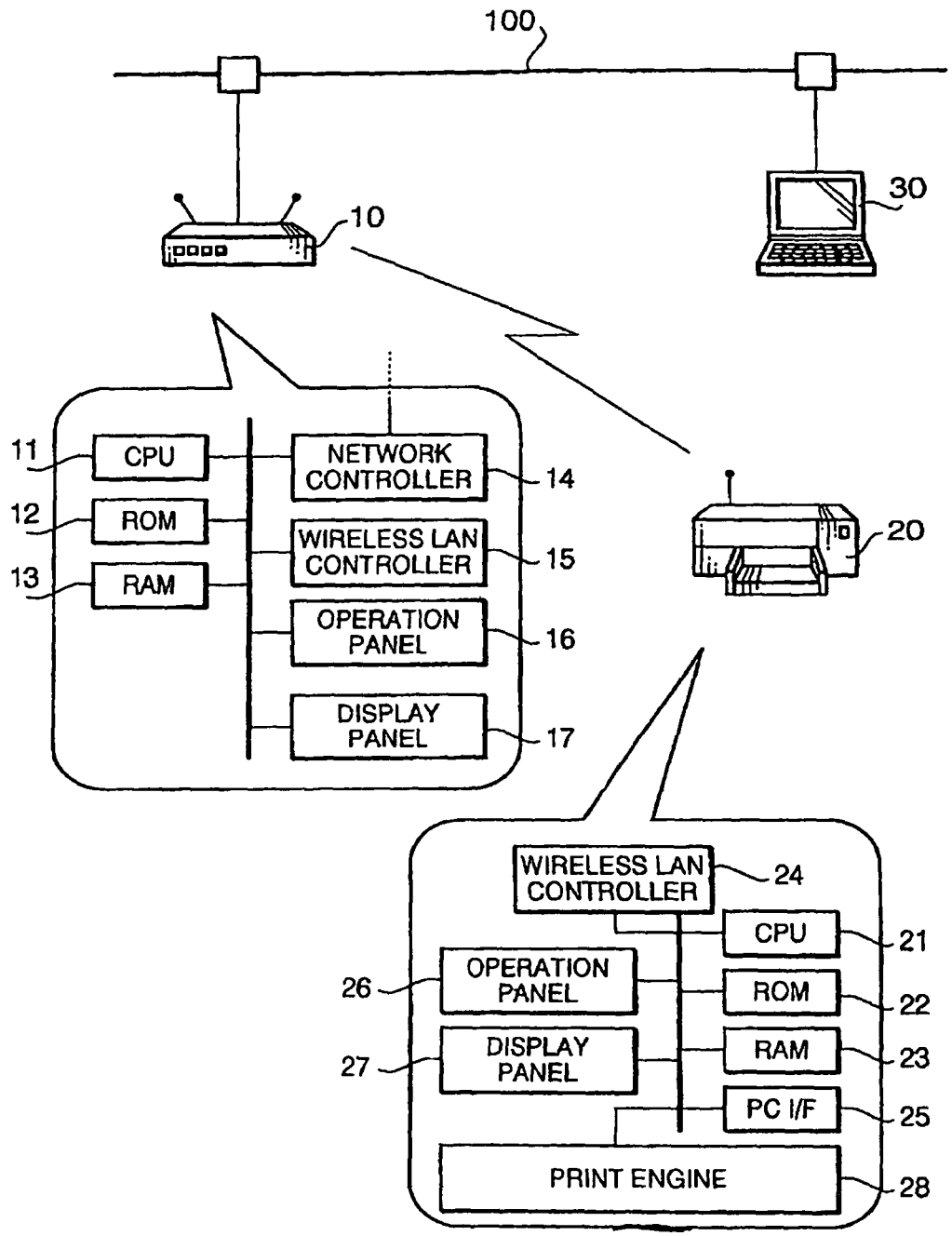
FIG. 1 is a schematic diagram showing a network configuration.

FIG. 1 shows an exemplary configuration of a wireless LAN system according to the present invention. It should be noted that a hardware configuration of the wireless LAN system is common among the embodiments and modifications described hereinafter, the wireless LAN system will be described once as a system according to the first embodiment.

The wireless LAN system shown in FIG. 1 is composed of an access point 10, a network printer 20 (hereinafter simply referred to as a "printer"), etc.

The access point 10, which is a wireless access point for relaying data communication between devices (or external networks) connected by cables 100 and data communication between wireless stations, includes a CPU 11, a ROM 12, a RAM 13, a network controller 14, a wireless LAN controller 15, an operation panel 16, a display panel 17, etc.

The CPU 11 of the access point 10 controls the overall operation of the access point 10 by sending instructions to the components according to a procedure stored in the ROM 12, while recording the results of processes in the RAM 13.

The ROM 12 is a nonvolatile memory which is readable and rewritable, having storage areas for storing the SSID (Service Set IDentifier, or ESSID (Extended SSID)) to be used when the access point 10 itself communicates with a wireless station, parameters indicating the method of wireless connection (hereinafter referred to as "the connection method"), etc. Incidentally, the "connection method" is specified by a wireless LAN standard selected from 1st through i-th wireless LAN standards (IEEE802.11a, IEEE802.11b and IEEE802.11g, for example) and a channel selected from a plurality of channels usable in the wireless LAN standard, by which the method employed by the wireless access point for realizing wireless connection with wireless stations is defined.

The network controller 14 is an interface for realizing data communication with other devices such as a PC 30 (or external networks) that are connected to the access point 10 via the cable 100.

The wireless LAN controller 15 is an interface for realizing the communication according to the wireless LAN standard based on the parameters stored in the ROM 12. The wireless LAN controller 15 realizes the communication function as the wireless access point by establishing a connection with a wireless station according to the connection method specified by the "parameters indicating the connection method"

In the access point 10 composed as above, after the "SSID" and the "parameters indicating the connection method" are stored in the ROM 12, wireless stations making access to the access point 10 by an SSID identical with the SSID stored in the ROM 12 and by the aforementioned connection method are permitted the communication by radio.

Incidentally, in the access point 10, the "SSID" and the "parameters indicating the connection method" are generated and stored in the ROM 12 when data regarding the settings are communicated with another device by radio or by wire and the settings are made indirectly by the device (remote setup). In this embodiment, it is assumed that parameters indicating a connection method specified by a "2nd channel" of a "1st wireless LAN standard" have been stored (set) in the ROM 12 by the remote setup as the "parameters indicating the connection method".

The printer 20, which is a device having the function of a wireless station, is provided with a CPU 21, a ROM 22, a RAM 23, a wireless LAN controller 24, a PC interface unit (PC I/F) 25, an operation panel 26, a display panel 27, a print engine 28, etc.

The CPU 21 of the printer 20 controls the overall operation of the printer 20 by sending instructions to the components according to a procedure stored in the ROM 22, while recording the results of processes in the RAM 23.

The ROM 22 is a nonvolatile memory which is readable and rewritable, having storage areas for storing the SSID to be used when the printer 20 as a wireless station communicates with the wireless access point, the parameters indicating the connection method, etc.

The wireless LAN controller 24 is an interface for realizing the communication according to the wireless LAN standard based on the parameters stored in the ROM 22. Similarly to the wireless LAN controller 15 of the access point 10, the wireless LAN controller 24 realizes the communication function as a wireless station by establishing a connection with the wireless access point according to the connection method specified by the "parameters indicating the connection method".

The PC interface unit 25 is an interface for connecting the printer 20 to a PC via a communication cable, by which data communication between the printer 20 and the PC is enabled.

In the printer 20 composed as above, after the "SSID" and the "parameters indicating the connection method" are stored in the ROM 22, data communication using the SSID becomes possible via a wireless connection according to the connection method. Incidentally, in the printer 20, the "SSID" and the "parameters indicating the connection method" are generated and stored (set) in the ROM 22 in a connection method settling process (FIG. 2) which will be explained below.

<Connection Method Settling Process by Printer 20>

In the following, the connection method settling process which is conducted by the CPU 21 of the printer 20 will be described referring to FIG. 2. The connection method settling process is started when an operation for turning on power, restarting (resetting), initialization (returning the settings of the printer 20 to the factory shipment state and restarting), etc. is received by the operation panel 26.

First, whether the printer 20 is in the factory shipment state or not is checked (S100). In this step, the printer 20 is judged to be in its factory shipment state if no "parameters indicating the connection method" are stored in the ROM 22.

If the printer 20 is not in the factory shipment state (S100: NO), the connection method settling process is ended. If in the factory shipment state (S100: YES), a variable M is initialized (5110). In this step, a value "1" is set in the variable M (1→M). Incidentally, a character "m" in the following description system the value set in the variable M.

Subsequently, a variable N is initialized (S120). In this step, a value "1" is set in the variable N (1→N). A character "n" in the following description system the value set in the variable N.

Subsequently, the method of wireless connection to the wireless access point (hereinafter referred to as "connection method") is switched to a connection method implemented by the n-th channel of the m-th wireless LAN standard (S130). In this step, the connection method employed by the wireless LAN controller 24 for the wireless connection to the access point 10 is switched by storing the parameters (for implementing a communication function by the connection method specified by the n-th channel of the m-th wireless LAN standard) in a storage area of the RAM 23 for the "parameters indicating the connection method" and letting the wireless LAN controller 24 control the connection method according to the memory content of the RAM 23. By this, the connection method will be controlled according to the memory content of the RAM 23 until next switching (for controlling the connection method according to the memory content of the ROM 22) is done in a posterior step (S301). Incidentally, when the storage area for the "parameters indicating the connection method" already holds parameters, the parameters are overwritten with the new parameters.

Subsequently, announcement data, for announcing (or advertising) the connection method switched in the step S130 to devices around the printer 20, is generated and transmitted (S140). In this step, frame data (management frame) in which a subtype (indicating that the data is announcement data) is set in the header and a device name and a device ID for identifying the device (MAC address in this embodiment) are stored in the data body is generated as the "announcement data", and the frame data is broadcast (transmitted using a broadcast address as the destination) by a connection method based on the n-th channel of the m-th wireless LAN standard (see "ANNOUNCEMENT 11"-"ANNOUNCEMENT 3*j*" in FIG. 3). In a connection method instruction process (FIG. 4) which will be described later, the access point 10 which received the announcement data returns request reminder data (see "REQUEST REMINDER" in FIG. 3) if (the content of) the announcement data has already been registered, otherwise (if the announcement data has not been registered yet) registers the announcement data without returning the request reminder data (see "ANNOUNCEMENT 12" in FIG. 3). Incidentally, the "request reminder data" is frame data which is used by the access point 10 for reminding the wireless station (printer 20) to send a request for permission for wireless connection (association request) to the access point 10. In the request reminder data, the SSID which is used by the access point 10 for data communication with the wireless stations is stored.

Subsequently, a timer is started (S150). The timer started in this step will be used for checking whether or not the request reminder data is returned within a preset time limit.

Subsequently, whether or not a timeout has occurred since the transmission of the announcement data is checked (S160). In this step, the timeout is judged to have occurred if the timer started in the step S150 has counted a preset length of time (250 msec in this embodiment).

If the timeout has not occurred (S160: NO), whether the request reminder data has been received from the access point 10 or not is checked (S170). If the request reminder data has not been received yet (S170: NO), the process returns to the step S160.

After repeating the steps S160 and S170, if the timeout since the transmission of the announcement data occurs (S160: YES), the timer started in the step S150 is stopped and reset (S180) and the variable N is incremented by 1 (n+1→N) (S190).

Subsequently, whether the transmission of the announcement data has been finished by use of all the channels of the m-th wireless LAN standard or not is checked (S200). Since the number of usable channels is specified and fixed in each wireless LAN standard, the transmission of the announcement data by all the channels is judged to have finished in the step S200 if the value n of the variable N has become larger than the number (j) of usable channels of the m-th wireless LAN standard (n>j).

If the transmission of the announcement data by all the channels of the m-th wireless LAN standard has not been finished (S200: NO), the process returns to the step S130. Thereafter, the sequence from the step S130 to the step S200 is repeated and thereby the transmission of the announcement data is successively carried out by use of each channel of the m-th wireless LAN standard (see "ANNOUNCEMENT 11"- "ANNOUNCEMENT 1f" in FIG. 3).

After repeating the sequence from the step S130 to the step S200, if the transmission of the announcement data by all the channels of the m-th wireless LAN standard has been finished (S200: YES), the variable M is incremented by 1 (m+1→M) (S210).

Subsequently, whether the transmission of the announcement data has been finished by use of all the wireless LAN standards or not is checked (S220). In this step, the transmission of the announcement data by all wireless LAN standards is judged to have finished if the value m of the variable M has become larger than the number (i) of wireless LAN standards that can be used by the wireless LAN controller 24 for realizing communication (m>i).

If the transmission of the announcement data by all the wireless LAN standards has not been finished (S220: NO), the process returns to the step S120.

Figure 3:
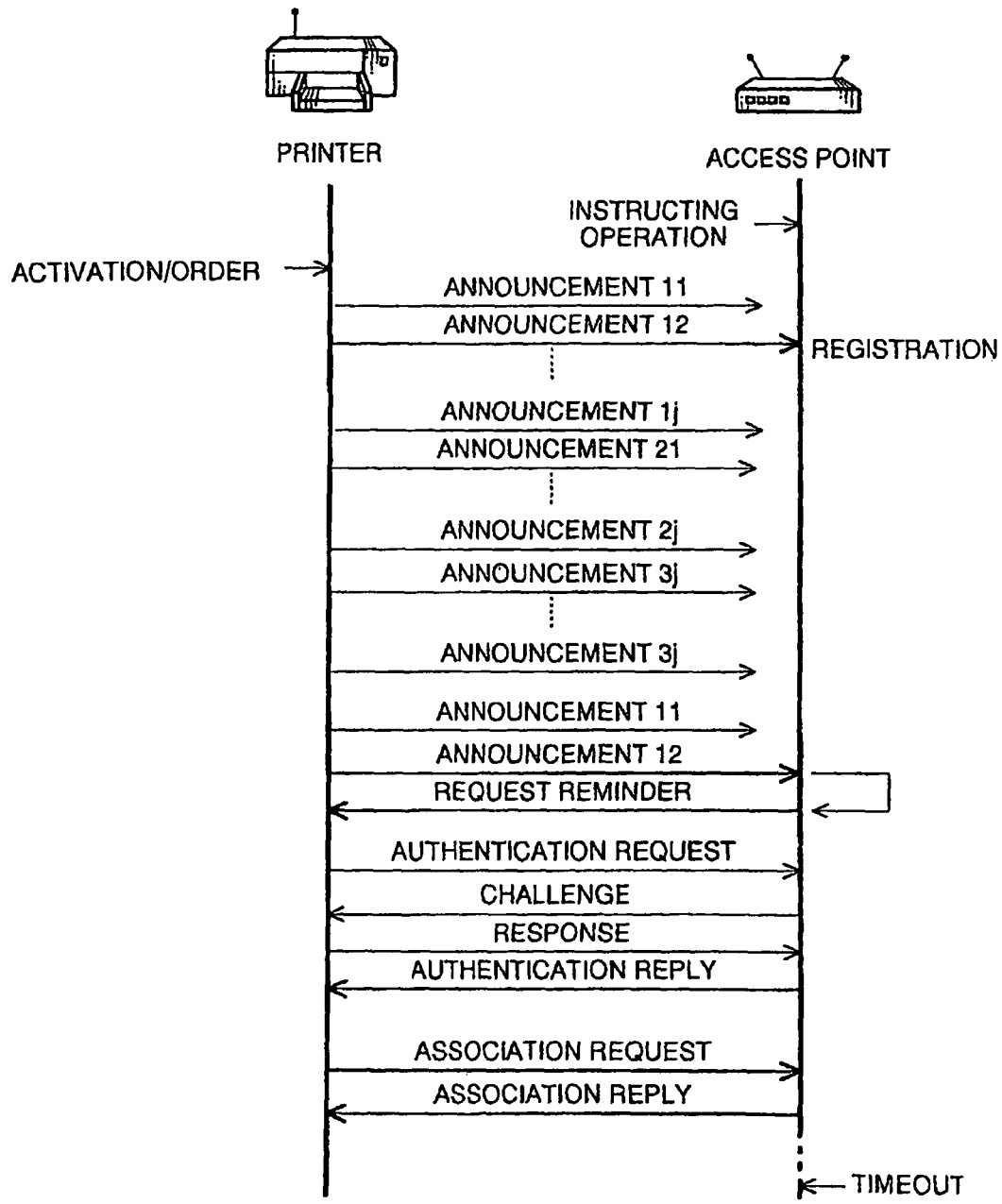
FIG. 3 is a sequence chart showing communication of data between an access point and a printer in the first embodiment.

Thereafter, the transmission of the announcement data by use of the next wireless LAN standard is carried out by the sequence from the step S120 (see "ANNOUNCEMENT 21"- "ANNOUNCEMENT 2f" in FIG. 3). By repeating the sequence from the step S120 to the step S220, the transmission of the announcement data is successively carried out by use of all the wireless LAN standards (see "REQUEST 11"- "REQUEST 1f" in FIG. 3).

After repeating the sequence from the step S120 to the step S220, if the transmission of the announcement data by all the wireless LAN standards has been finished (S220: YES), the process returns to the step S110.

During the repetition of the sequence from the step S120 to the step S220, if the request reminder data is received (S170: YES), the timer started in the step S150 is stopped and reset (S230) and the SSID specified by the request reminder data is stored in the RAM 23 as the SSID to be used for the data communication with the wireless access point (S240). By the storage of the SSID in this step, the printer 20 becomes capable of realizing data communication with a wireless access point (access point 10) that can establish communication by an SSID identical with the stored SSID.

Subsequently, an association request for requesting permission for wireless connection is transmitted to the access point 10 (S250). The "association request" is frame data (management frame) which is used for requesting permission for wireless connection to the access point 10. In the step S250, the SSID stored in the RAM 23 in the step S240 is stored in the association request and transmitted (see "ASSOCIATION REQUEST" in FIG. 3). In the header of the association request, the device ID (MAC address) of the printer 20 is stored. From the access point 10 which received the association request, an association reply, as frame data (management frame) indicating the permission for the wireless connection to the access point 10, is returned (see "ASSOCIATION REPLY" in FIG. 3).

Subsequently, another timer is started (S260). The timer started in this step will be used for checking whether or not the association reply is returned within a preset time limit.

Subsequently, whether or not a timeout has occurred since the transmission of the association request is checked (S270). In this step, the timeout is judged to have occurred if the timer started in the step S260 has counted a preset length of time (250 msec in this embodiment).

If the timeout has not occurred (S270: NO), whether the association reply has been received from the access point 10 or not is checked (S280). If the association reply has not been received yet (S280: NO), the process returns to the step S270.

After repeating the steps S270 and S280, if the timeout since the transmission of the association request occurs (S270: YES), the timer started in the step S260 is stopped and reset (S290) and the process returns to the step S110.

Meanwhile, if the association reply is received in the step S280 (S280: YES), the timer started in the step S260 is stopped and reset (S300), the parameters and the SSID stored in the storage area of the RAM 23 for the "parameters indicating the connection method" in the step S130 are stored in (copied to) the ROM 22 so that the connection method will be controlled by the memory content of the ROM 22 (S301), and the connection method settling process is ended.

At the point when the connection method settling process is ended, the switching of the connection method by the step S130 is stopped, by which the connection method at the point when the switching is stopped (m-th wireless LAN standard, n-th channel) is settled (determined) as the connection method for the wireless connection to the wireless access point.

<Connection Method Instruction Process by Access Point 10>

In the following, a connection method instruction process which is conducted by the CPU 11 of the access point 10 will be described referring to FIG. 4. The connection method instruction process is started when an instructing operation for switching the operation mode of the access point 10 into a "support mode" (for supporting the setting of the connection method of the wireless station) is made by the user to the operation panel 16 (e.g. pressing a particular button). Incidentally, the support mode is an operation mode which is enabled only in the connection method instruction process. When the connection method instruction process is ended, the operation mode of the access point 10 is returned from the support mode to "normal mode".

First, a timer is started (S310). The timer started in this step will be used for checking whether or not the announcement data is transmitted from the printer 20 (step S140 of FIG. 2) within a preset time limit after the aforementioned instructing operation. Therefore, the user sets the connection method (for the wireless connection to the access point 10) to the printer 20 by letting the printer 20 start the aforementioned connection method settling process (FIG. 2) after letting the access point 10 start this connection method instruction process (see "INSTRUCTING OPERATION" to the access point 10 and "ACTIVATION" to the printer 20 in FIG. 3).

Subsequently, whether or not a timeout has occurred since the start of the connection method instruction process is checked (S320). In this step, the timeout is judged to have occurred if the timer started in the step S310 has counted a preset length of time (15 sec in this embodiment).

If the timeout has not occurred (S320: NO), whether data has been received from the printer 20 or not is checked (S330). If no data has been received yet (S330: NO), the process returns to the step S320. Incidentally, the access point 10 can not receive and recognize data as normal data if the data has not been transmitted according to the connection method set to the access point 10 itself (i.e. the connection method specified by the parameters stored in the ROM 12). Therefore, in the step S330, whether data transmitted according to the connection method set to the access point 10 itself ("ANNOUNCEMENT 12" in FIG. 3 in this embodiment) has been received or not is checked.

Meanwhile, if data is received from the printer 20 in the step S330 (S330: YES), whether the received data is the announcement data or not is checked (S340). The "announcement data" is the data which is transmitted by the printer 20 in the step S140 of FIG. 2.

If the received data is the announcement data (S340: YES), whether the announcement data has already been registered or not is checked (S350). In the connection method instruction process, the device name specified by the announcement data is registered in the following step (see "REGISTRATION" in FIG. 3), therefore, the announcement data is judged in the step S350 to have already been registered if the device name specified by the received announcement data has already been registered. Incidentally, the announcement data that is judged by the step S350 to have already been registered is announcement data that is received for the second time since the start of the connection method instruction process (see "ANNOUNCEMENT 12" in FIG. 3).

If the announcement data has not been registered yet (S350: NO), the device name and the device ID specified by the announcement data are registered (e.g. registration with a data table) by storing them in a particular storage area of the RAM 13 (S360).

Meanwhile, if the announcement data has already been registered (S350: YES), the request reminder data (for requesting the transmission of the association request) is transmitted to the printer 20 which transmitted the announcement data (S370). In this step, the "request reminder data" as frame data for requesting the transmission of the association request, containing the "SSID" stored in the ROM 12, is generated and transmitted to the printer 20 (see "REQUEST REMINDER" in FIG. 3). The request reminder data is the data which is received by the printer 20 in the step S170 of FIG. 2. After the reception of the request reminder data, the printer 20 transmits not the announcement data but the association request (see "ASSOCIATION REQUEST" in FIG. 3).

After finishing the step S360 or S370, the process returns to the step S320.

If the received data is not the announcement data in the step S340 (S340: NO), whether the received data is the association request or not is checked (S380). The "association request" is the data which is transmitted by the printer 20 in the step S250 of FIG. 2.

If the received data is the association request in the step S380 (S380: YES), the association reply (indicating the permission for the wireless connection to the access point 10) is transmitted to the printer 20 which transmitted the association request (S400) and the process returns to the step S320. The association reply is the data which is received by the printer 20 in the step S280 of FIG. 2 (see "ASSOCIATION REPLY" in FIG. 3). In the printer 20, the connection method at the point of the reception of the association reply is set as the connection method for the wireless connection to the access point 10.

In this embodiment, although detailed explanation is omitted, before the exchange of the association request and association reply, an authentication request and an authentication reply are exchanged between the printer 20 and the access point 10 (similarly to ordinary wireless connection procedures) after the request reminder data from the access point 10 is received by the printer 20 (see "AUTHENTICATION REQUEST"-"AUTHENTICATION REPLY" in FIG. 3). Incidentally, since the first embodiment does not employ encryption for data communication, the exchange of the authentication request/reply is done as open authentication (authentication without encryption).

Meanwhile, if the received data is not the association request in the step S380 (S380: NO), a process depending on the type of the received data (other process) is carried out (S410) and the process returns to the step S320.

After repeating the sequence from the step S320 to the step S410 as above, if the timeout has occurred in the step S320 (S320: YES), the timer started in the step S310 is stopped and reset (S420) and the connection method instruction process is ended. As above, the operation mode of the access point 10 is returned from the support mode to the normal mode with the end of the connection method instruction process.

In the wireless LAN system composed as above, the printer 20 transmits the announcement data according to each of a plurality of connection methods while successively switching the connection method in turn (see "ANNOUNCEMENT 11"-"ANNOUNCEMENT 3f" in FIG. 3). The announcement data is received by an access point 10 whose connection method has been set to the connection method of the printer 20 at the point of the transmission of the announcement data (see "ANNOUNCEMENT 12" in FIG. 3), and the access point 10 notifies the printer 20 that wireless connection by use of the same connection method as the received announcement data is possible, by transmitting the request reminder data (see "REQUEST REMINDER" in FIG. 3). The printer 20 which received the request reminder data sets the connection method notified by the request reminder data (i.e. the connection method set to the access point 10) to itself. By setting the printer 20 to the same connection method as the access point 10 as above, wireless connection between the access point 10 and the printer 20 becomes possible.

As above, in the printer 20, the connection method for the connection to the access point 10 is set automatically via the switching of the connection method and the transmission of the announcement data. Therefore, the load on the user regarding the wireless LAN settings can be lightened remarkably.

The printer 20 successively switches the connection method in turn at preset time interval counted by the timer (steps S110-S220 in FIG. 2) and stops the connection method switching after the request reminder data is received. Only by stopping the successive switching of the connection method as above, the printer 20 can set the connection method at the point of the stop of the connection method switching (that is, the connection method set to the access point 10) to itself.

The setting of the connection method to the printer 20 can be made (the connection method settling process (FIG. 2)) by explicitly ordering from outside by activating the printer 20.

When the connection method has been set to the printer 20, the wireless connection between the printer 20 and the access point 10 can be realized immediately by the exchange of the association request and the association reply.

In the connection method instruction process (FIG. 4), the access point 10 can set the connection method to a wireless station (printer 20) successively transmitting the announcement data twice according to the same connection method, by transmitting the request reminder data to the wireless station (see "REQUEST REMINDER" in FIG. 3).

The operation mode of the access point 10 is returned from the support mode to the normal mode when the connection method instruction process (FIG. 4) is ended when a prescribed time period has passed since the switching of the operation mode to the support mode. Therefore, the operation mode can be returned from the support mode to the normal mode automatically without the need of an operation by the user for returning the operation mode to the normal mode, by which accidental setting of a connection method to a wireless station caused by the access point 10 left in the support mode can be prevented.

Figure 2:
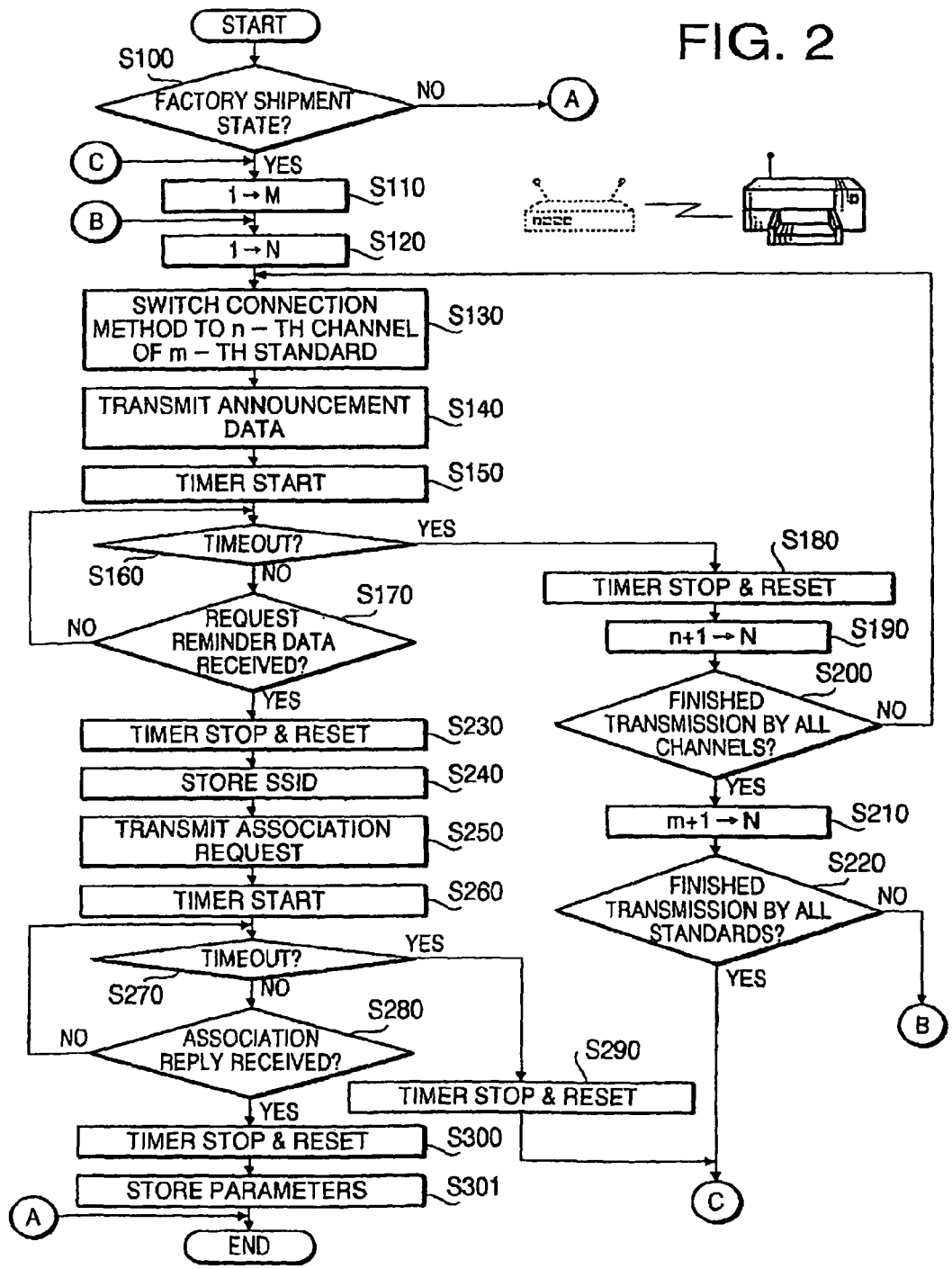
FIG. 2 is a flowchart showing the procedure of a connection method settling process in a first embodiment.

Meanwhile, the printer 20 is capable of setting its connection method for the wireless connection to the access point 10 only when the printer 20 is in the factory shipment state (step S100 in FIG. 2).

Figure 4:
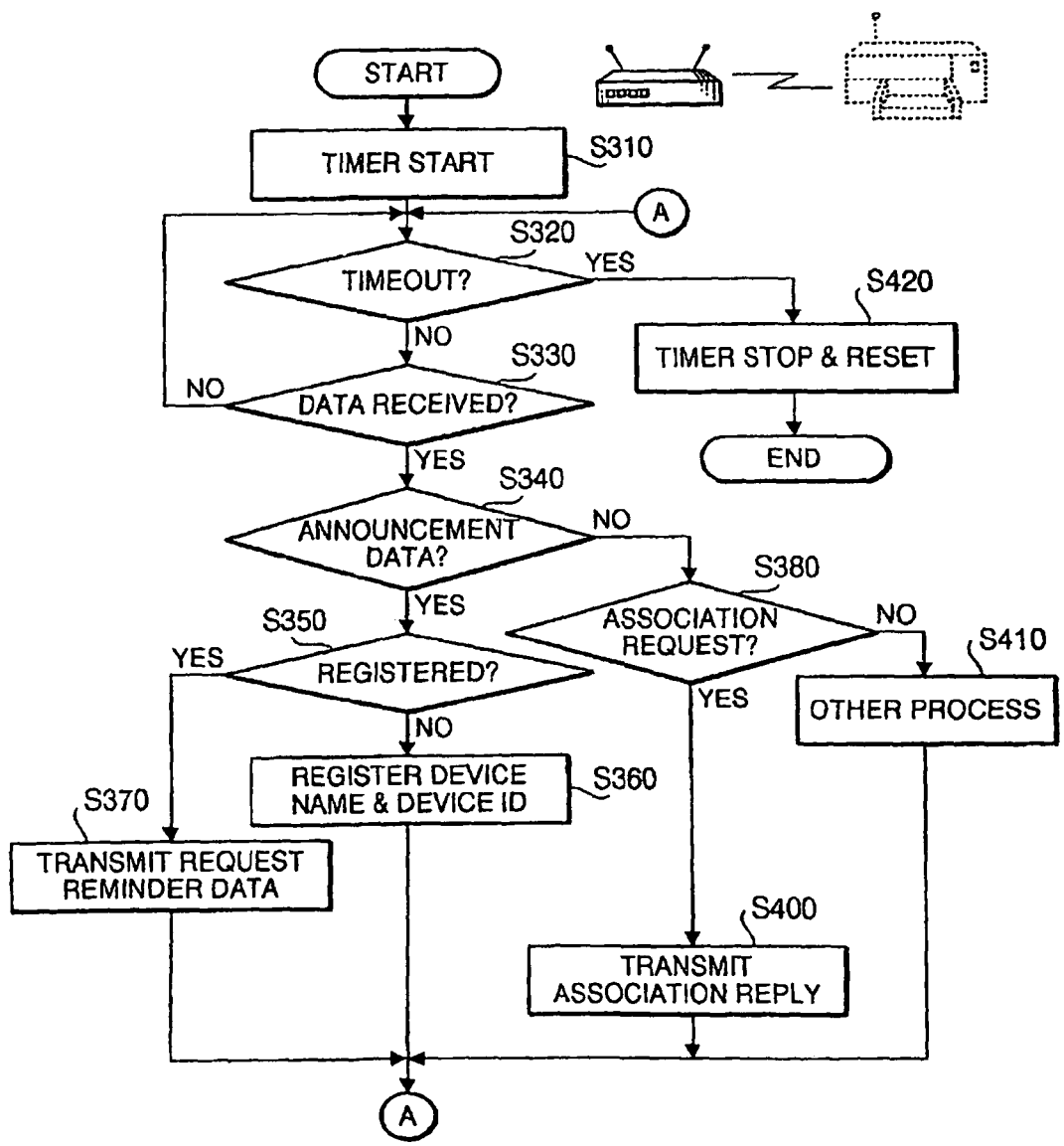
FIG. 4 is a flowchart showing the procedure of a connection method instruction process in the first embodiment.

The access point 10 collects (registers) the announcement data in the steps S340-S360 of FIG. 4, and when announcement data transmitted from a wireless station according to the same connection method as the collected announcement data is received, transmits the request reminder data to the wireless station (step S370). Therefore, the access point 10 can transmit the request reminder data when the announcement data is transmitted by the wireless station, that is, while the wireless station is capable of transmitting/receiving data, by which the request reminder data transmitted by the access point 10 is received by the wireless station securely.

Modification of Embodiment 1

The first embodiment can also be implemented with part of its composition altered to other composition as shown below. Incidentally, the composition shown below is also applicable to similar parts of other embodiments.

For example, while the process from the step S110 is executed only when the printer 20 is in its factory shipment state (S100 of FIG. 3), it is also possible to configure the printer 20 to execute the process from the step S110 even if it is not in the factory shipment state, in cases where the setting of the connection method is necessary (e.g. when part of the "parameters indicating the connection method" stored in the ROM 22 is lacking).

While the association request and association reply are exchanged after the exchange of the authentication request and authentication reply in the above embodiment, it is also possible to omit the authentication request/reply and carry out the exchange of the association request/reply only.

In the above embodiment, the access point 10 can receive data by the preset connection method only. At the point of the reception of the announcement data, the access point 10 recognizes that the connection method announced by the announcement data is the same as the connection method which has been set to the access point 10 itself. Therefore, the "announcement data" transmitted by the printer 20 does not contain parameters indicating the connection method. However, such parameters may also be stored in the announcement data.

While the setting of the connection method to the printer 20 is ordered and started by the activation of the printer 20 in the above embodiment, the order can also be issued by, for example, a particular operation through the operation panel 26 (see "ORDER" in FIG. 3). The order may also be issued by data which is sent from another communication terminal which is connected with the printer 20 to communicate data.

While the operation mode of the access point 10 is switched by the instructing operation in the above embodiment, the access point 10 may also be configured to switch its operation mode when instructed by data which is sent from another communication terminal connected with the access point 10 to communicate data.

While the access point 10 in the above embodiment is configured to transmit the request reminder data repeatedly until the timeout occurs in the connection method instruction process (by the return from the step S370 to the step S320), the access point 10 may also be configured to end the connection method instruction process (specifically, advance to the step S420) after the transmission of the request reminder data. In this case, even in the prescribed time period after the switching of the operation mode to the support mode, the operation mode can be returned to the normal mode when the request reminder data is transmitted once. Therefore, the support for the setting of the connection method can be provided only to the same number of wireless stations as the number of transmission (1) of the request reminder data. In this configuration, the access point 10 may count the number of transmission of the request reminder data and advance to the step S420 when the count has reached a prescribed number. In this case, the access point 10 may transmit the request reminder data and switch its operation mode to the normal mode immediately after the reception of announcement data from a wireless station, without carrying out the registration of the announcement data.

While the printer 20 in the above embodiment checks whether its in the factory shipment state or not (S100 in FIG. 2) just after starting the connection method settling process and then executes the process from the step S110, the timing of the check on the factory shipment state is not limited to the point just after the start of the connection method settling process. For example, the check may be executed between the steps S240 and S250.

While special-purpose frame data are employed as the "announcement data" and the "request reminder data" in the above embodiment, data of known type specified in the wireless LAN standards may also be employed as the "announcement data" and the "request reminder data". Possible data include the probe request and probe reply. However, when the probe request and probe reply are employed, the printer 20 might respond to a probe reply from a wireless access point other than the access point 10 and establish wireless connection without distinction, by which the establishment of the wireless connection with the access point 10 might become difficult. Such a state is not desirable for ensuring network security. Therefore, it is desirable to configure the access point 10 to transmit a probe reply containing parameters explicitly indicating that the setting of the printer 20 will be made as the "request reminder data" when a probe request transmitted as the "announcement data" is received, and configure the printer 20 to make the setting only when the probe reply (containing the parameters explicitly indicating that the setting will be made) is received as the "request reminder data".

Embodiment 2

A wireless LAN system in accordance with a second embodiment of the present invention is composed similarly to the system of the first embodiment except for some steps executed by the access point 10, therefore, only the point of difference will be explained below.

<Connection Method Instruction Process by Access Point 10>

In the following, a connection method instruction process which is conducted by the CPU 11 of the access point 10 will be described referring to FIG. 6. The connection method instruction process is configured by replacing part (sequence from the step S350) of the connection method instruction process in the first embodiment (FIG. 4) with the following procedure. In the following explanation, steps identical with those of the first embodiment will be referred to with the same step Nos. and detailed explanation thereof is omitted for brevity.

If the announcement data has not been registered yet in the step S350 (S350: NO), parameters specified by the announcement data are registered (e.g. registration with a data table) by storing them in a particular storage area of the RAM 13 (S352). The step S352 is similar to the step S360 in FIG. 4; however, not only the device name and the device ID but also the reception level (radio field intensity) when the announcement data was received are registered in the step S352 associating them with one another. FIG. 5 shows an example of a data table with which the parameters specified by the announcement data are registered.

After finishing the step S352, or if the announcement data has already been registered in the step S350 (S350: YES), the process returns to the step S320.

Incidentally, at the point when the step S340 is executed, the access point 10 transmits no request reminder data and receives no association request. Therefore, if the received data is not the announcement data in the step S340 (S340: NO), the access point 10 returns to the step S320 after carrying out the aforementioned "other process" (S410).

After repeating the steps S320-S410, if the timeout has occurred in the step S320 (S320: YES), the timer started in the step S310 is stopped and reset (S420).

Subsequently, whether or not the registration of parameters has been carried out in the step S352 is checked (S510). In this step, the registration of parameters in the step S352 is judged to have been carried out if data written by the step S352 have been stored in the particular storage area of the RAM 13.

If the parameter registration has not been carried out (S510: NO), the connection method instruction process is ended. Meanwhile, if the parameter registration has been carried out (S510: YES), another timer is started (S520). The timer started in this step will be used for checking whether or not the announcement data is transmitted again from the printer 20 within a preset time limit after the registration of the announcement data.

Subsequently, whether or not a timeout has occurred since the registration of the announcement data is checked (S530). In this step, the timeout is judged to have occurred if the timer which was started in the step S520 has counted a preset length of time (15 sec in this embodiment).

If the timeout has not occurred (S530: NO), whether data has been received from the printer 20 or not is checked (S540). If no data has been received (S540: NO), the process returns to the step S530.

If data has been received from the printer 20 (S540: YES), whether or not the received data is the announcement data or not is checked (S550). This step is a step similar to the step S340 of FIG. 4.

If the received data is the announcement data (S550: YES), whether the announcement data has already been registered or not is checked (S560). This step is a step similar to the step S350 of FIG. 4.

If the announcement data has not been registered yet (S560: NO), the process returns to the step S530.

Meanwhile, if the announcement data has already been registered (S560: YES), whether the reception level in the parameters which have been registered regarding the announcement data is the highest reception level among all the parameters or not is checked (S570).

If the reception level is not the highest (S570: NO), the process returns to the step S530. If the reception level is the highest (S570: YES), the request reminder data is transmitted (S370) and the process returns to the step S530.

In the step S550, if the received data is not the announcement data (S550: NO), whether the received data is the association request or not is checked (S380).

If the received data is the association request (S380: YES), the association reply (indicating the permission for the wireless connection to the access point 10) is transmitted to the printer 20 which transmitted the association request (S400) and the process returns to the step S530.

Meanwhile, if the received data is not the association request (S380: NO), the aforementioned "other process" depending on the type of the received data is carried out similarly to the step S410 (S580) and the process returns to the step S530.

After repeating the sequence from the step S530, if the timeout has occurred in the step S530 (S530: YES), the timer started in the step S520 is stopped and reset (S590) and the connection method instruction process is ended.

In the wireless LAN system composed as above, the following effects can be achieved in addition to the effects attained by the first embodiment.

Figure 6:
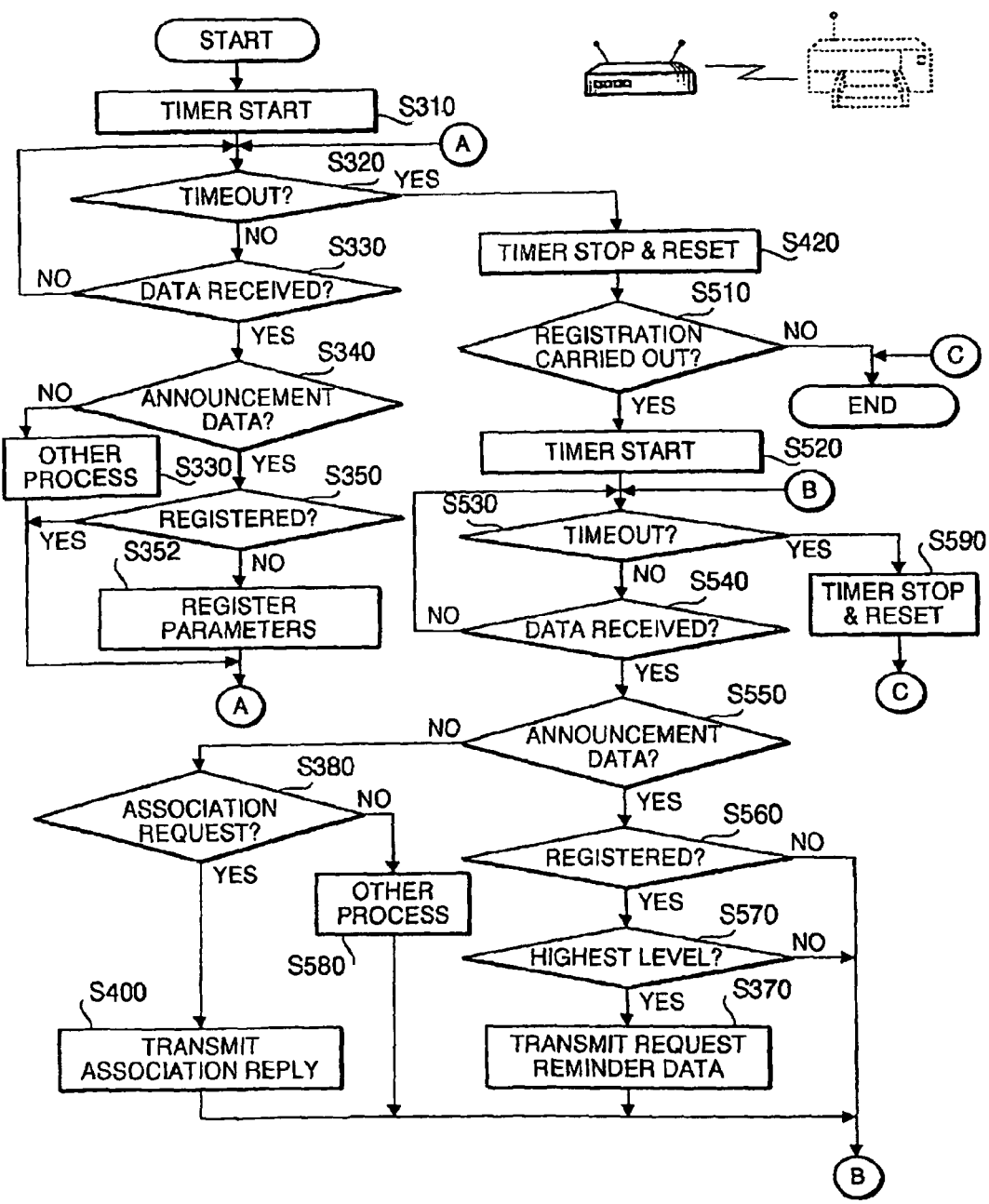
FIG. 6 is a flowchart showing the procedure of a connection method instruction process in a second embodiment.

The access point 10 is capable of setting the connection method to the wireless station transmitting the announcement data of the highest reception level by transmitting the request reminder data to the wireless station (steps S570 and S370 in FIG. 6).

Modification of Embodiment 2

The second embodiment can also be implemented with part of its composition altered to other composition as shown below. Incidentally, the composition shown below is also applicable to similar parts of other embodiments.

For example, while the step S570 judges whether or not the reception level in the parameters registered regarding the received announcement data is the highest reception level among all the parameters, the step S570 may also be configured to judge whether or not the device ID in the parameters registered regarding the received announcement data is identical with the device ID at the point of the reception of the announcement data in the step S540. In this case, even when the same announcement data as the registered announcement data is received, the access point 10 cancels the transmission of the request reminder data and the setting of the connection method if the device ID specified by the received announcement data is not identical with the device ID on the previous registration of the announcement data. By this, a wireless station trying to illicitly establish wireless connection with the access point 10 by forging announcement data registered with the access point 10 and transmitting the announcement data can be prevented from the wireless connection.

Embodiment 3

A wireless LAN system in accordance with a third embodiment of the present invention is composed similarly to the system of the second embodiment except for some steps executed by the access point 10, therefore, only the point of difference will be explained below.

<Connection Method Instruction Process by Access Point 10>

In the following, a connection method instruction process which is conducted by the CPU 11 of the access point 10 will be described referring to FIG. 7. The connection method instruction process is configured by adding steps S512 and S514 (explained below) after the step S510 of the connection method instruction process of the second embodiment (FIG. 6) and replacing the step S570 with a step S562 (explained below), therefore, only the procedure different from the second embodiment will be described in detail.

If the parameter registration has been carried out in the step S510 (S510: YES), the user is notified of each device name represented by the parameter registered for each announcement data (S512). In this step, the notification is executed by displaying a list of device names represented by the registered parameters on the display panel 17. After the list is displayed on the display panel 17, the user can carry out a selection operation, for selecting one or more device names from the list, through the operation panel 16.

The selection operation is waited for until it is made by the user (S514: NO).

When the selection operation is made (S514: YES), the process advances to the step S520. Incidentally, to each parameter corresponding to each device name selected by the selection operation, a selection flag indicating the selection by the selection operation is set (initial value "0" is turned into "1").

In the step S560, if the received announcement data has already been registered (S560: YES), whether the selection flag has been set to the parameter which has been registered regarding the announcement data or not is checked (S562) instead of executing the step S570.

If the selection flag has been set (S562: YES), the process advances to the step S370, otherwise (S562: NO), the process returns to the step S530.

In the wireless LAN system composed as above, the following effects can be achieved in addition to the effects attained by the second embodiment.

Figure 7:
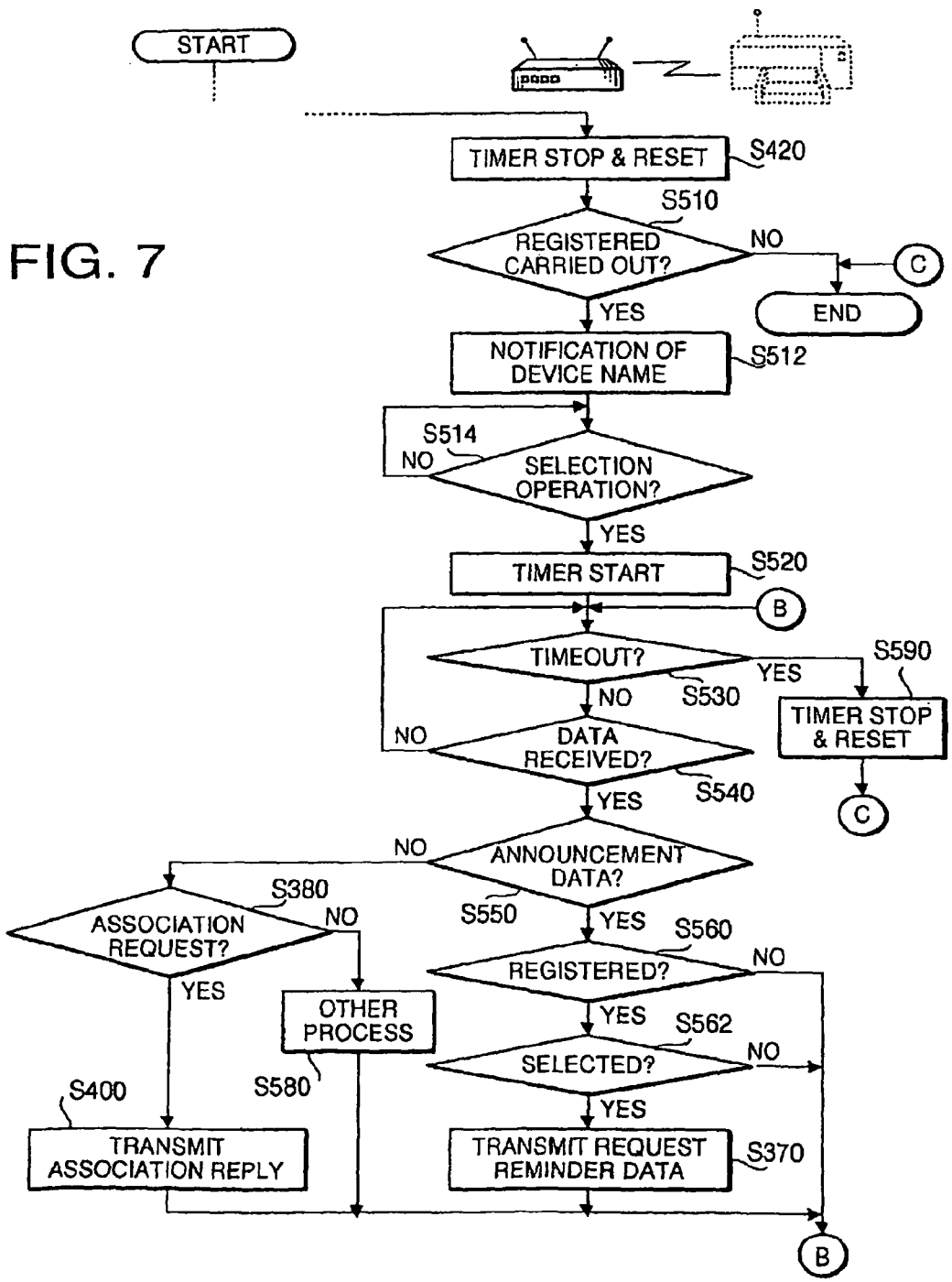
FIG. 7 is a flowchart showing the procedure of a connection method instruction process in a third embodiment.

The access point 10 is capable of setting the connection method only to the wireless station(s) (e.g. printer 20) having the device name arbitrarily selected by the user, by transmitting the request reminder data (see steps S512, S514 and S562 in FIG. 7).

Modification of Embodiment 3

The third embodiment can also be implemented with part of its composition altered to other composition as shown below. Incidentally, the composition shown below is also applicable to similar parts of other embodiments.

For example, while the selection operation in the steps S512 and S514 of FIG. 7 is carried out by the user based on device names, the selection operation may also be conducted based on device IDs instead of the device names. In this case, the connection method can be set only to wireless station(s) having the device ID(s) arbitrarily selected by the user.

Embodiment 4

A wireless LAN system in accordance with a fourth embodiment of the present invention is composed similarly to the system of the third embodiment. The fourth embodiment is configured so that the notification of device names and the selection operation (steps S512 and S514) carried out by the access point 10 in the third embodiment can be executed by a commonly used computer system 30 (hereinafter referred to as a "PC 30") which is connected to the access point 10 to communicate data via a cable 100.

<Connection Method Instruction Process by Access Point 10>

In the following, a connection method instruction process which is conducted by the CPU 11 of the access point 10 will be described referring to FIG. 8. The connection method instruction process is configured by replacing the steps S512 and S514 of the connection method instruction process of the third embodiment (FIG. 7) with steps S516 and S518 which will be explained below, therefore, only the procedure different from the third embodiment will be described in detail. The connection method instruction process is started after start instruction data is received from the PC 30 (see "START INSTRUCTION" in FIG. 9).

If the parameter registration has been carried out in the step S510 (S510: YES), listing data, representing the list of the device names specified by the registered parameters, is generated and transmitted to the PC 30 (the device which transmitted the start instruction data) (S516). The PC 30 which received the listing data (see "LISTING DATA" in FIG. 9) displays the list represented by the listing data on its display, by which the user is informed of the device names. Thereafter, when the selection operation (for selecting one or more device names from the device names on the list) is made by the user, selection data which can specify the selected device name(s) is transmitted to the access point 10 (see "SELECTION DATA" in FIG. 9).

After the transmission of the listing data in the step S516, reception of the selection data is waited for (S518: NO). When the selection data is received (S518: YES), the process advances to the step S520. Incidentally, in the step S370 executed later, the transmission of the request reminder data to wireless stations is carried out according to parameters (SSID, connection method) associated with the device name(s) specified by the selection data received in the step S518.

<Setting Instruction Process by PC 30>

Figure 10:
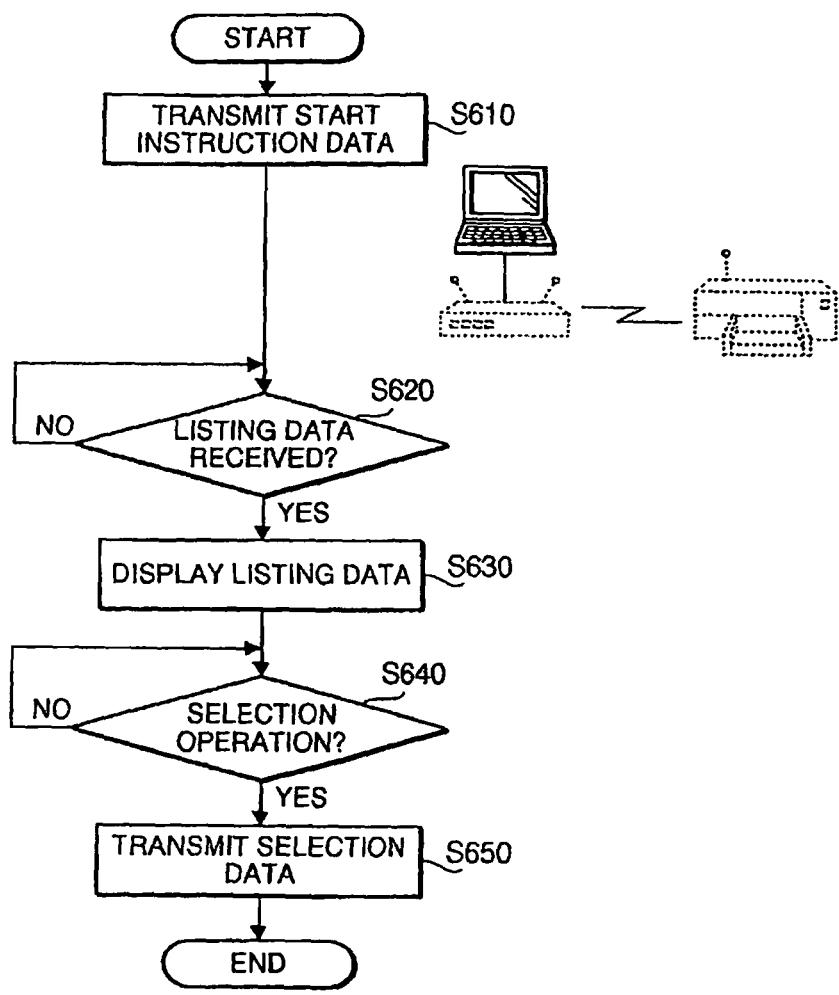
FIG. 10 is a flowchart showing the procedure of a setting instruction process in the fourth embodiment.

In the following, a setting instruction process which is conducted by the PC 30 will be described referring to FIG. 10. The setting instruction process is executed according to a program installed in the PC 30.

First, the start instruction data is transmitted to the access point 10 (S610). The access point 10 which received the start instruction data starts the aforementioned connection method instruction process of FIG. 8 (see "START INSTRUCTION" in FIG. 9) and transmits the aforementioned listing data after a while.

The listing data from the access point 10 is waited for until it is received (S620: NO).

Figure 11:
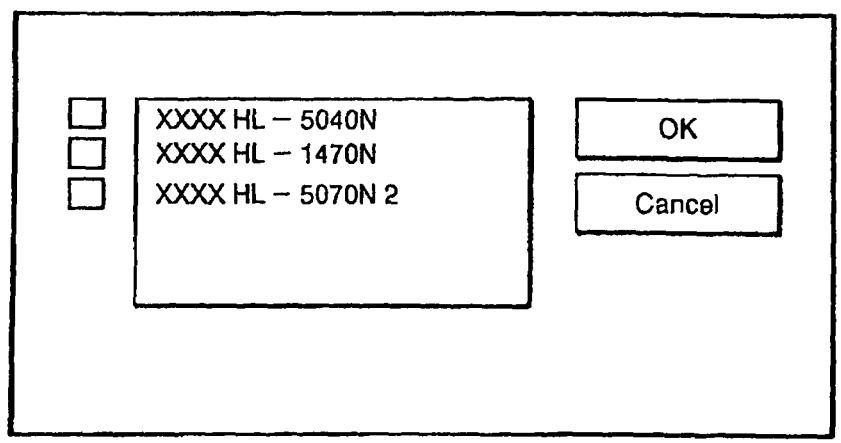
FIG. 11 is a schematic diagram showing a state in which contents of listing data are displayed.

When the listing data is received (S620: YES), the content of the listing data is displayed on the display of the PC 30 (S630). After the list of device names represented by the listing data is displayed (see FIG. 11), the user can make the selection operation (for selecting one or more device names) by use of a keyboard, mouse, etc.

The selection operation is waited for until it is made by the user (S640: NO). When the selection operation is made (S640: YES), the selection data which can specify the device name(s) selected by the selection operation is generated and transmitted to the access point 10 (S650).

In the wireless LAN system composed as above, the following effects can be achieved in addition to the effects attained by the third embodiment.

Figure 8:
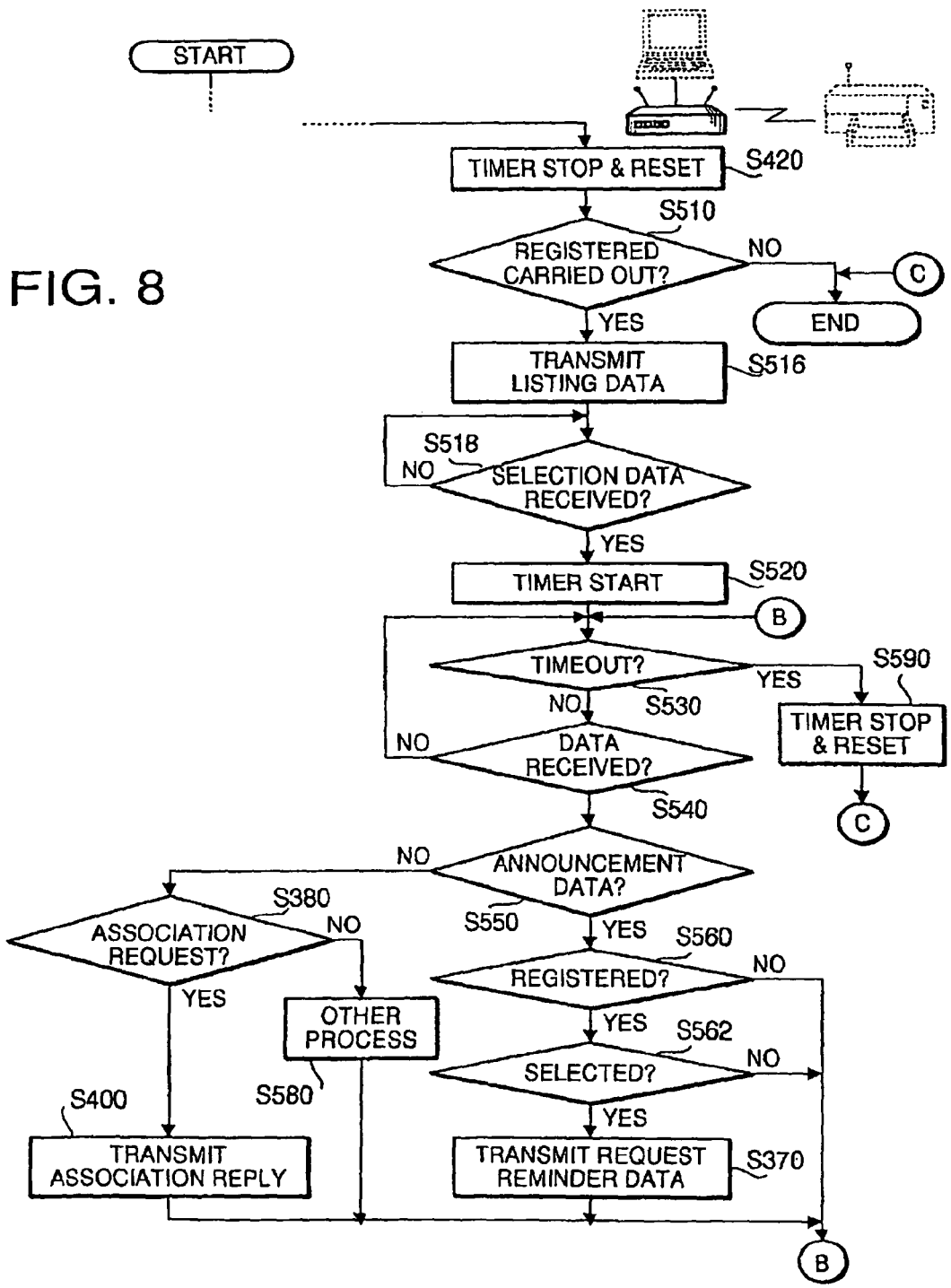
FIG. 8 is a flowchart showing the procedure of a connection method instruction process in a fourth embodiment.

The access point 10 is capable of setting the connection method only to the wireless station(s) (e.g. printer 20) having the device name(s) specified by the selection data received from the PC 30 (i.e. the device name(s) arbitrarily selected by the user from the registered device names) by transmitting the request reminder data to the wireless station(s) (see steps S516, S518 and S562 of FIG. 8).

Modification of Embodiment 4

The fourth embodiment can also be implemented with part of its composition altered to other composition as shown below. Incidentally, the composition shown below is also applicable to similar parts of other embodiments.

For example, while the access point 10 generates the listing data which represents the list of device names in the steps S516 and S518 of FIG. 8, the access point 10 may also be configured to generate and transmit listing data that represents a list of device IDs and thereby let the user of the PC 30 carry out the selection operation based on the device IDs instead of the device names. In this case, the connection method can be set only to the wireless station(s) having the device ID arbitrarily selected by the user of the PC 30 by transmitting the request reminder data to the wireless station(s).

Figure 9:
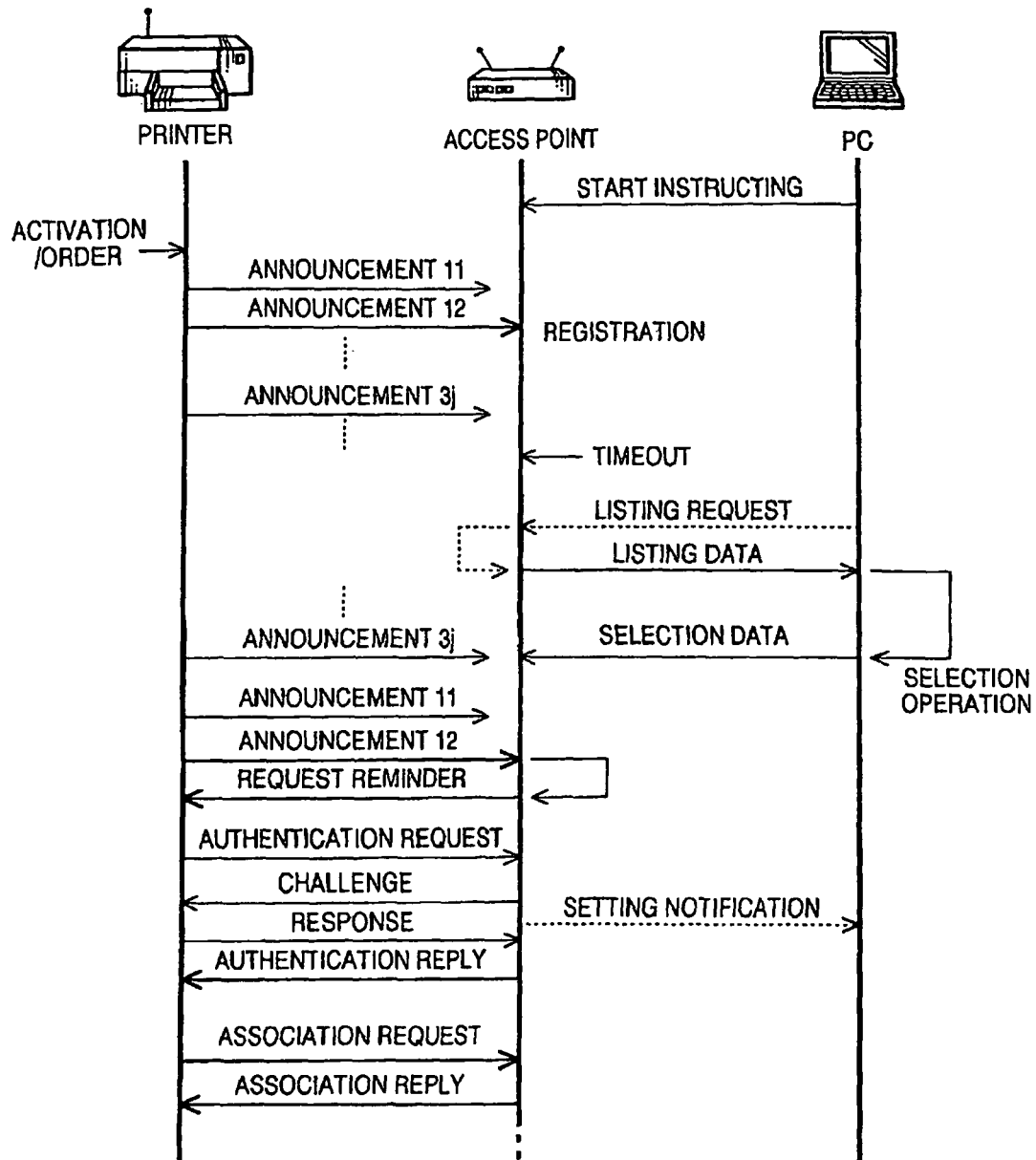
FIG. 9 is a sequence chart showing communication of data between the access point and the printer in the fourth embodiment.
Figure 12:
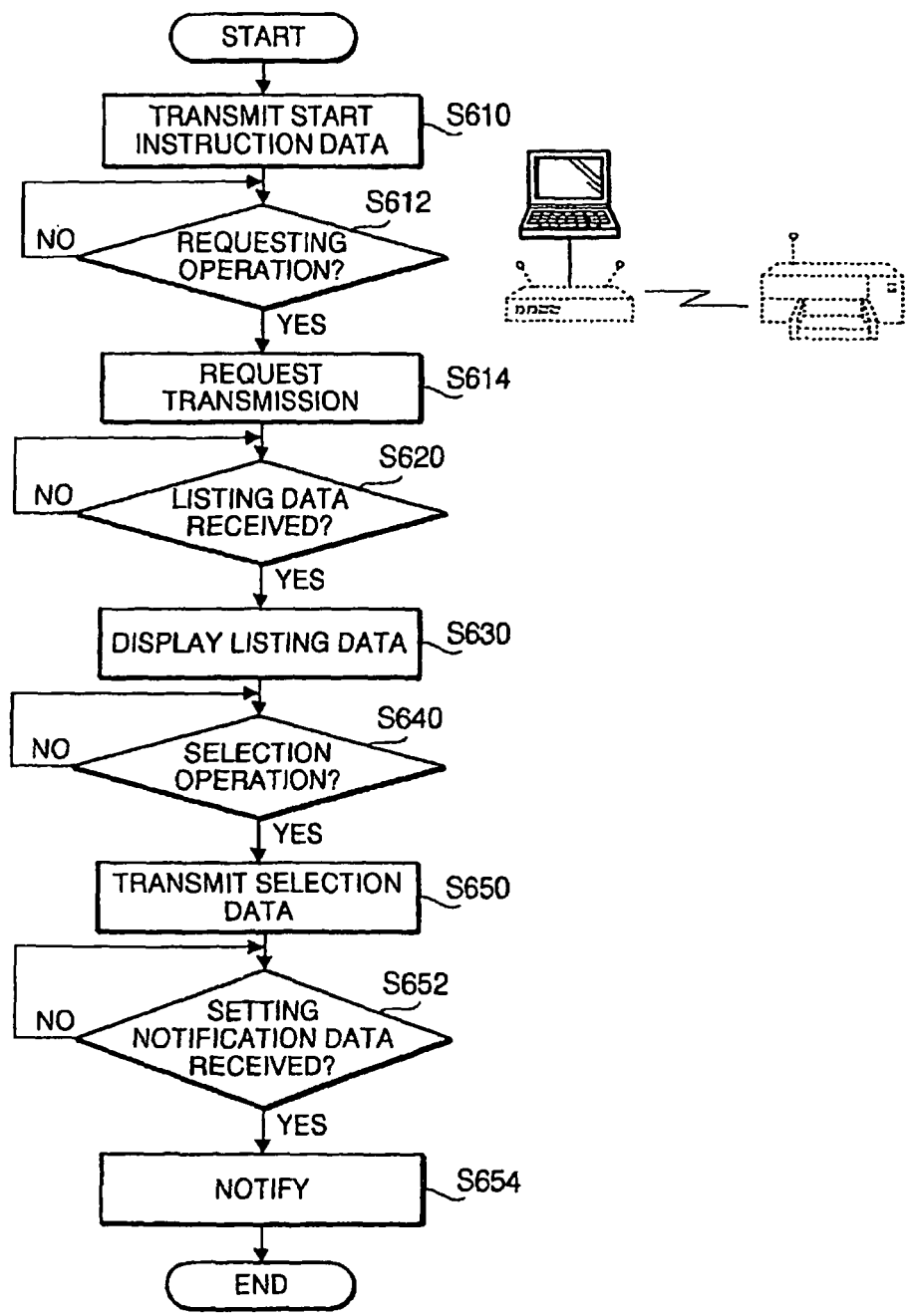
FIG. 12 is a flowchart (No. 2) showing the procedure of a setting instruction process in the fourth embodiment.
Figure 13:
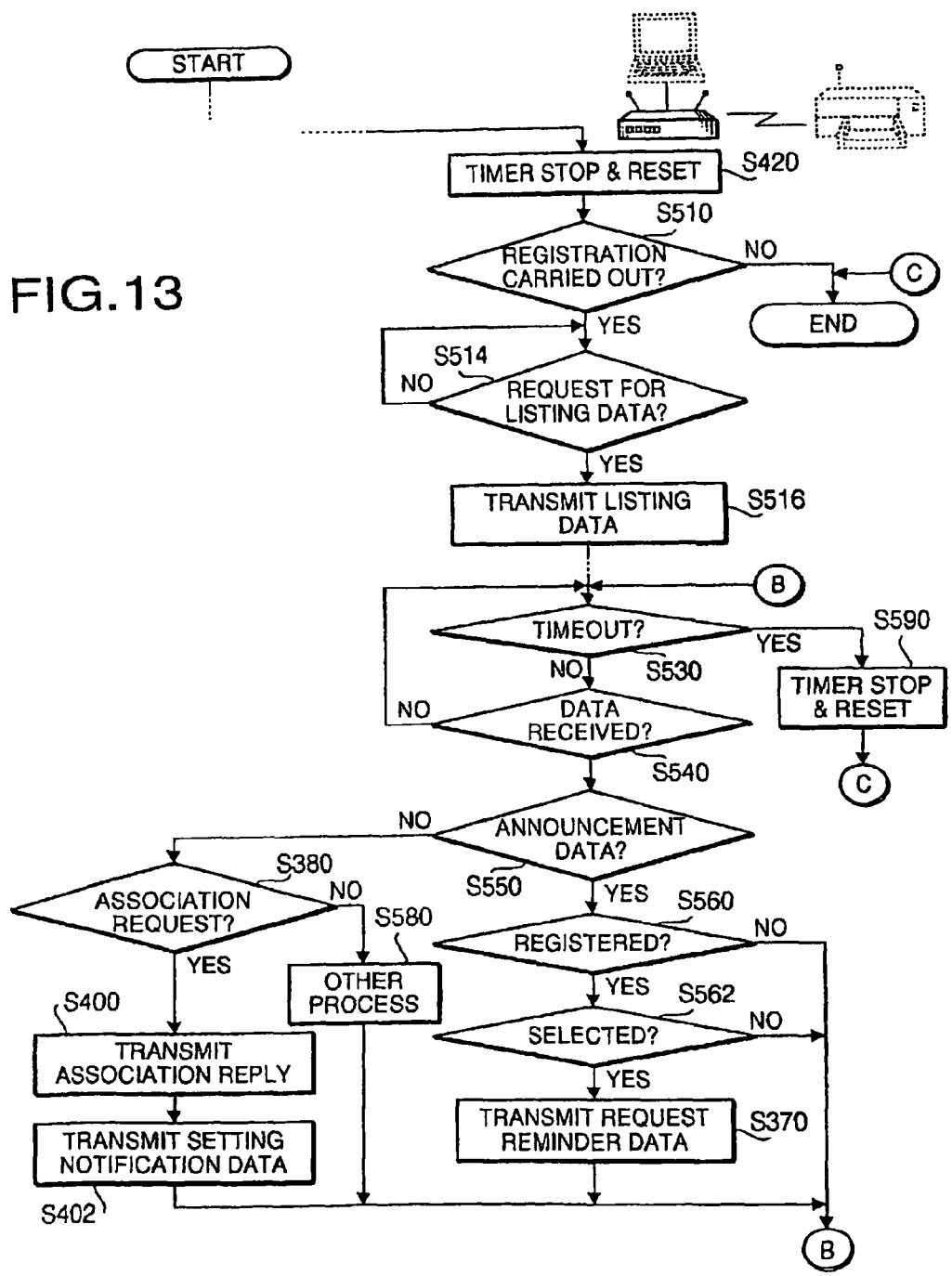
FIG. 13 is a flowchart showing the procedure of a connection method instruction process in the fourth embodiment.

While the access point 10 registers (collects) the parameters for a prescribed time period and thereafter transmits the listing data generated based on the collected parameters in the above embodiment, the access point 10 may also be configured to generate and the transmit the listing data at the point when a request for transmission is received from the PC 30 (see "LISTING REQUEST" in FIG. 9). For this configuration, a step for waiting for an operation requesting the listing data (step S612) is added between the steps S610 and S620 of FIG. 10 and a step for requesting (the transmission of) the listing data in response to the above operation (step S614) is added after the step S612 as shown in FIG. 12, and a step for waiting for the request from the PC 30 (step S515) is added between the steps S510 and S516 of FIG. 8 as shown in FIG. 13, for example. Also in this configuration, the selection operation may also be carried out based on the device IDs instead of the device names, similarly to the configuration mentioned above.

It is also possible in the above embodiment to configure the access point 10 to notify the PC 30 that the connection method has been set (or will be set) to the wireless station after the access point 10 has transmitted the request reminder data to the wireless station (printer 20). For this configuration, a step for transmitting setting notification data (for the notification of the execution of the setting) to the PC 30 (S402) is added after the step S400 of FIG. 8 as shown in FIG. 13, and a step for waiting for the setting notification data (S652) and a step for notifying the user that the connection method has been set to the wireless station in response to the reception of the setting notification data (S654) are added after the step S650 of FIG. 10 as shown in FIG. 12, for example.

Embodiment 5

In the embodiments described above, even if the printer 20 is connected to the access point 10 by wireless connection, if the access point 10 is configured to carry out data communication employing encryption, normal data communication is generally impossible without similarly configuring the printer 20 to execute the data communication employing the encryption. Therefore, the wireless LAN system of this embodiment is designed for letting the wireless LAN systems of the above described embodiments carry out data communication normally without the need of operations by the user.

First, if a "parameter regarding security" is stored in the ROM 12, the access point 10 starts executing communication with security measures based on the parameter. As the "parameter regarding security", an encryption key for carrying out the communication in an encrypted state (e.g. WEP (Wired Equivalent Privacy) key in this embodiment) can be employed for example. If an encryption key has been stored in the ROM 12, the access point 10 (CPU 11) carries out the communication with the wireless station by encrypting data with the encryption key. Incidentally, the encryption key is generated and stored in the ROM 12 by the aforementioned remote setup.

Meanwhile, if a "parameter regarding security" is stored in the ROM 22, the printer 20 starts executing communication with security measures based on the parameter. As the "parameter regarding security", an encryption key can be employed similarly to the case of the access point 10. If an encryption key has been stored in the ROM 22, the printer 20 (CPU 21) carries out the communication with the wireless access point by encrypting data with the encryption key.

<Connection Method Instruction Process by Access Point 10>

Figure 14:
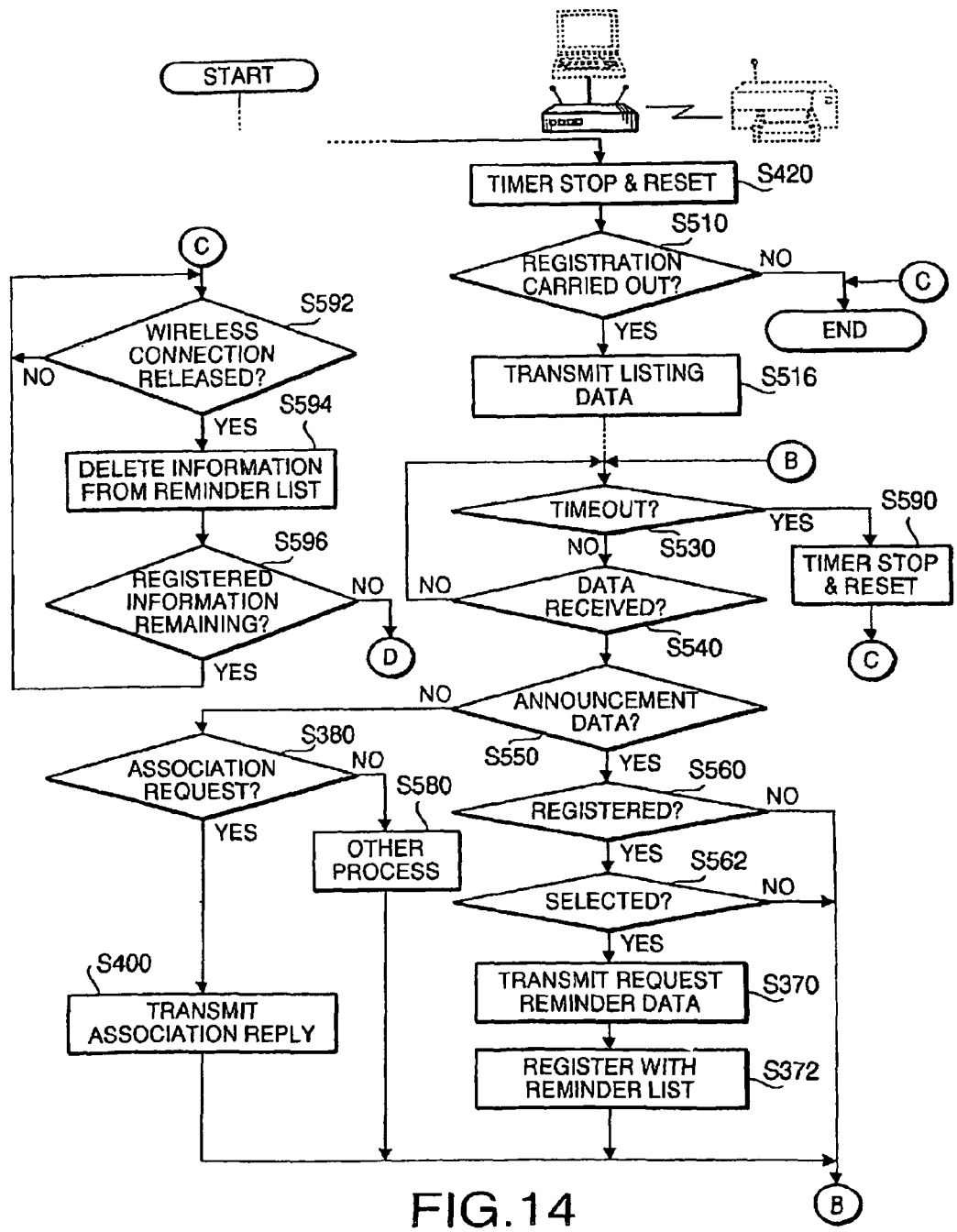
FIG. 14 is a flowchart showing the procedure of a connection method instruction process in a fifth embodiment.

In the following, a connection method instruction process which is conducted by the CPU 11 of the access point 10 will be described referring to FIG. 14. The connection method instruction process is configured by adding a step S372 (explained below) after the step S370 of the connection method instruction process of the fourth embodiment (FIG. 8) and adding steps S592, S594 and S596 (explained below) after the step S590, therefore, only the procedure different from the fourth embodiment will be described in detail.

In the step S370 in this embodiment, an encryption key that is different from the ordinary encryption key stored in the ROM 12 (hereinafter referred to as a "tentative encryption key") is generated randomly, and a request reminder data to which the tentative encryption key is attached is transmitted.

Before returning to the step S530 after transmitting the request reminder data in the step S370, the device name and the device ID of the wireless station to which the request reminder data was transmitted are registered with a reminder list associating them with the tentative encryption key attached to the request reminder data in the step S370 (S372). The "reminder list" is a data table which is generated in the RAM 13 for the registration of the data.

After finishing the step S590, the release of wireless connection with any one of the wireless stations registered with the reminder list in the step S372 is waited for (S592: NO). When the wireless connection is released (S592: YES), the information registered with the reminder list regarding the wireless station corresponding to the released wireless connection is deleted (S594).

After finishing the step S594, whether there exists registered information remaining in the reminder list or not is checked (S596). If there remains registered information (S596: YES), the process returns to the step S592. The judgment is repeated and when the reminder list is empty (S596: NO), the connection method instruction process is ended.

<Connection Method Settling Process by Printer 20>

Figure 15:
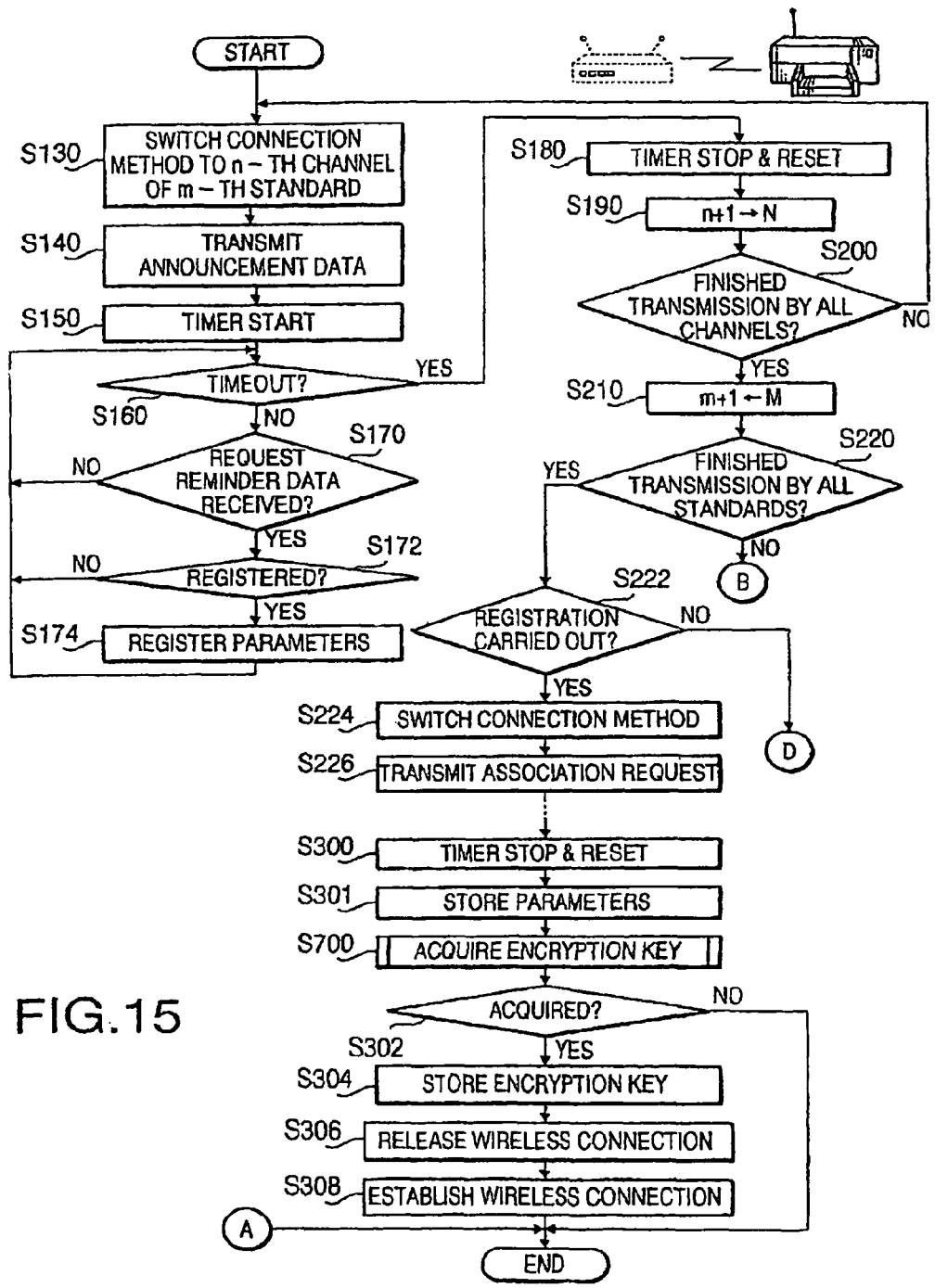
FIG. 15 is a flowchart showing the procedure of a connection method settling process in the fifth embodiment.

In the following, a connection method setting process which is conducted by the CPU 21 of the printer 20 will be described referring to FIG. 15. The connection method settling process is configured by adding the following procedure to the connection method settling process of the previous embodiments (FIG. 2). In the following explanation, steps identical with those of the previous embodiments will be referred to with the same step Nos. and detailed explanation thereof is omitted for brevity.

After receiving the request reminder data in the step S170, the SSID specified by the request reminder data is stored in the ROM 22 and the tentative encryption key is stored in a storage area of the RAM 23 for the "parameter regarding security" (S174). Thereafter, by switching the connection method in the step S224, data communication with the wireless access point (access point 10) is carried out by encrypting data with the tentative encryption key stored in the storage area for the "parameter regarding security".

Figure 16:
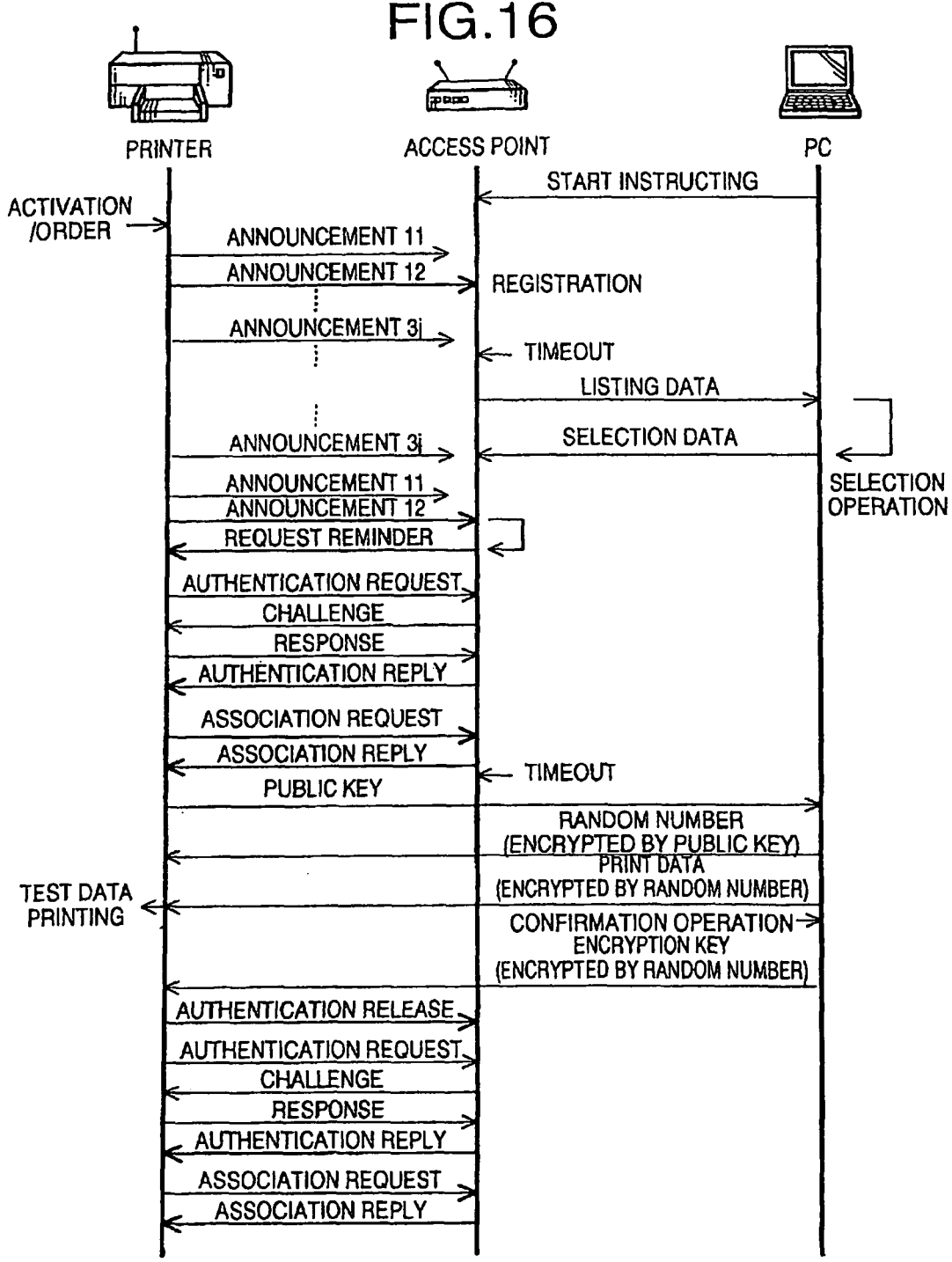
FIG. 16 is a sequence chart showing communication of data between the access point and the printer in the fifth embodiment.
Figure 17:
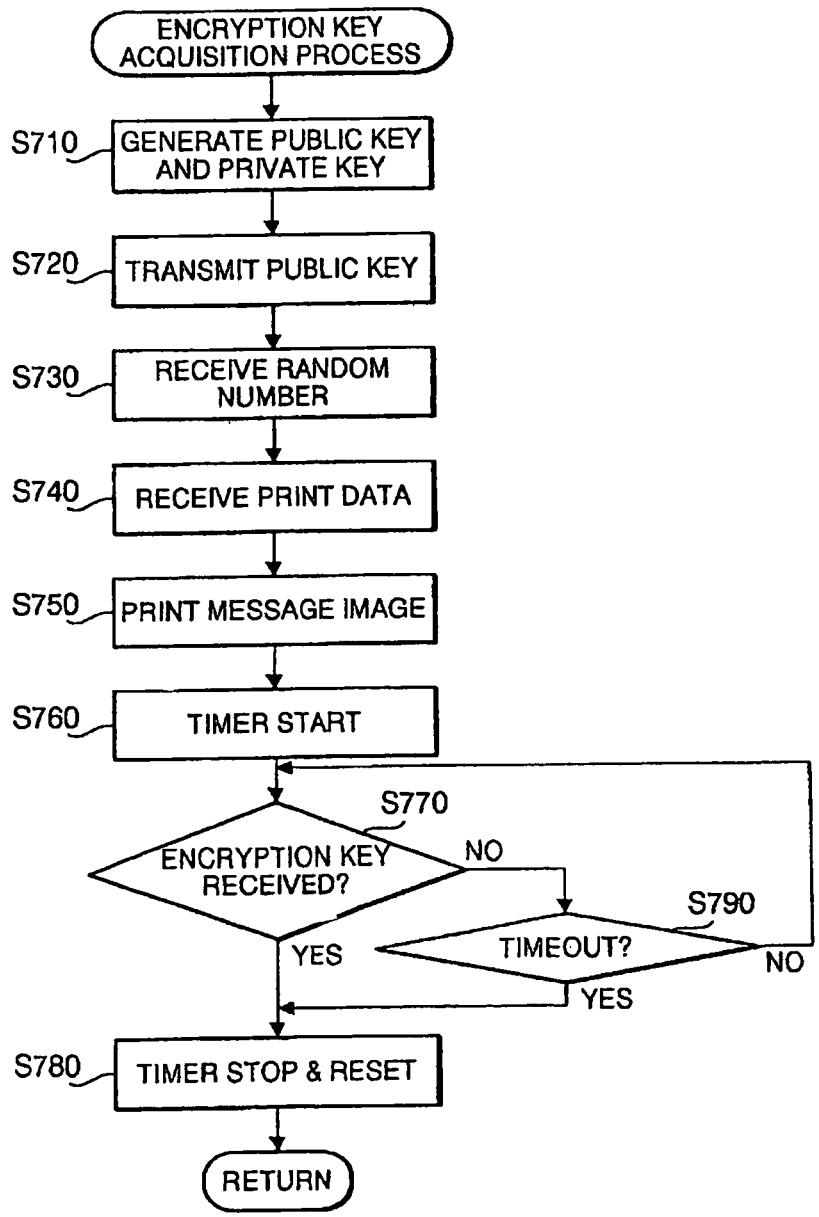
FIG. 17 is a flowchart showing the procedure of an encryption key acquisition process in the fifth embodiment.

After finishing the step S301, the encryption key of the access point 10 is acquired (S700). The step S700 is a step for acquiring the encryption key of the access point 10 from the PC 30 by means of the public key cryptosystem (see "ENCRYPTION KEY (ENCRYPTED BY RANDOM NUMBER)" in FIG. 16). Details of the step S700 will be explained later in an explanation of an encryption key acquisition process (FIG. 17).

If the encryption key is acquired successfully in the step S700 (S302: YES), the encryption key is stored in the ROM 22 (S304). In this step, in addition to the storage of the encryption key in the ROM 22, deletion of the tentative encryption key from the RAM 23 is executed.

Subsequently, the wireless connection with the access point 10 is released (S306). In this step, the wireless connection with the access point 10 is released by transmitting an authentication release message to the access point 10 (see "AUTHENTICATION RELEASE" in FIG. 16).

Subsequently, the wireless connection with the access point 10 is reestablished (S308). In this step, the wireless connection is reestablished by exchanging the authentication request/reply with the access point 10 similarly to the aforementioned procedure. After the wireless connection is established by this step, data communication is executed by encrypting data with the encryption key stored in the ROM 22 in the step S304.

After the step S308, or if the encryption key has not been acquired in the step S302 (S302: NO), the connection method settling process is ended.

<Encryption Key Acquisition Process by Printer 20>

In the following, an encryption key acquisition process which is conducted by the CPU 21 of the printer 20 will be described referring to FIG. 17. The encryption key acquisition process is the details of the step S700 of FIG. 15.

First, a public key and a private key used for the public key cryptosystem as a pair are generated (S710).

Subsequently, the public key generated in the step S710 is transmitted to the PC 30 (S720). In this step, data of the public key is transmitted to the PC 30 as a prescribed device. The PC 30 which received the public key encrypts a random number (which is generated randomly) by the public key and transmits the encrypted random number to the printer 20. The PC 30 further transmits prescribed print data (representing a prescribed message image) encrypted by the random number to the printer 20.

The printer 20 receives the encrypted random number from the PC 30 (S730), receives the encrypted print data from the PC 30 (S740), decrypts the message image (represented by the print data received in the step S740) by the public key generated in the step S710, and lets the print engine 28 print the message image (S750). The message image printed in this step contains a message for letting the user confirm that the random number received in the step S730 was transmitted by the PC 30 certainly to the printer 20 itself. The user who confirmed the fact conducts a confirmation operation (which will be described later in an explanation of a setting instruction process (FIG. 18)) by use of the PC 30. After the confirmation operation, the encryption key encrypted in the step S730 will be transmitted from the PC 30 to the printer 20.

A timer is started (S760) and whether the encryption key has been received or not is checked (S770). If the encryption key has been received (S770: YES), the timer which was started in the step S760 is stopped and reset (S780) and the encryption key acquisition process is ended.

On the other hand, if the encryption key has not been received (S770: NO), whether a timeout has occurred or not is checked (S790). In this step, the timeout is judged to have occurred if the timer started in the step S760 has counted a preset length of time (30 sec in this embodiment).

If the timeout has not occurred (S790: NO), the process returns to the step S770. If the timeout has occurred (S790: YES), the process advances to the step S780. by which the encryption key acquisition process is ended without acquiring the encryption key.

<Setting Instruction Process by PC 30>

Figure 18:
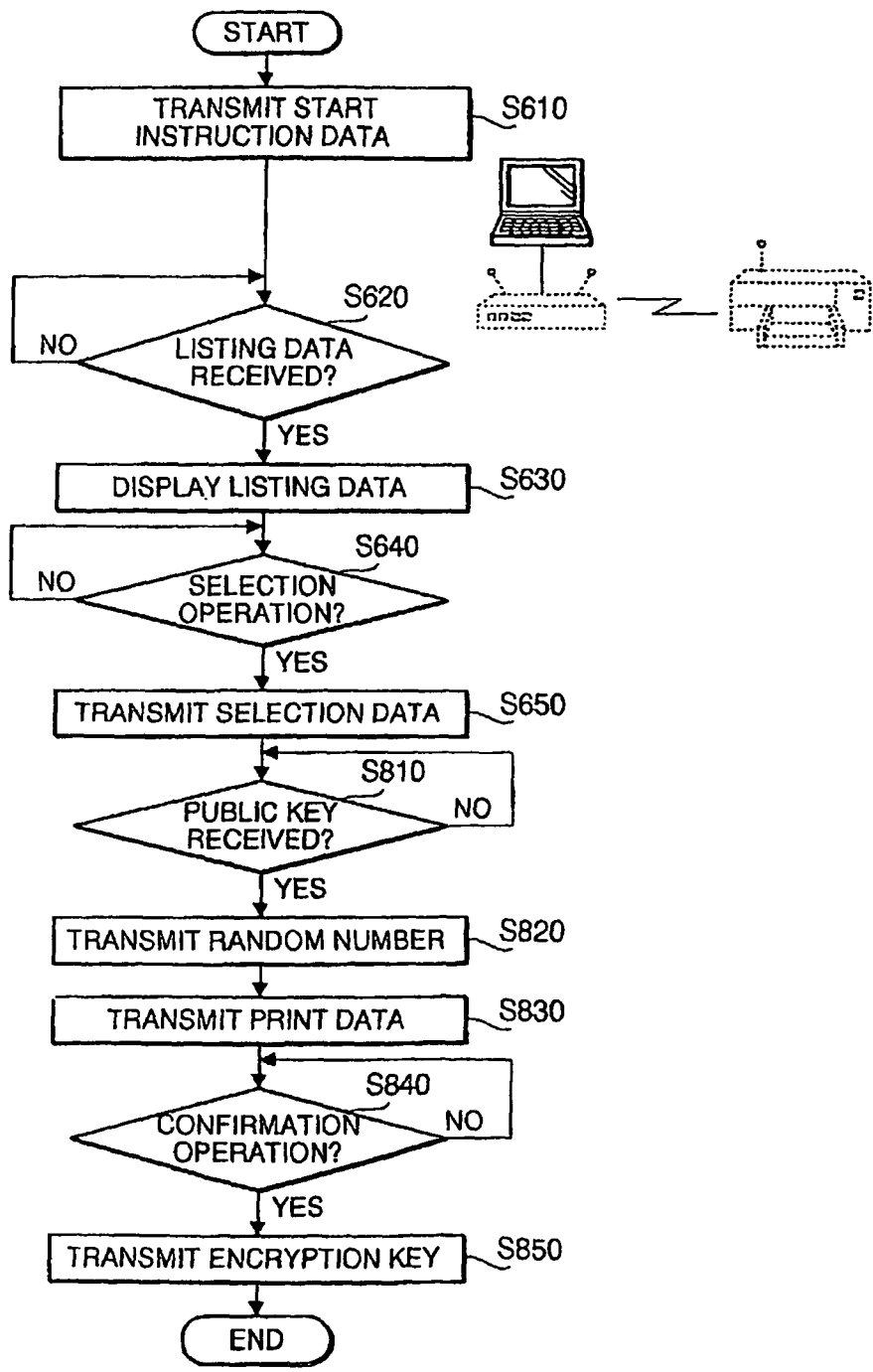
FIG. 18 is a flowchart showing the procedure of a setting instruction process in the fifth embodiment.

In the following, a setting instruction process which is conducted by the PC 30 will be described referring to FIG. 18. The setting instruction process is executed according to a program installed in the PC 30. The setting instruction process is configured by adding the following procedure after the step S650 of the setting instruction process of previous embodiments (FIG. 10). In the following explanation, steps identical with those of the previous embodiments will be referred to with the same step Nos. and detailed explanation thereof is omitted for brevity.

After the step S650 is finished, the public key transmitted from the printer 20 is waited for until it is received (S810: NO). The public key is the data which is transmitted by the printer 20 in the step S720 of FIG. 17.

When the public key is received (S810: YES), a random number (generated randomly) is encrypted by the public key and the encrypted random number is transmitted to the printer 20. The encrypted random number is the data which is received by the printer 20 in the step S770 of FIG. 17.

Subsequently, the print data representing the message image is encrypted by the random number received in the step S810 and the encrypted print data is transmitted to the printer 20 (S830). The encrypted print data is the data which is received by the printer 20 in the step S740 of FIG. 17. The printer 20 which received the print data prints the message image, and the user conducts the confirmation operation to the PC 30 after the message image is printed out, as mentioned above. The confirmation operation is done by pressing a particular key/button, pressing keys/buttons in a particular order, etc.

The confirmation operation is waited for until it is done by the user (S840: NO).

When the confirmation operation is conducted (S840: YES), the encryption key is encrypted by the random number generated in the step S820 and the encrypted encryption key is transmitted to the printer 20 (S850). The encrypted encryption key is the data which is received by the printer 20 in the step S770 of FIG. 17. Incidentally, the encryption key is data which has previously been stored in memory, etc.

After finishing the step S850, the setting instruction process is ended.

<Encryption Switching Process by Access Point 10>

The access point 10 is configured to execute an encryption switching process when the time of data communication (transmission/reception of data) with a wireless station has come since its activation. In the following, the encryption switching process will be described referring to FIG. 19.

First, whether the wireless station (to carry out data communication with) is a wireless station having a device name or device ID registered with the reminder list of the RAM 13 or not is checked (S910).

If the wireless station is one having a device name or device ID registered with the reminder list (S910: YES), data communication is carried out by encrypting data with a tentative encryption key corresponding to the device name or device ID (S920).

On the other hand, if the wireless station is one having no device name nor device ID registered with the reminder list (S910: NO), ordinary data communication is carried out by encrypting data with the encryption key (S930).

After finishing the steps S920 or S930 as above, the encryption switching process is ended.

In the wireless LAN system composed as above, the following effects can be achieved in addition to the effects attained by the previous embodiments.

Figure 19:
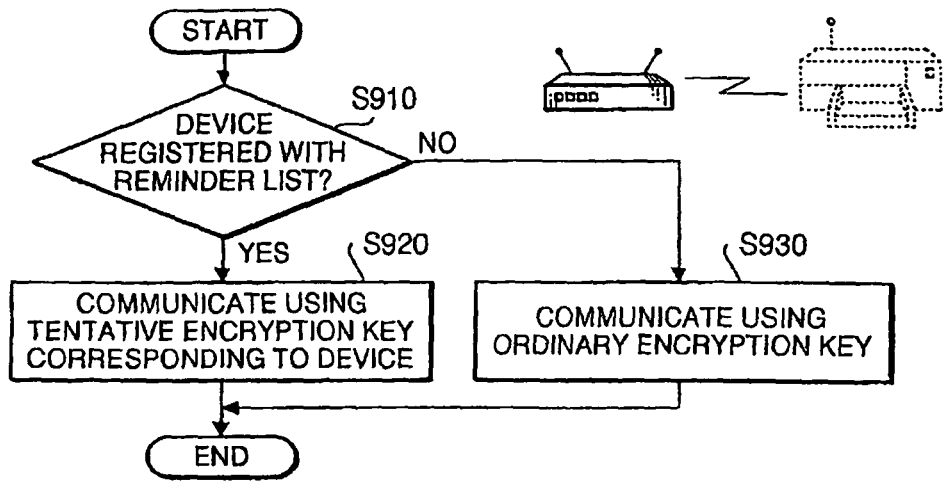
FIG. 19 is a flowchart showing the procedure of a setting instruction process in the fifth embodiment.

For a wireless station to which the request reminder data has been transmitted, the access point 10 switches its encryption method so as to execute data communication encrypting data with the tentative encryption key (see S910 in FIG. 19). Meanwhile, the printer 20 which received the request reminder data sets its encryption method so as to execute the data communication with the access point 10 encrypting data with the tentative encryption key (see S224 in FIG. 15). By the procedure, normal data communication between the access point 10 and the printer 20 encrypting data with the tentative encryption key becomes possible, by which the data communication between the access point 10 and the printer 20 can be realized ensuring a certain security level while maintaining the security level of data communication of the access point 10 with external networks.

Subsequently, if the printer 20 successfully acquires the encryption key by the encryption key acquisition process (FIG. 17), the printer 20 reestablishes the wireless connection with the access point 10 (see steps S306 and S308 in FIG. 15), by which the data communication between the access point 10 and the printer 20 will thereafter be carried out by encrypting data with the encryption key transferred from the PC 30 to the printer 20. In the access point 10, the parameters regarding the wireless station corresponding to the released wireless connection are deleted from the reminder list at this point (see step S594 in FIG. 14), by which the encryption method of the access point 10 is returned so as to execute the data communication with the printer 20 encrypting data with the encryption key. Therefore, the data communication between the access point 10 and the printer 20 can be realized with a security level equivalent to that of data communication of the access point 10 with other wireless stations or external networks.

Since the transfer of the encryption key from the PC 30 to the printer 20 is conducted by means of the public key cryptosystem, the probability of leak of the encryption key during the transmission to the printer 20 becomes low as a matter of course.

Further, the printer 20 prints the message image represented by the print data transferred from the PC 30 prior to the encryption key (see step S750 in FIG. 17). Thus, the user is allowed to confirm whether or not the printer 20 is a correct wireless station that should receive the encryption key from the PC 30, by checking whether or not the message image is printed by the printer 20. After confirming the message image, the user executes the confirmation operation to the PC 30 (see step S840 in FIG. 18), by which the transfer of the encryption key from the PC 30 to the printer 20 is enabled.

[Modifications]

While the present invention has been described with reference to the above particular illustrative embodiments, the present invention is not to be restricted by those embodiments but can also be implemented in various configurations.

For example, while a printer 20 is employed in the above embodiments as the wireless station of the present invention, any type of device capable of operating as a wireless station can be employed as the wireless station of the present invention.

While the PC 30 is connected to the access point 10 via the cable 100 in the above embodiments, the PC 30 may also be connected to the access point 10 by wireless connection in cases where the PC 30 has the wireless station function.

While all the sequence containing the transmission of the announcement data is not executed by the printer 20 in the above embodiments when the printer 20 is judged not to be in the factory shipment state (see step S100 in FIGS. 2 and 15), it is also possible to let the printer 20 transmit the announcement data in a state allowing the judgment on the factory shipment state and let the access point 10 cancel the registration regarding the announcement data or the transmission of the request reminder data.

Figure 20:
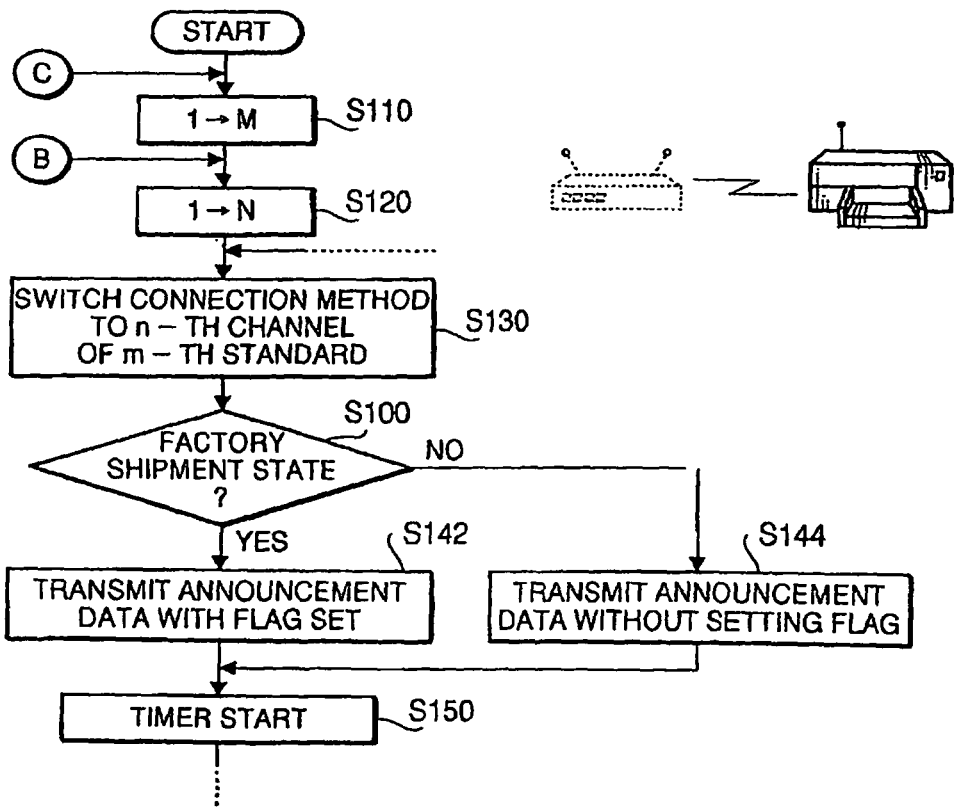
FIG. 20 is a flowchart showing the procedure of a connection method settling process in a modified embodiment.

For this, in the printer 20, the step S100 is executed after the step S130 as show in FIG. 20, for example. If "YES" in the step S100, announcement data, in which an "Unconfigured device" flag is set (set to "1"), is transmitted (S142). If "NO" in the step S100, announcement data, in which the "Unconfigured device" flag is not set (set to "0"), is transmitted (S144) and the process advances to the step S150.

Figure 21:
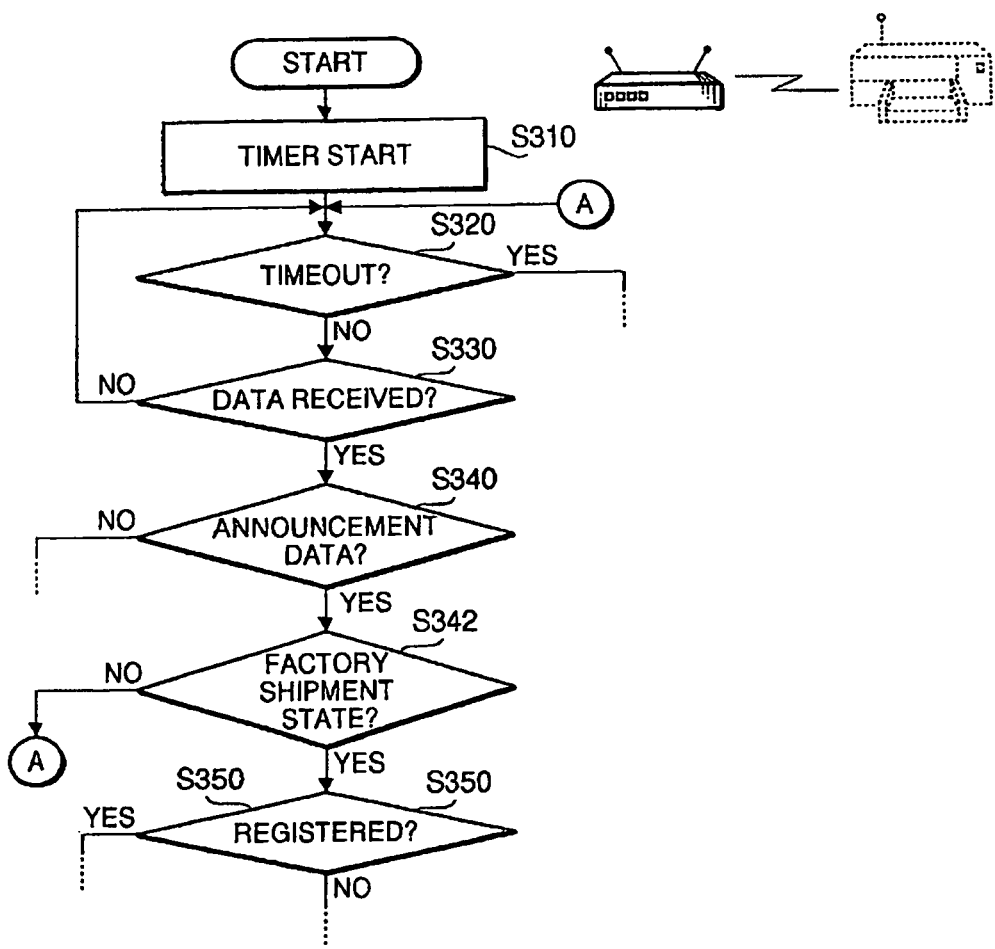
FIG. 21 is a flowchart showing the procedure of a setting instruction process in the modified embodiment.
Figure 22:
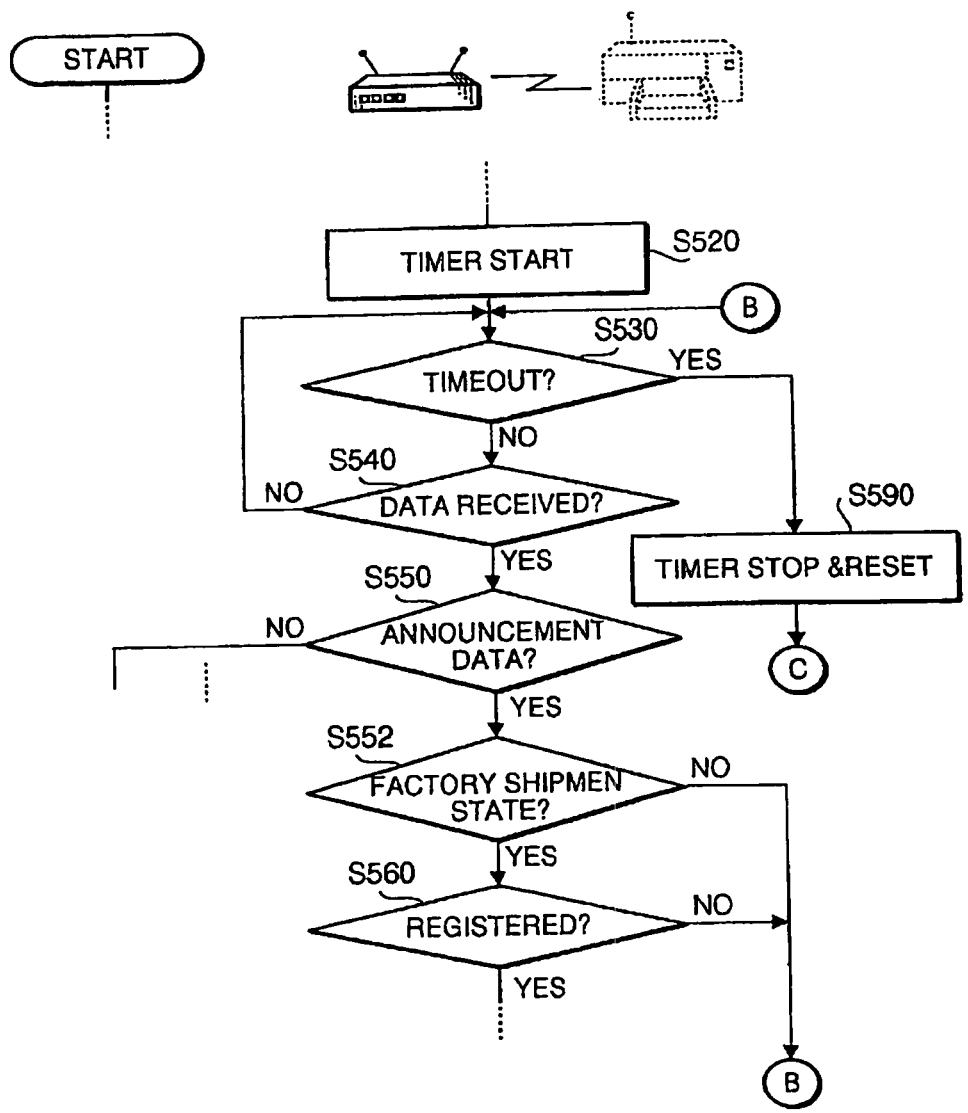
FIG. 22 is a flowchart showing the procedure of a setting instruction process in the modified embodiment.

Meanwhile, in the access point 10, the following procedure may be added to the processes of FIGS. 4, 6, 7, 8, 13 and 14. For example, as shown in FIG. 21, after the step S340, if the "Unconfigured device" flag in the received announcement data indicates that the wireless station (printer 20) is in its factory shipment state (S342: YES), the process advances to the step S350, otherwise (S342: NO) the process returns to the step S320. Or as shown in FIG. 22, after the step S550, if the "Unconfigured device" flag in the received announcement data indicates that the wireless station is in the factory shipment state (S552: YES), the process advances to the step S560, otherwise (S552: NO) the process returns to the step S530.

By such a configuration, the access point 10 is allowed to set the connection method (by carrying out the registration based on the announcement data and the transmission of the request reminder data) only when the wireless station is in its factory shipment state.

While the printer 20 in the above embodiment switches its connection method in numerical order starting from the 1st channel of the 1st wireless LAN standard, the order of the channel switching is not particularly limited. For example, a proper order for avoiding radio wave interference in the same wireless LAN standard may also be employed.

Specifically, the channels may be divided into a plurality of groups (e.g. a high frequency group and a low frequency group) and the channel switching may be done in turn like from a j-th channel (j: arbitrary number) of a group to a j-th channel of the next group and so forth, successively for all the channels of each group. In this case, switching to a channel of the same group (switching to a close frequency band) does not occur and thereby the radio wave interference can be avoided.

Similarly, the channel switching may also be done in turn at intervals of a preset channel number k (e.g. at intervals of 5 channels) starting from the 1st channel, repeating the sequence starting from the 2nd channel and so forth to a sequence starting from the k-th channel. In this case, the radio wave interference can be avoided securely by setting the interval sufficiently wide so as to eliminate the radio wave interference.

In the above-described fifth embodiment, by printing a message (image) transmitted from the PC 30, the user can confirm that the printer 20 is the correct wireless station that is to receive the encryption key from the PC 30. This can be modified such that a preliminary stored image corresponding to the signal transmitted from the PC 30 may be printed. Alternatively, corresponding to the received signal, a message may be displayed on the display panel 27, LEDs (not shown) may be lit, and/or predetermined sound (e.g., voice message) may be output from the speaker. Further alternatively, instead of printing the image, temperature of a component may be increased or smoke may be discharged.

Embodiment 6

A wireless LAN system in accordance with a sixth embodiment will be described hereinafter. It should be noted that a hardware configuration of the wireless LAN system according to the sixth embodiment is similar to that shown in FIG. 1 and the description there of is omitted for the brevity.

<Connection Method Instruction Process by Access Point 10>

In the following, a connection method instruction process which is conducted by the CPU 11 of the access point 10 will be described referring to FIG. 23. The connection method instruction process is started when an instructing operation for switching the operation mode of the access point 10 into a "support mode" (for supporting the setting of the connection method of the wireless station) is made by the user to the operation panel 16 (e.g. pressing a particular button). Incidentally, the support mode is an operation mode which is enabled only in the connection method instruction process. When the connection method instruction process is ended, the operation mode of the access point 10 is returned from the support mode to "normal mode".

First, a variable M is initialized (S1110). In this step, a value "1" is set in the variable M (1→M). Incidentally, a character "m" in the following description system the value set in the variable M.

Subsequently, a variable N is initialized (S1120). In this step, a value "1" is set in the variable N (1→N). A character "n" in the following description system the value set in the variable N.

Subsequently, the method of wireless connection to the wireless station (hereinafter referred to as "connection method") is switched to a connection method implemented by the n-th channel of the m-th wireless LAN standard (S1130). In this step, the connection method employed by the wireless LAN controller 15 is switched by storing the parameters (for implementing a communication function by the connection method specified by the n-th channel of the m-th wireless LAN standard) in a storage area of the RAM 13 for the "parameters indicating the connection method" and letting the wireless LAN controller 15 control the connection method according to the memory content of the RAM 13. By this, the connection method will be controlled according to the memory content of the RAM 13 until next switching (for controlling the connection method according to the memory content of the ROM 12) is done in a posterior step (S1250). Incidentally, when the storage area for the "parameters indicating the connection method" already holds parameters, the parameters are overwritten with the new parameters.

Subsequently, a probe request is broadcast (transmitted using a broadcast address as the destination) (S1140). The "probe request" is well-known frame data which is transmitted by the wireless access point for inquiring whether there exists a wireless station located nearby the wireless access point. In this embodiment, the probe request is transmitted for the purpose of supporting the setting of the connection method of wireless stations (see "REQUEST 11"-"REQUEST 3j" in FIG. 24). From the printer 20 which received the probe request, a probe reply is returned in the connection method setting process (FIG. 25) which will be explained later (see "REPLY" in FIG. 24).

Subsequently, a timer is started (S1150). The timer started in this step will be used for checking whether or not the probe reply is returned within a preset time limit from a wireless station (printer 20) that should support the wireless connection setting.

Subsequently, whether the probe reply has been returned from a wireless station or not is checked (S1160).

If no probe reply has been returned (S1160: NO), whether or not a timeout has occurred since the transmission (broadcast) of the probe request is checked (S1170). In this step, the timeout is judged to have occurred if the timer which was started in the step S1150 has counted a preset length of time (250 msec in this embodiment).

If the timeout has not occurred (S1170: NO), the process returns to the step S1160. If the timeout has occurred (S1170: YES), the timer started in the step S1150 is stopped and reset (S1180) and the variable N is incremented by 1 (n+1→N) (S1190).

Subsequently, whether the transmission of the probe request has been finished by use of all the channels of the m-th wireless LAN standard or not is checked (S1200). Since the number of usable channels is specified and fixed in each wireless LAN standard, the transmission of the probe request by all the channels is judged to have finished in the step S1200 if the value n of the variable N has become larger than the number (j) of usable channels of the m-th wireless LAN standard (n>j).

If the transmission of the probe request by all the channels of the m-th wireless LAN standard has not been finished (S1200: NO), the process returns to the step S1130. Thereafter, the sequence from the step S130 to the step S1200 is repeated and thereby the transmission of the probe request is successively carried out by use of each channel of the m-th wireless LAN standard (see "REQUEST 11"-"REQUEST 1j" in FIG. 24).

After repeating the sequence from the step S1130 to the step S1200, if the transmission of the probe request by all the channels of the m-th wireless LAN standard has been finished (S1200: YES), the variable M is incremented by 1 (m+1→M) (S1210).

Subsequently, whether the transmission of the probe request has been finished by use of all the wireless LAN standards or not is checked (S1220). In this step, the transmission of the probe request by all wireless LAN standards is judged to have finished if the value m of the variable M has become larger than the number (i) of wireless LAN standards that can be used by the wireless LAN controller 15 for realizing communication (m>i).

If the transmission of the probe request by all the wireless LAN standards has not been finished (S1220: NO), the process returns to the step S120.

Thereafter, the transmission of the probe request by use of the next wireless LAN standard is carried out by the sequence from the step S1120. By repeating the sequence from the step S1120 to the step S1220, the transmission of the probe request is successively carried out by use of all the wireless LAN standards (see "REQUEST 11"-"REQUEST 3j" in FIG. 24).

After repeating the sequence from the step S120 to the step S1220, if the transmission of the probe request by all the wireless LAN standards has been finished (S1220: YES), the process returns to the step S1110.

During the repetition of the sequence from the step S1120 to the step S1220, if the probe reply is returned from a wireless station (S1160: YES), the timer started in the step S1150 is stopped and reset (S1230) and a request reminder data is transmitted to the wireless station that returned the probe reply (S1240). The "request reminder data" is frame data which is used for reminding the wireless station (printer 20) to send a request for permission for wireless connection (association request) to the access point 10. The request reminder data contains the SSID used by the access point 10 for data communication with the wireless stations and the parameters indicating the connection method (the 2nd channel of the 1st wireless LAN standard) previously set to the access point 10. The printer 20 which received the request reminder data transmits the association request to the access point 10 according to the same connection method as that of the access point 10 in the connection method setting process (FIG. 25) which will be explained later.

Subsequently, the connection method is returned to the initial settings (S1250). In this step, the "parameters indicating the connection method" stored in the RAM 13 are deleted and thereafter data communication is carried out based on the "parameters indicating the connection method" stored in the ROM 12. The parameters stored in the ROM 12 are those that have been preset to the access point 10 as the initial settings. Thus, the connection method of the access point 10 is returned to the initial settings. Thereafter, the access point 10 executes data communication according to the initial settings until it returns to the step S1110.

Subsequently, another timer is started (S1260). The timer started in this step will be used for checking whether or not the association request is returned from the wireless station (printer 20) within a preset time limit.

Subsequently, whether the association request has been received from the wireless station or not is checked (S1270).

If the association request has not been received (S1270: NO), whether or not a timeout has occurred since the transmission of the request reminder data is checked (S1280). In this step, the timeout is judged to have occurred if the timer started in the step S1260 has counted a preset length of time (250 msec in this embodiment).

If the timeout has not occurred (S1280: NO), the process returns to the step S1270. If the timeout has occurred (S1280: YES), the timer started in the step S1260 is stopped and reset (S1290) and the process returns to the step S1110.

In the step S1270, if the association request has been received (S1270: YES), the timer is stopped and reset similarly to the step S1290 (S1300), and an association reply (permitting the wireless connection to the access point 10) is transmitted to the printer 20 that returned the association request (S1310).

As described above, the wireless connection between the access point 10 and the printer 20 is established by the exchange of the association request and association reply.

Figure 24:
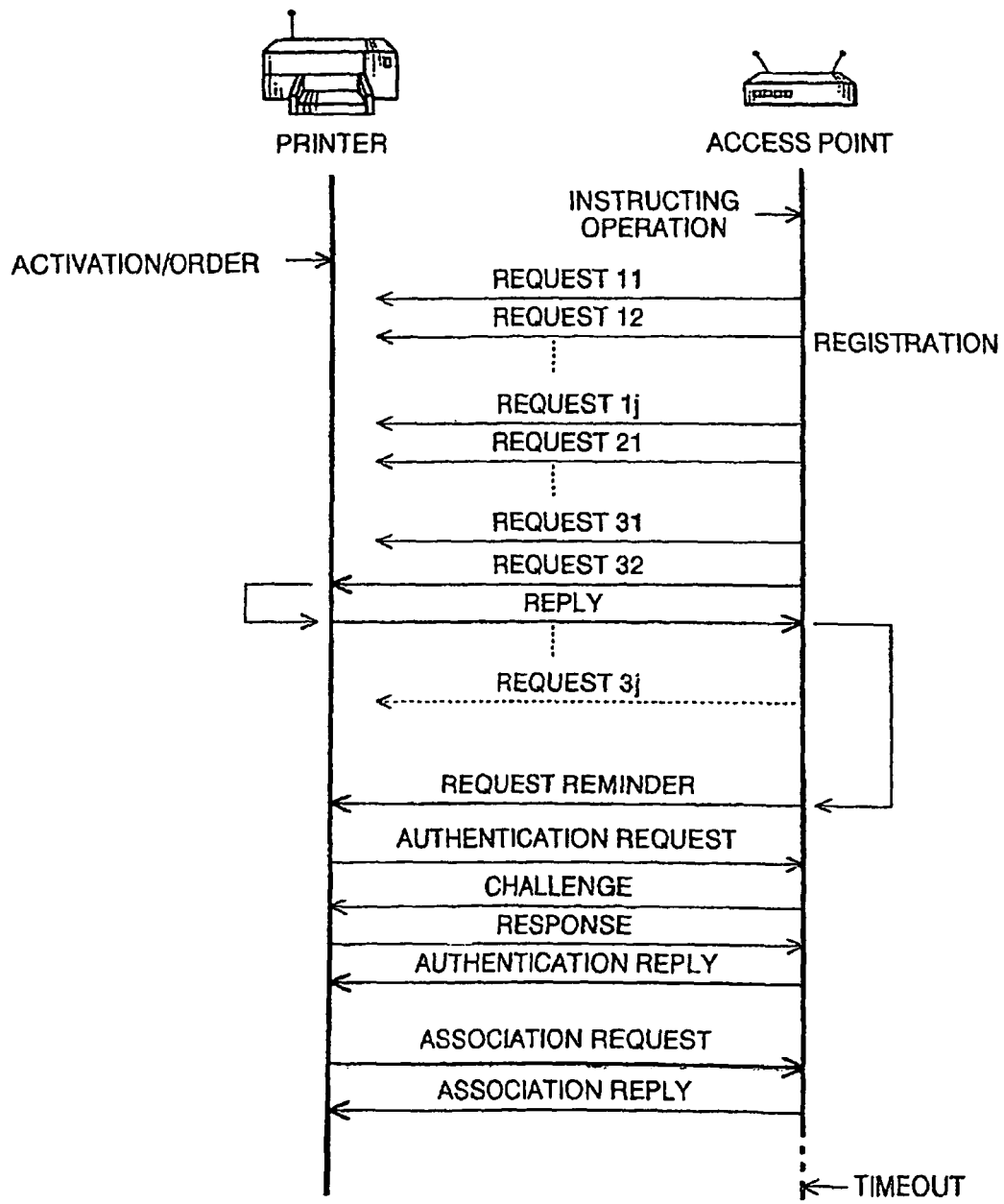
FIG. 24 is a sequence chart showing communication of data between an access point and a printer in the sixth embodiment.

In this embodiment, although detailed explanation is omitted, before the exchange of the association request and association reply, an authentication request and an authentication reply are exchanged between the printer 20 and the access point 10 (similarly to ordinary wireless connection procedures) after the request reminder data from the access point 10 is received by the printer 20 (see "AUTHENTICATION REQUEST"-"AUTHENTICATION REPLY" in FIG. 24). Incidentally, since the first embodiment does not employ encryption for data communication, the exchange of the authentication request/reply is done as open authentication (authentication without encryption).

<Connection Method Setting Process by Printer 20>

In the following, the connection method setting process which is conducted by the CPU 21 of the printer 20 will be described referring to FIG. 25. The connection method setting process is started when the printer 20 is activated.

First, whether the printer 20 itself is in the factory shipment state or not is checked (S1410). In this step, the printer 20 is judged to be in its factory shipment state if no "parameters indicating the connection method" are stored in the ROM 22.

If in the factory shipment state (S1410: YES), the initial settings are made (S1420). In this step, the initial settings are made by storing parameters that have been preset as the "parameters indicating the connection method" in the ROM 22. In this embodiment, parameters indicating a connection method specified by the 2nd channel of the 3rd wireless LAN standard are stored in the ROM 22 as the "parameters indicating the connection method".

Subsequently, a timer is started (S1430). The timer started in this step will be used for checking whether or not data is transmitted from a wireless access point (that should set the connection method) within a preset time limit. In this embodiment, the "wireless access point that should set the connection method" system the access point 10, and the "data" system data that is transmitted by the access point 10 in the aforementioned connection method instruction process (FIG. 23). Therefore, the user sets the connection method (for the connection to the access point 10) to the printer 20 by activating the printer 20 (i.e. starting this connection method setting process) after letting the access point 10 start the aforementioned connection method instruction process (FIG. 23) (see "INSTRUCTING OPERATION" to the access point 10 and "ACTIVATION" to the printer 20 in FIG. 24).

Subsequently, whether a probe request has been received from a wireless access point or not is checked (S1440). The "probe request" is well-known frame data (MAC frame) which is transmitted by the wireless access point for inquiring whether there exists a wireless station located nearby the wireless access point, that is, data transmitted (broadcast) from the access point 10 in the step S1140 of FIG. 23. Specifically, in the step S1440, whether a probe request according to the connection method that has been set to the printer 20 itself (i.e. the connection method that has been set as the initial settings) has been received or not is checked (see "REQUEST 11"-"REQUEST 3j" in FIG. 24).

If a probe request has been received (S1440: YES), a probe reply is returned (S1450). The probe reply is the data which is received by the access point 10 in the step S160 of FIG. 23 (see "REPLY" in FIG. 24).

After finishing the step S1450, or if no probe request has been received (S1440: NO), whether a request reminder data has been received from the wireless access point or not is checked (S1460). The request reminder data is the data which is transmitted by the access point 10 (which received the probe reply transmitted in the step S1450) in the step S1240 of FIG. 23.

If no request reminder data has been received (S1460: NO), whether or not a timeout has occurred regarding the data reception from the wireless access point is checked (S1470). In this step, the timeout is judged to have occurred if the timer started in the step S1430 has counted a preset length of time (30 sec in this embodiment).

If the timeout has not occurred (S1470: NO), the process returns to the step S1440.

After repeating the sequence from the step S1440 to the step S1470, if the timeout has occurred (S1470: YES), the timer started in the step S1430 is stopped and reset (S1480), error notification is executed (S1490), and the connection method setting process is ended. In the step S1490, the user is notified of an error by an error message (indicating, for example, that there exists no wireless access point functioning normally around the printer 20) displayed on the display panel 27.

During the repetition of the sequence from the step S1440 to the step S1470, if a request reminder data is received (S1460: YES), the timer started in the step S1430 is stopped and reset (S1500).

Subsequently, the connection method for the connection to the wireless access point is set based on the request reminder data received in the step S1460 (S1510). In this step, the connection method for the connection to the wireless access point is set by storing the "SSID" and the "parameters indicating the connection method" stored in the request reminder data in the ROM 22. By the above process, the printer 20 starts executing data communication according to the SSID and the connection method, by which data communication with the access point 10 becomes possible.

After finishing the step S1510, or if the printer 20 is not in the factory shipment state in the aforementioned step S1410 (S1410: NO), an association request for requesting permission for wireless connection is transmitted to the access point 10 (S1520). The "association request" is frame data (management frame) for requesting wireless connection permission (permission for wireless connection) from the access point 10. In the step S1520, the SSID which was stored in the ROM 22 in the step S1510 is stored in the association request and transmitted (see "ASSOCIATION REQUEST" in FIG. 24). Incidentally, in the header (header information) of the association request, the device ID of the printer 20 (MAC address) is set (stored). From the access point 10 which received the association request, an association reply, as frame data (management frame) indicating the permission for the Wireless connection to the access point 10, is returned (see "ASSOCIATION REPLY" in FIG. 24).

Subsequently, another timer is started (S1530). The timer started in this step will be used for checking whether or not the association reply is returned within a preset time limit.

Subsequently, whether or not a timeout has occurred since the transmission of the association request is checked (S1540). In this step, the timeout is judged to have occurred if the timer started in the step S530 has counted a preset length of time (250 msec in this embodiment).

If the timeout has not occurred (S1540: NO), whether the association reply has been received from the access point 10 or not is checked (S1550). If the association reply has not been received (S1550: NO), the process returns to the step S1540.

Thereafter, the steps S540 and S550 are repeated and if the timeout (since the transmission of the association request) has occurred (S1540: YES), the timer started in the step S1530 is stopped and reset (1S570), and the process returns to the step S1420.

On the other hand, if the association reply has been received in the step S1550 (S1550: YES), the timer started in the step S1530 is stopped and reset (S1580), and the connection method setting process is ended.

In the wireless LAN system composed as above, the access point 10 transmits the probe request to the wireless stations (including the printer 20) according to each of a plurality of connection methods (see "REQUEST" in FIG. 24). The probe request is received by the printer 20 to which the same connection method has been set (see "REQUEST 32" in FIG. 24), and the printer 20 returns the probe reply to the access point 10 in response to the probe request (see "REPLY" in FIG. 24). Subsequently, the access point 10 which received the probe reply notifies the printer 20 of the connection method (which has been set to the access point 10 itself) by use of the request reminder data (see "REQUEST REMINDER" in FIG. 24). The printer 20 which received the notification sets the connection method notified by the request reminder data (which is the same as the connection method set to the access point 10) to itself. By setting the printer 20 to the same connection method as the access point 10 as above, wireless connection between the access point 10 and the printer 20 becomes possible.

Figure 25:
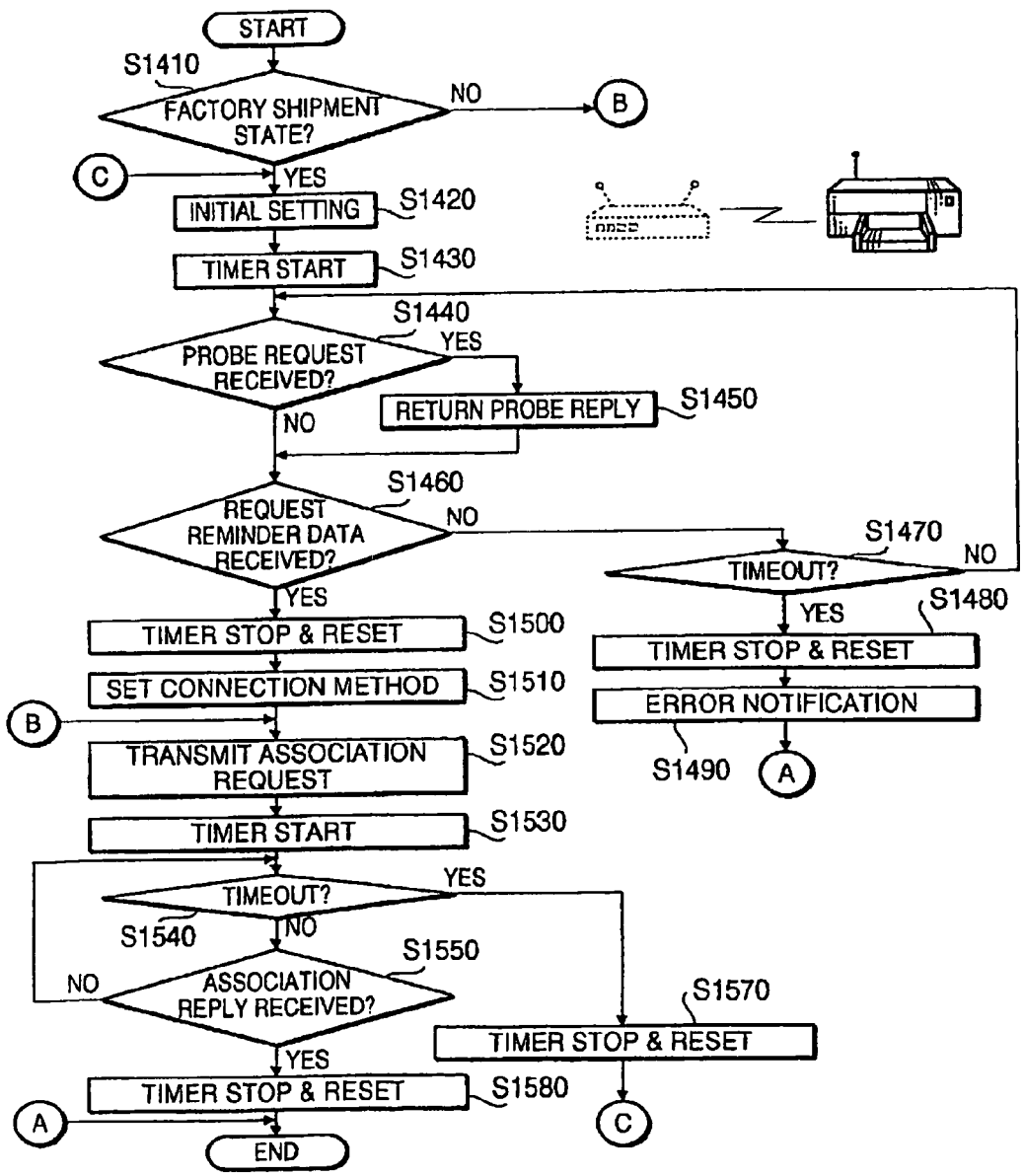
FIG. 25 is a flowchart showing the procedure of a connection method setting process in the sixth embodiment.

As above, in the printer 20, the connection method for the connection to the access point 10 is set automatically via the transmission of the probe reply and the reception of the request reminder data (S1450-S1510 in FIG. 25). Therefore, the load on the user regarding the wireless LAN settings can be lightened remarkably.

After the connection method has been set to the printer 20, the wireless connection between the access point 10 and the printer 20 can be established immediately via the exchange of the association request/reply.

The access point 10 transmits the probe requests while successively switching the connection method in turn at prescribed time intervals (S1110-S1220 in FIG. 23), and if a probe reply is received in a period before the switching to the next connection method (S1160), transmits the request reminder data according to the connection method at the point of the reception of the probe reply (S1240).

As above, the access point 10 can transmit the probe requests according to each connection method while successively switching the connection method in turn. The access point 10 can set the connection method (which has been preset to the access point 10 itself) to the printer 20 only by transmitting the request reminder data according to the connection method at the point of the reception of the probe reply.

The starting of the connection method instruction process (FIG. 23) by the access point 10 can be ordered explicitly from outside by the instructing operation. Similarly, starting of the connection method setting process (FIG. 25) by the printer 20 can be ordered explicitly from outside by activating the printer 20.

The setting of the connection method to the printer 20 can be executed only when the printer 20 is in its factory shipment state (S1410 of FIG. 25).

Modification of Embodiment 6

The six embodiment can also be implemented with part of its composition altered to other composition as shown below. Incidentally, the composition shown below is also applicable to similar parts of other embodiments.

For example, while the process from the step S1420 is executed only when the printer 20 is in its factory shipment state (S1410 of FIG. 25) in the above embodiment, it is also possible to configure the printer 20 to execute the process from the step S1420 even if it is not in the factory shipment state, in cases where the setting of the connection method is necessary (e.g. when part of the "parameters indicating the connection method" stored in the ROM 22 is lacking). While the step S1410 judges that the printer 20 is in the factory shipment state if no "parameters indicating the connection method" are stored in the ROM 22, it is also possible to set a specific flag at the stage of factory shipment and use the flag for indicating the factory shipment state. In this case, the printer 20 is judged to be in the factory shipment state if the flag is still set. The flag is reset when the "parameters indicating the connection method" are stored in the ROM 22.

While the association request and association reply are exchanged after the exchange of the authentication request and authentication reply in the above embodiment, it is also possible to omit the authentication request/reply and carry out the exchange of the association request/reply only.

While the setting of the connection method to the printer 20 is ordered and started by the activation of the printer 20 in the above embodiment, the order can also be issued by, for example, a particular operation through the operation panel 26 (see "ORDER" in FIG. 24).

While the operation mode of the access point 10 is switched by the instructing operation in the above embodiment, the access point 10 may also be configured to switch its operation mode when instructed by data which is sent from another device capable of communicating with the printer 20.

While the printer 20 in the above embodiment checks whether its in the factory shipment state or not (S1410 in FIG. 25) just after starting the connection method setting process and then executes the process from the step S1420, the timing of the check on the factory shipment state is not limited to the point just after the start of the connection method setting process. Before the step S1440, before the step S1510, etc. are also possible.

While the access point 10 in the above embodiment transmits a probe request as data for supporting the setting of the connection method of the wireless stations, data other than the probe request can also be employed as long as the same purpose can be achieved.

While the access point 10 in the above embodiment switches its connection method in numerical order starting from the 1st channel of the 1st wireless LAN standard, the order of the channel switching is not particularly limited. For example, a proper order for avoiding radio wave interference in the same wireless LAN standard may also be employed.

Specifically, the channels may be divided into a plurality of groups (e.g. a high frequency group and a low frequency group) and the channel switching may be done in turn like from a j-th channel (j: arbitrary number) of a group to a j-th channel of the next group and so forth, successively for all the channels of each group. In this case, switching to a channel of the same group (switching to a close frequency band) does not occur and thereby the radio wave interference can be avoided.

Similarly, the channel switching may also be done in turn at intervals of a preset channel number k (e.g. at intervals of 5 channels) starting from the 1st channel, repeating the sequence starting from the 2nd channel and so forth to a sequence starting from the k-th channel. In this case, the radio wave interference can be avoided securely by setting the interval sufficiently wide so as to eliminate the radio wave interference.

Figure 26:
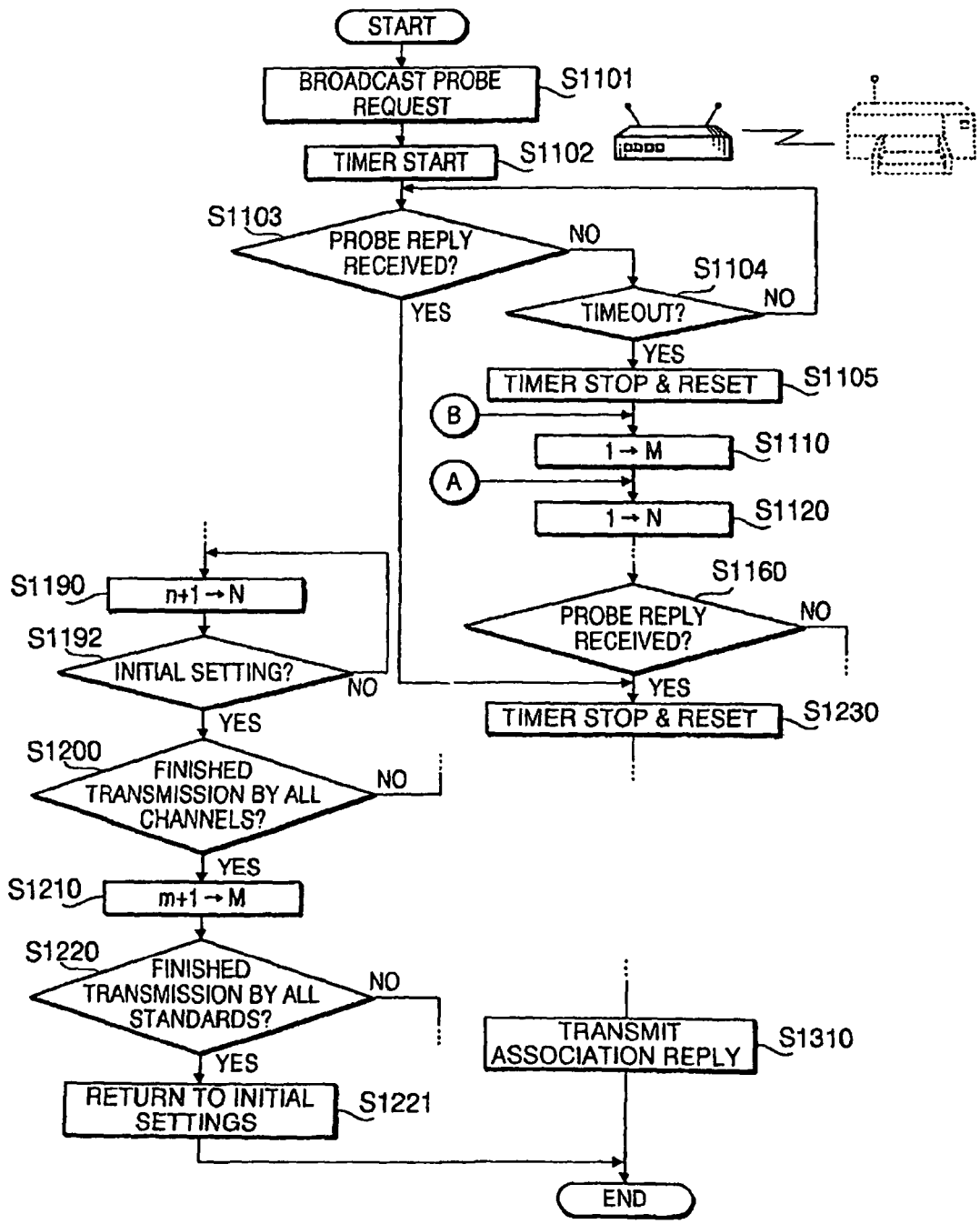
FIG. 26 is a flowchart (No. 2) showing the procedure of a connection method instruction process in the sixth embodiment.

It is also possible to let the access point 10 first conduct the process from the step S1140 with the connection method preset to itself and then repeat the same process by use of each connection method in numerical order starting from the 1st channel of the 1st wireless LAN standard. FIG. 26 shows an example of such a process flow, in which steps S1101-S1105 equivalent to the steps S1140-S1180 of FIG. 23 are added before the step S1110 of FIG. 23. If a probe reply to the probe request transmitted according to the preset connection method is received (S1103: YES), the process advances to the step S1230. On the other hand, if a timeout occurs without receiving the probe reply (S1104: YES), the timer is stopped and reset (S1105) and the process advances to the step S1110. Preferably, a judgment step may also be provided between the steps S1190 and S1200, by which the process advances to the step S1200 only when the connection method after incrementing the variable N by 1 is not identical with the initial settings, and otherwise (when the connection method after the increment is identical with the initial settings) the process returns to the step S1190.

By such composition, the wireless connection between the access point 10 and the printer 20 can be established immediately in cases where the printer 20 has the initial settings identical with the connection method preset to the access point 10, by which needless switching of the connection method by the access point 10 can be avoided.

Figure 23:
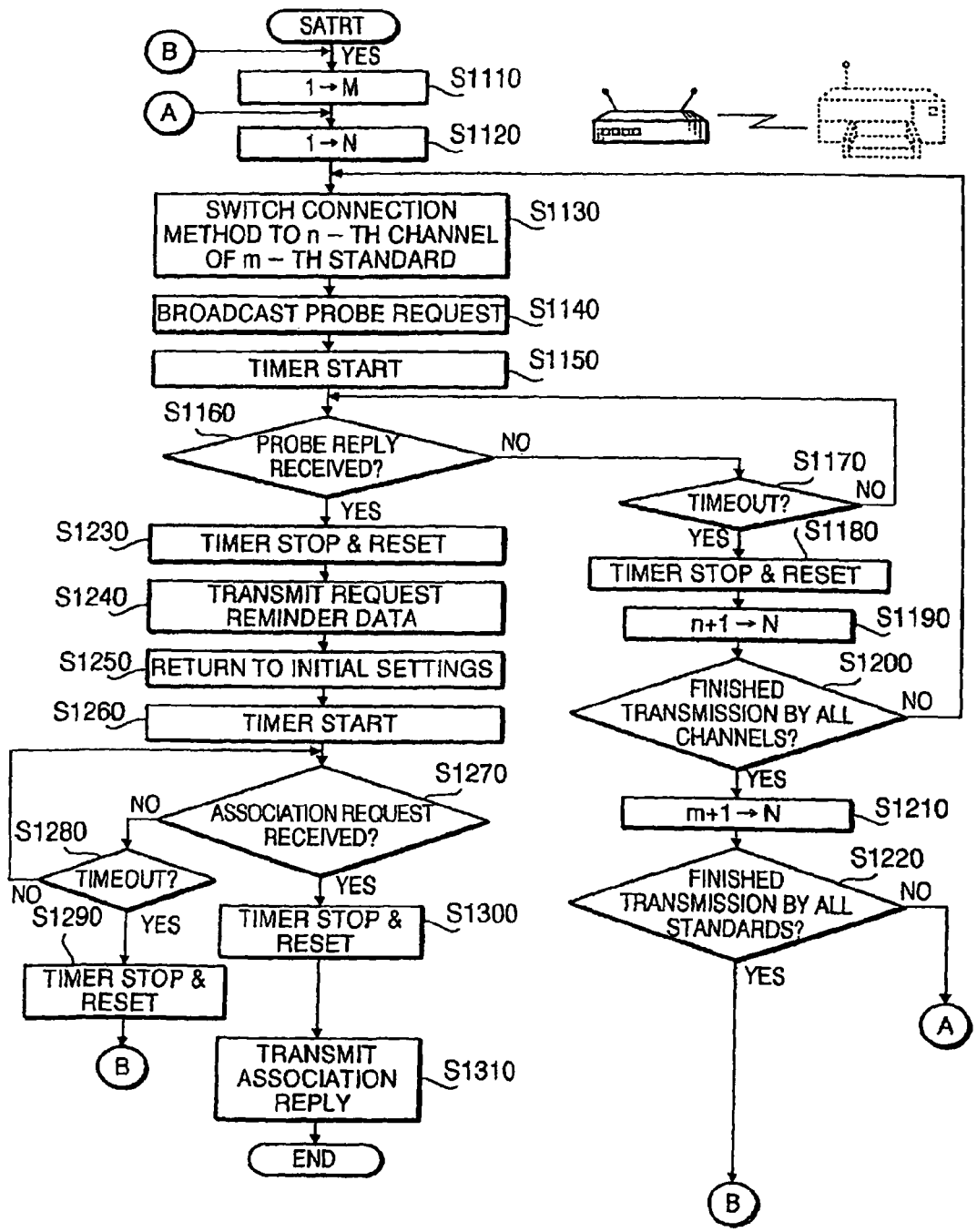
FIG. 23 is a flowchart (No. 1) showing the procedure of a connection method instruction process in a sixth embodiment.

While the access point 10 returns to the step S1110 when the judgment in the step S1220 of FIG. 23 is "YES" in the above embodiment, the access point 10 may also end the connection method instruction process (FIG. 23) via a step (S1221) for returning its connection method to the initial settings when the judgment is "YES", as shown in FIG. 26.

Embodiment 7

A wireless LAN system in accordance with a seventh embodiment of the present invention is composed similarly to the system of the sixth embodiment except for some steps executed by the printer 20, therefore, only different portions will be explained below.

<Connection Method Setting Process by Printer 20>

Figure 27:
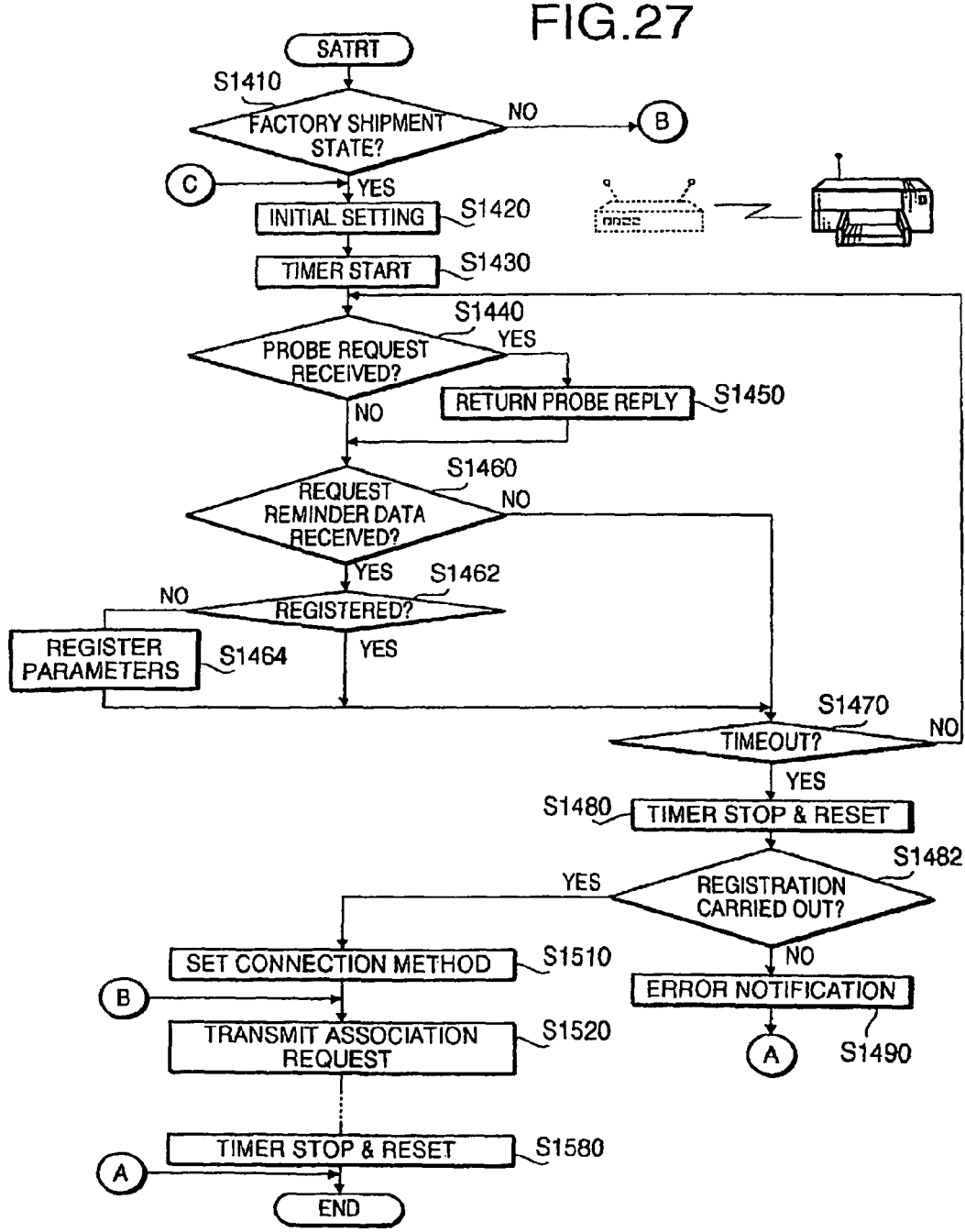
FIG. 27 is a flowchart showing the procedure of a connection method setting process in a seventh embodiment.

In the following, the connection method setting process which is conducted by the CPU 21 of the printer 20 will be described referring to FIG. 27. The connection method setting process of FIG. 27 is configured by adding a step S482 (explained below) between the steps S1480 and S1490 of the connection method setting process in the first embodiment (FIG. 25) and replacing the step S1500 of the process with steps S1462 and S1464 (explained below), therefore, only the procedure different from the first embodiment will be described in detail. In the following explanation, steps identical with those of the sixth embodiment will be referred to with the same step Nos. and detailed explanation thereof is omitted for brevity.

If a request reminder data has been received from the access point 10 in the step S1460 (S1460: YES), whether the request reminder data has already been registered or not is checked (S1462). In this connection method setting process, parameters specified by the request reminder data are registered in a posterior step. Therefore, in the step S1462, the received request reminder data is judged to have already been registered if the parameters specified by the request reminder data have already been registered.

If the request reminder data has not been registered yet (S1462: NO), the parameters specified by the request reminder data are registered, by storing the parameters in a parameter storage area of the RAM 23 (S1464). In this embodiment, the access point 10 is configured to transmit a request reminder data containing not only the SSID but also parameters indicating the device ID of the access point 10, the connection method preset to the access point 10, etc. in the step S1240 of FIG. 23. In the step S1464, the parameters are registered together with a value indicating the reception level (radio field intensity) when the request reminder data was received, associating them with one another. An example of a data structure of a data table is shown in FIG. 28, with which table the parameters specified by the request reminder data are registered.

After finishing the step S1464, or if the request reminder data has already been registered in the step S1462 (S1462: YES), the process advances to the step S1470 similarly to the case of "NO" of the step S1460.

After finishing the steps S1470 and S1480, whether or not the registration of parameters has been carried out in the step S1464 is checked (S1482). In this step, the registration of parameters in the step S1464 is judged to have been carried out if data (data table) indicating the parameters have been stored in the parameter storage area of the RAM 23.

If the parameter registration has been carried out (S1482: YES), the process advances to the step S1510, otherwise (S1482: NO) the process advances to step S1490.

In the step S1510, from the "parameters indicating the connection method" registered in the step S1464, a set of "parameters indicating the connection method" corresponding to the highest reception level is selected and stored in the ROM 22, by which the connection method is set.

In the wireless LAN system composed as above, the following effects can be achieved in addition to the effects attained by the first embodiment.

The printer 20 is capable of setting a connection method specified by the request reminder data having the highest reception level among the request reminder data collected (registered) in a preset time period (S1464 in FIG. 27) as its connection method for the connection to the wireless access point (S1510 in FIG. 27).

Such setting of the connection method (for the connection to the wireless access point) specified by the request reminder data having the highest reception level is advantageous for preventing erroneous setting of the connection method of the printer 20 to a false connection method different from the method for the connection to the correct wireless access point.

If another wireless access point similar to the access point 10 (wireless access point) of the present invention also exists in the vicinity of the printer 20 (e.g. in an adjacent residence) when the connection method (for the connection to the wireless access point) is set to the printer 20, request reminder data is sent also from the (other) wireless access point and thus there is a possibility that a connection method identical with the method set to the (other) wireless access point might be set to the printer 20 regardless of the user's intention, depending on the timing of the reception of request reminder data.

However, since the second embodiment enables the setting of the connection method (for the connection to the wireless access point) that is specified by the request reminder data having the highest reception level as above, the erroneous connection method setting based on the request reminder data from other wireless access points can be avoided only by putting the printer 20 and the access point 10 sufficiently in the vicinity of each other for gaining enough reception level during the radio communication.

Embodiment 8

A wireless LAN system in accordance with a third embodiment of the present invention is composed similarly to the system of the first embodiment except for some steps executed by the access point 10, therefore, only the point of difference will be explained below.

<Connection Method Instruction Process by Access Point 10>

In the following, a connection method instruction process which is conducted by the CPU 11 of the access point 10 will be described referring to FIG. 29. The connection method instruction process is configured by replacing the step S1230 of the connection method instruction process of the sixth embodiment (FIG. 23) with a step S1162 which will be explained below and adding a step S1222 (explained below) after the step S1220, therefore, only the procedure different from the sixth embodiment will be described in detail. In the following explanation, steps identical with those of the sixth embodiment will be referred to with the same step Nos. and detailed explanation thereof is omitted for brevity.

If a probe reply has been received in the step S1160 (S1160: YES), parameters specified by the probe reply are registered by storing them in a parameter storage area of the RAM 13 (S1162). In this embodiment, the printer 20 returns the probe reply which contains the SSID and the device ID in the step S1450 of FIG. 25. In the step S1162, the SSID and the device ID are registered together with parameters indicating the connection method and the reception level at the point when the probe reply was received in the step S1160, associating them with one another.

After finishing the step S1162, the process advances to the step S1170, similarly to the case of "NO" in the step S1160.

After the steps S1170-S1220, if the judgment in the step S1220 is "YES", whether or not the registration of parameters has been carried out in the step S1162 is checked (S1222). In this step, the registration of parameters in the step S1162 is judged to have been carried out if data indicating the parameters have been stored in the parameter storage area of the RAM 13.

If the parameter registration has been carried out in the step S1222 (S1222: YES), the process returns not to the step S1110 but to step S1240. In the step S1240, the request reminder data is transmitted to a single wireless station only, according to the SSID and the connection method corresponding to (associated with) the highest reception level that are selected from the parameters registered in the step S1162.

On the other hand, if the parameter registration has not been carried out in the step S1222 (S1222: NO), the connection method instruction process is ended.

In the wireless LAN system composed as above, the following effects can be achieved in addition to the effects attained by the first embodiment.

The access point 10 is capable of setting the connection method to the wireless station returning the probe reply of the highest reception level by transmitting the request reminder data to the wireless station.

Therefore, erroneous transmission of the request reminder data to a different wireless station (different from the wireless station (printer 20) to which the connection method should be set) and the setting of the connection method to the different wireless station can be avoided only by putting the access point 10 and the printer 20 sufficiently in the vicinity of each other for gaining enough reception level during the radio communication similarly to the seventh embodiment.

Modification of Embodiment 8

The eighth embodiment can also be implemented with part of its composition altered to other composition as shown below. Incidentally, the composition shown below is also applicable to similar parts of other embodiments.

Figure 29:
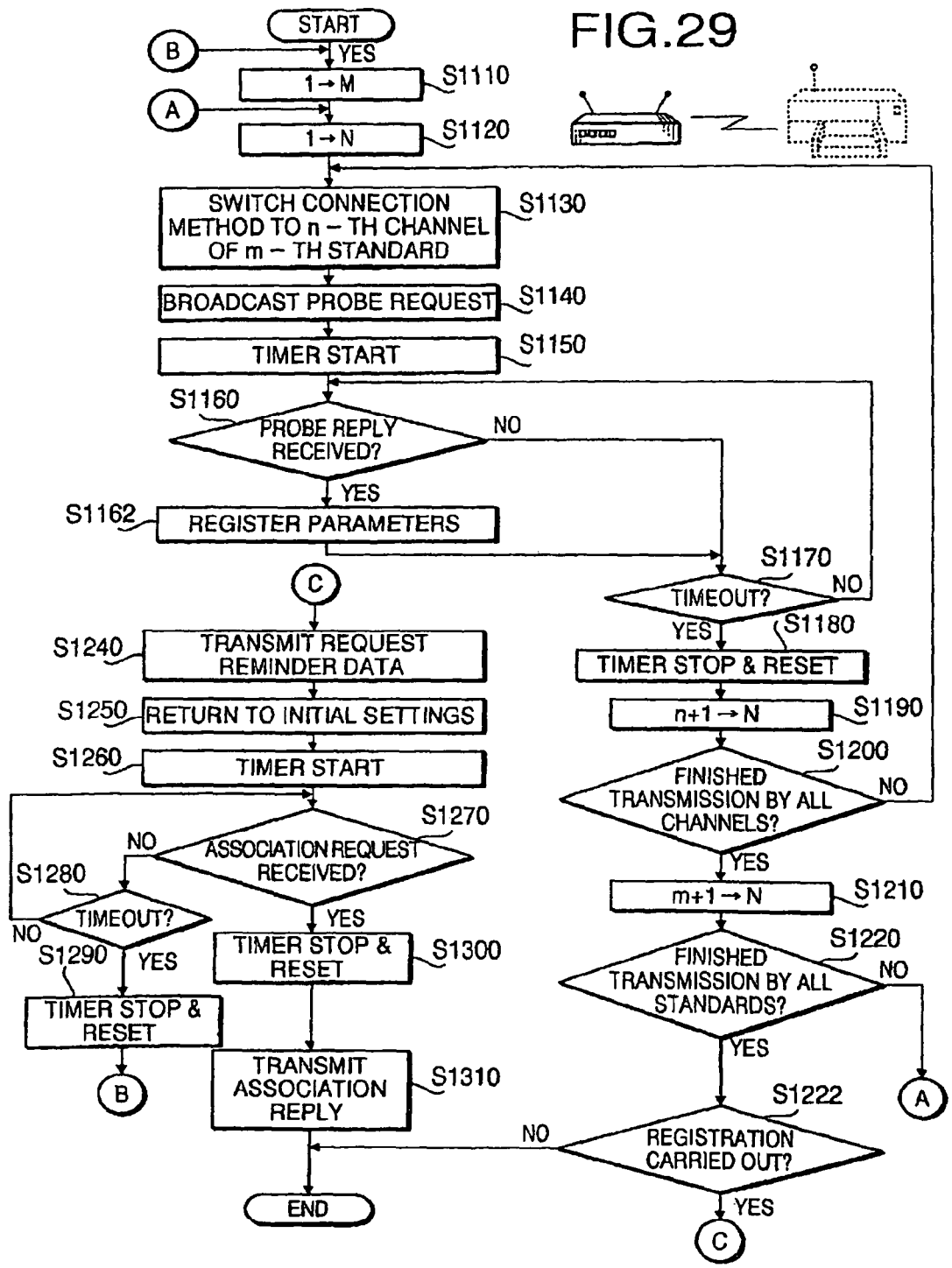
FIG. 29 is a flowchart showing the procedure of a connection method instruction process in a eighth embodiment.

While the access point 10 transmits the request reminder data to the wireless station returning the probe reply of the highest reception level in the step S1240 of FIG. 29, the access point 10 may also be configured to transmit the request reminder data to any wireless stations returning the probe reply of a reception level higher than a threshold level in the step S1240.

Embodiment 9

A wireless LAN system in accordance with a ninth embodiment of the present invention is composed similarly to the system of the sixth embodiment except for some steps executed by the access point 10, therefore, only the point of difference will be explained below.

<Connection Method Instruction Process by Access Point 10>

In the following, a connection method instruction process which is conducted by the CPU 11 of the access point 10 will be described referring to FIG. 30. The connection method instruction process is configured by adding steps S1224 and S1226 (explained below) after the step S1222 of the connection method instruction process of the eighth embodiment (FIG. 28), therefore, only the procedure different from the sixth embodiment will be described in detail. In the following explanation, steps identical with those of the eighth embodiment will be referred to with the same step Nos. and detailed explanation thereof is omitted for brevity.

In this embodiment, the printer 20 returns the probe reply which contains the SSID, a device name and the device ID in the step S1450 of FIG. 25. In the step S1162 of the connection method instruction process of this embodiment, the SSID, the device name and the device ID are registered together with parameters indicating the connection method and the reception level at the point when the probe reply was received in the step S1160, associating them with one another.

Afterward, if the parameter registration has been carried out in the step S1222 (S1222: YES), a device name list containing the parameters registered in the step S162 is displayed on the display panel 17 in order to inform the user of the device names. After the list is displayed on the display panel 17, the user can make a selection of a device name from the device names on the list (selection operation) through the operation panel 16.

The selection operation is waited for until it is made by the user (S1226: NO).

When the selection operation is made (S1226: YES), the process advances to the step S240. Incidentally, to the parameter corresponding to the device name selected by the selection operation, a selection flag indicating the selection by the selection operation is set (initial value "0" is turned into "1").

In the step S1240, the request reminder data is transmitted to the selected wireless station, according to the parameters (SSID and connection method) to which the selection flag has been set (i.e. parameters selected from the parameters registered in the step S1162).

In the wireless LAN system composed as above, the following effects can be achieved in addition to the effects attained by the third embodiment.

Figure 30:
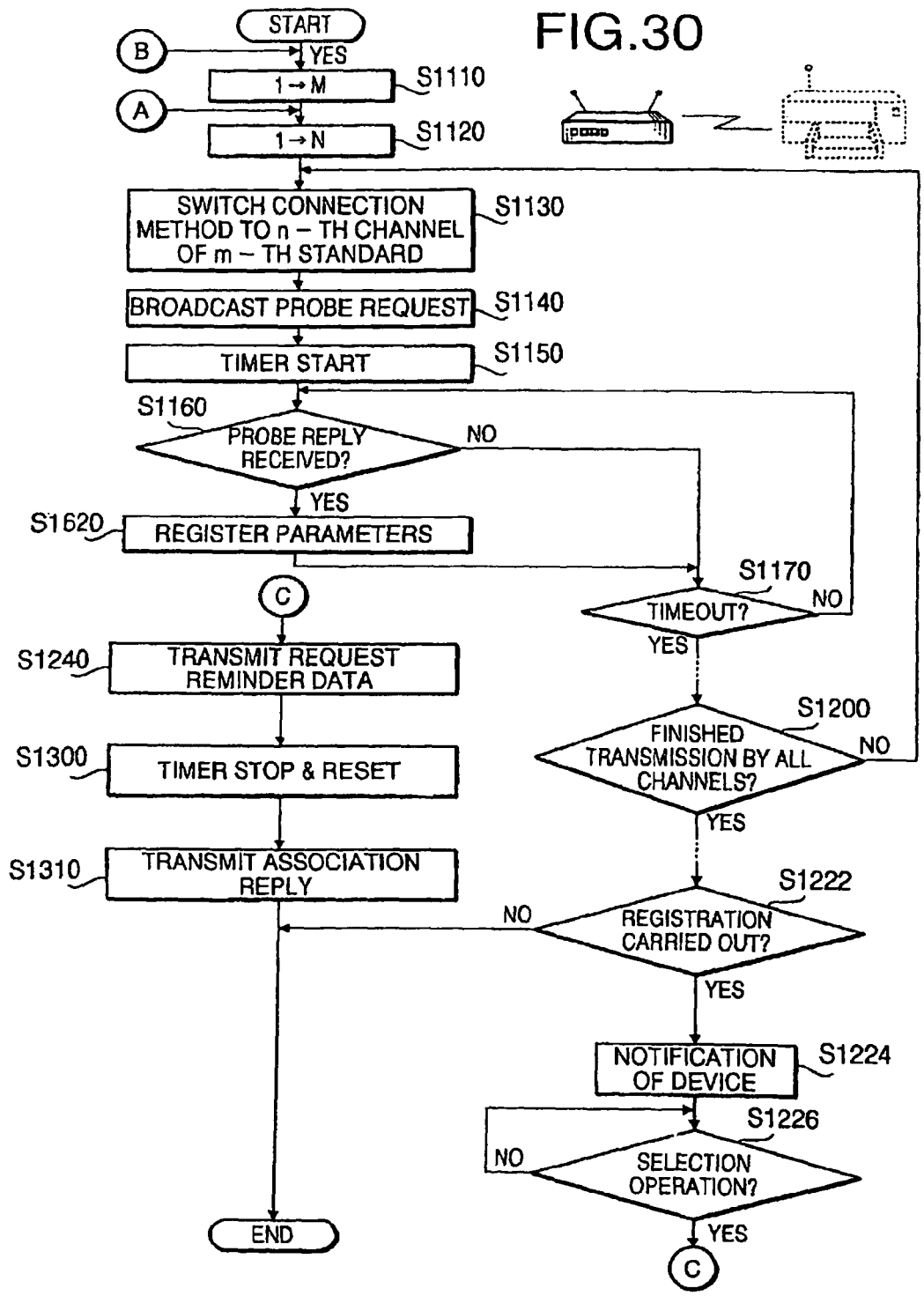
FIG. 30 is a flowchart showing the procedure of a connection method instruction process in a ninth embodiment.

The access point 10 is capable of setting the connection method only to the wireless station having the device name that is arbitrarily selected by the user (e.g. printer 20) by transmitting the request reminder data to the wireless station (steps S1224, S1226 and S1240 in FIG. 30).

Modification of Embodiment 9

The ninth embodiment can also be implemented with part of its composition altered to other composition as shown below. Incidentally, the composition shown below is also applicable to similar parts of other embodiments.

While the selection operation by the user in the steps S1224 and S1226 of FIG. 30 is carried out based on the device names, the selection operation may also be carried out based on the device IDs instead of the device names. In this case, the connection method can be set to the wireless station having the device ID arbitrarily selected by the user by transmitting the request reminder data to the wireless station only.

Embodiment 10

A wireless LAN system in accordance with a tenth embodiment of the present invention is composed similarly to the system of the ninth embodiment. The tenth embodiment is configured so that the notification of device names and the selection operation (carried out by the access point 10 in the fourth embodiment) can be executed by a commonly used computer system 30 (hereinafter referred to as a "PC 30") which is connected to the access point 10 to communicate data via a cable 100 (see FIG. 1).

<Connection Method Instruction Process by Access Point 10>

In the following, a connection method instruction process which is conducted by the CPU 11 of the access point 10 will be described referring to FIG. 31. The connection method instruction process is configured by replacing the steps S1224 and S1226 of the connection method instruction process of the fourth embodiment (FIG. 30) with steps S1228 and S1229 which will be explained below, therefore, only the procedure different from the fourth embodiment will be described in detail. The connection method instruction process is started after start instruction data is received from the PC 30 (see "START INSTRUCTION" in FIG. 32).

If the parameter registration has been carried out in the step S1222 (S1222: YES), listing data, representing the list of the device names specified by the registered parameters, is generated and transmitted to the PC 30 (the device which transmitted the start instruction data) (S1228). The PC 30 which received the listing data (see "LISTING DATA" in FIG. 32) displays the list represented by the listing data on its display, by which the user is informed of the device names. Thereafter, when the selection operation (for selecting a device name from the device names on the list) is made by the user, selection data which can specify the selected device name is generated and transmitted to the access point 10 (see "SELECTION DATA" in FIG. 32).

After the transmission of the listing data in the step S1228, reception of the selection data is waited for (S1229: NO). When the selection data is received (S1229: YES), the process advances to step S1240.

In the step S1240, the request reminder data is transmitted to the selected wireless station according to the parameters (SSID and connection method) corresponding to (associated with) the device name specified by the selection data received in the step S1229.

<Setting Instruction Process by PC 30>

In the following, a setting instruction process which is conducted by the PC 30 will be described. It should be noted that the setting instruction process is similar to that shown in FIG. 10. The setting instruction process is executed according to a program installed in the PC 30.

First, the start instruction data is transmitted to the access point 10 (S610). The access point 10 which received the start instruction data starts the aforementioned connection method instruction process of FIG. 31 (see "START INSTRUCTION" in FIG. 32) and transmits the aforementioned listing data after a while.

The listing data from the access point 10 is waited for until it is received (S620: NO).

When the listing data is received (S620: YES), the content of the listing data is displayed on the display of the PC 30 (S630). After the list of device names represented by the listing data is displayed (see FIG. 13), the user can make the selection operation (for selecting a device name) by use of a keyboard, mouse, etc.

The selection operation is waited for until it is made by the user (S640: NO). When the selection operation is made (S640: YES), the selection data which can specify the device name selected by the selection operation is generated and transmitted to the access point 10 (S650). The access point 10 which received the selection data (see "SELECTION DATA" in FIG. 32) transmits the request reminder data to the wireless station having the device name specified by the selection data (see "REQUEST REMINDER" in FIG. 32).

In the wireless LAN system composed as above, the following effects can be achieved in addition to the effects attained by the ninth embodiment.

The access point 10 is capable of setting the connection method only to the wireless station (e.g. printer 20) having the device name that is specified by the selection data received from the PC 30 (i.e. the device name that is arbitrarily selected by the user from the device names which have been registered based on the probe replies) by transmitting the request reminder data to the wireless station.

Modification of Embodiment 10

The tenth embodiment can also be implemented with part of its composition altered to other composition as shown below. Incidentally, the composition shown below is also applicable to similar parts of other embodiments.

Figure 31:
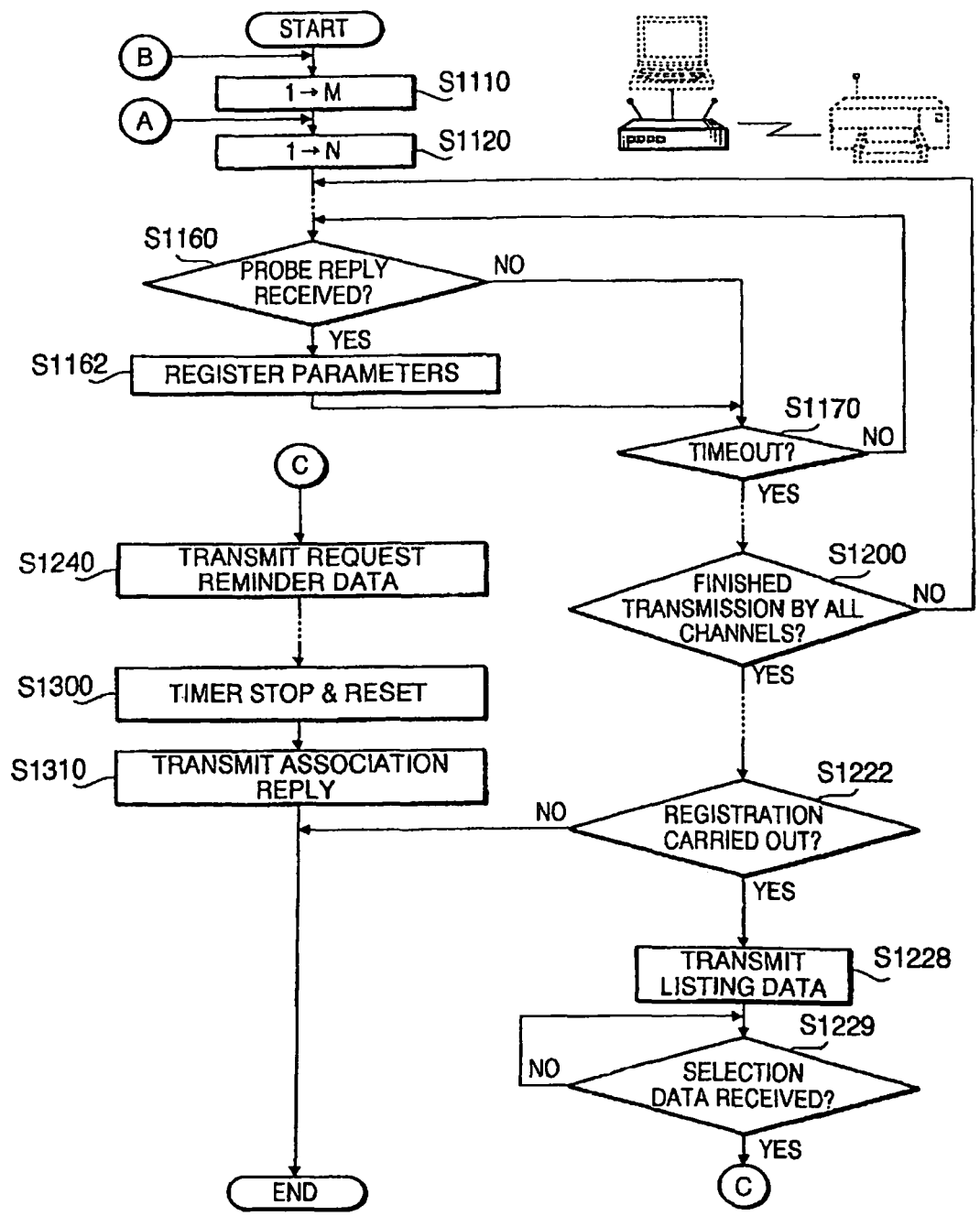
FIG. 31 is a flowchart showing the procedure of a connection method instruction process in a tenth embodiment.

For example, while the access point 10 generates the listing data which represents the list of device names in the step S1228 of FIG. 31, the access point 10 may also be configured to generate and transmit listing data that represents a list of device IDs, let the user of the PC 30 carry out the selection operation based on the device IDs instead of the device names, and transmit the request reminder data to the selected wireless station according to the parameters (SSID and connection method) corresponding to (associated with) the selected device ID in the step S1240. In this case, the connection method can be set only to the wireless station having the device ID arbitrarily selected by the user of the PC 30 by transmitting the request reminder data to the wireless station.

Figure 32:
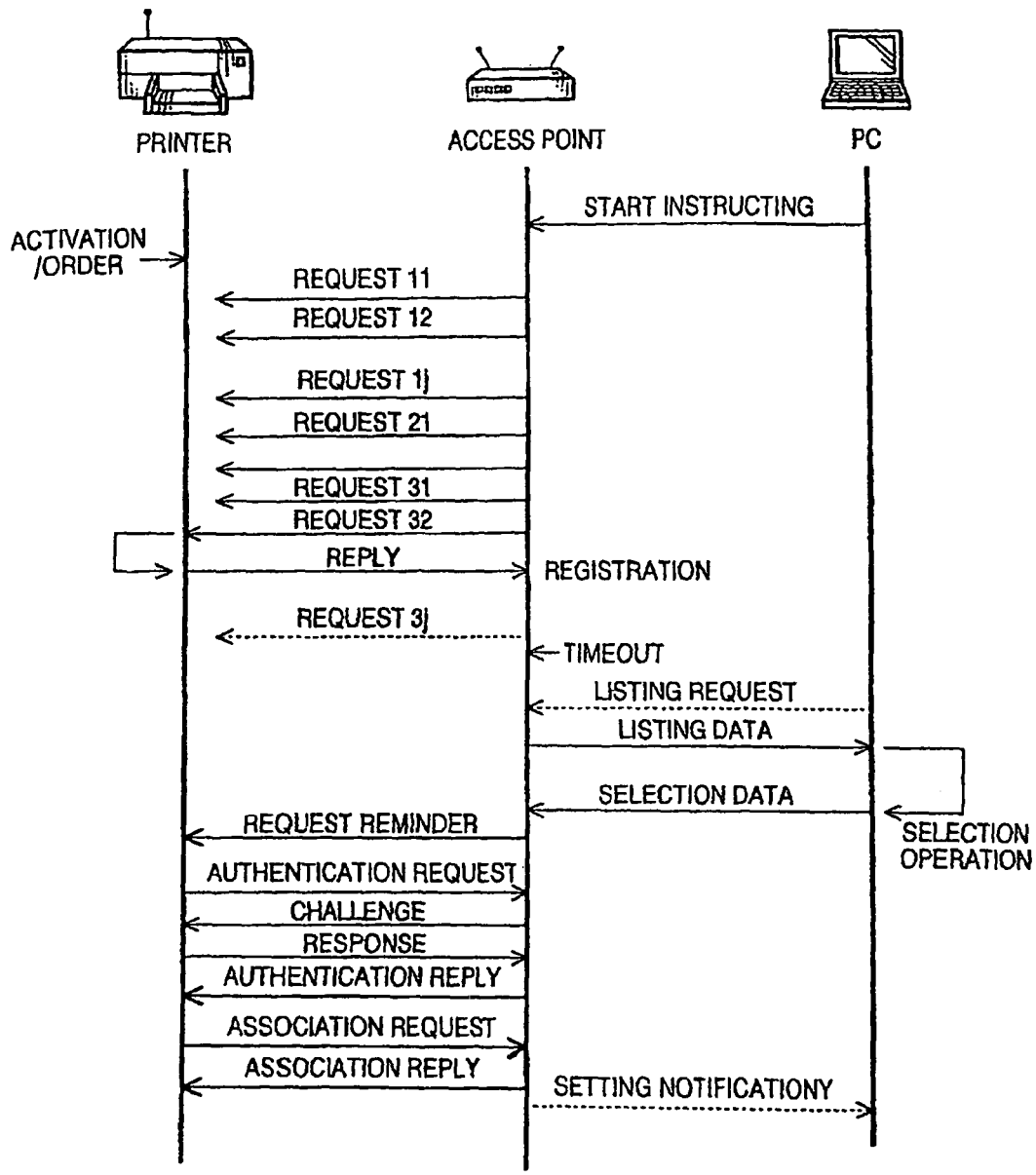
FIG. 32 is a sequence chart showing communication of data between the access point and the printer in the tenth embodiment.
Figure 33:
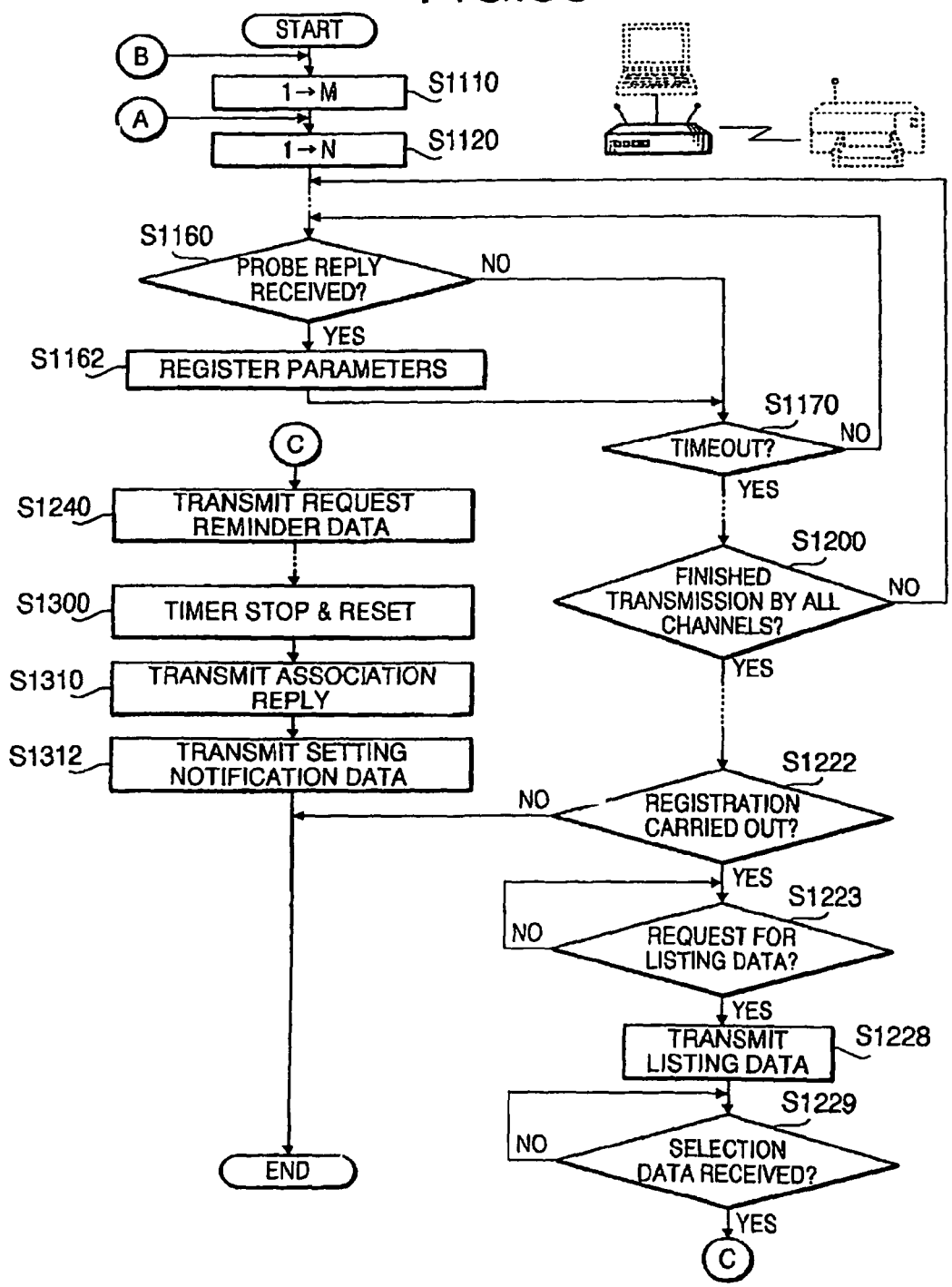
FIG. 33 is a flowchart (No. 2) showing the procedure of a connection method instruction process in the tenth embodiment.

While the access point 10 registers (collects) the parameters for a prescribed time period and thereafter transmits the listing data generated based on the collected parameters in the above embodiment, the access point 10 may also be configured to generate and the transmit the listing data at the point when a request for transmission is received from the PC 30 (see "LISTING REQUEST" in FIG. 32). For this configuration, similar to the process shown in FIG. 14, a step for waiting for an operation requesting the listing data (step S612) is added between the steps S610 and S620 of FIG. 13 and a step for requesting (the transmission of) the listing data in response to the above operation (step S614) is added after the step S612 as shown in FIG. 14, and a step for waiting for the request from the PC 30 (step S1223) is added between the steps S1222 and S1228 of FIG. 31 as shown in FIG. 33, for example. Also in this configuration, the selection operation may also be carried out based on the device IDs instead of the device names, similarly to the configuration mentioned above.

It is also possible in the above embodiment to configure the access point 10 to notify the PC 30 that the connection method has been set (or will be set) to the wireless station after the access point 10 has transmitted the request reminder data to the wireless station (printer 20). For this configuration, a step for transmitting setting notification data (for the notification of the execution of the setting) to the PC 30 (S1312) is added after the step S1310 of FIG. 31 as shown in FIG. 33, and a step for waiting for the setting notification data (S652) and a step for notifying the user that the connection method has been set to the wireless station in response to the reception of the setting notification data (S654) are added after the step S650 of FIG. 12 as shown in FIG. 14, for example.

Embodiment 11

In the embodiments described above, even if the printer 20 is connected to the access point 10 by wireless connection, if the access point 10 is configured to carry out data communication employing encryption, normal data communication is generally impossible without similarly configuring the printer 20 to execute the data communication employing the encryption. Therefore, the wireless LAN system of this embodiment is designed for letting the wireless LAN system of the above tenth embodiment carry out data communication normally without the need of operations by the user.

First, if a "parameter regarding security" is stored in the ROM 12, the access point 10 starts executing communication with security measures based on the parameter. As the "parameter regarding security", an encryption key for carrying out the communication in an encrypted state (e.g. WEP (Wired Equivalent Privacy) key in this embodiment) can be employed for example. If an encryption key has been stored in the ROM 12, the access point 10 (CPU 11) carries out the communication with the wireless station by encrypting data with the encryption key. Incidentally, the encryption key is generated and stored in the ROM 12 by the aforementioned remote setup.

Meanwhile, if a "parameter regarding security" is stored in the ROM 22, the printer 20 starts executing communication with security measures based on the parameter. As the "parameter regarding security", an encryption key can be employed similarly to the case of the access point 10. If an encryption key has been stored in the ROM 22, the printer 20 (CPU 21) carries out the communication with the wireless access point by encrypting data with the encryption key.

<Connection Method Instruction Process by Access Point 10>

Figure 34:
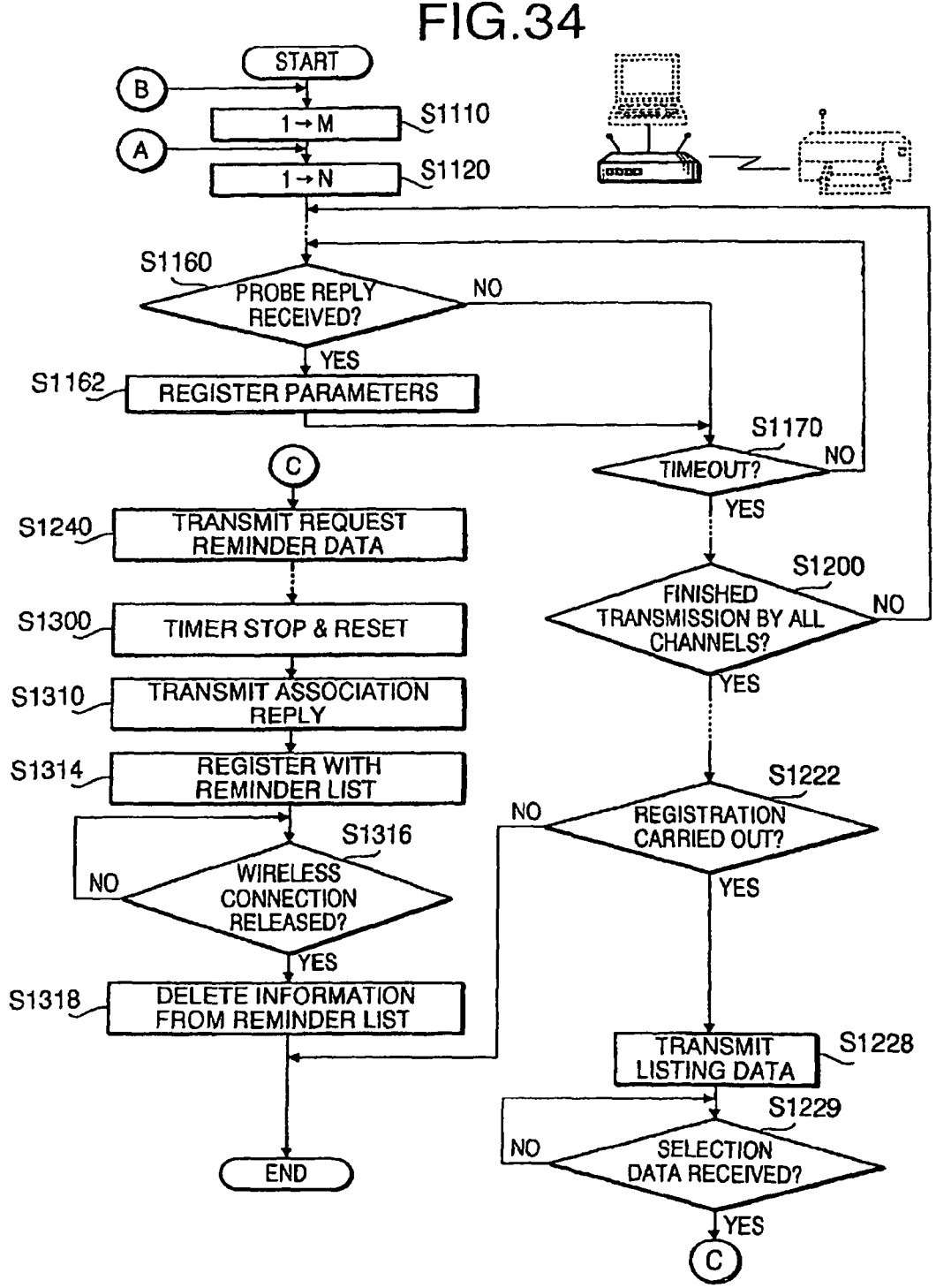
FIG. 34 is a flowchart showing the procedure of a connection method instruction process in a eleventh embodiment.

In the following, a connection method instruction process which is conducted by the CPU 11 of the access point 10 will be described referring to FIG. 34. The connection method instruction process is configured by adding steps S1314, S1316 and S1318 (explained below) after the step S310 of the connection method instruction process of the tenth embodiment (FIG. 31), therefore, only the procedure different from the tenth embodiment will be described in detail.

In the step S1240 in this embodiment, an encryption key that is different from the ordinary encryption key stored in the ROM 12 (hereinafter referred to as a "tentative encryption key") is generated randomly, and a request reminder data to which the tentative encryption key is attached is transmitted to the wireless station.

After finishing the sequence to the step S1310 after transmitting the request reminder data in the step S1240, the device name and the device ID of the wireless station (to which the request reminder data was transmitted in the step S1240) are registered with a reminder list associating them with the tentative encryption key attached to the request reminder data in the step S1240 (S1314). The "reminder list" is a data table which is generated in the RAM 13 for the registration of the data.

The release of the wireless connection with the wireless station registered with the reminder list in the step S1314 is waited for (S1316: NO). When the wireless connection is released (S1316: YES), the information registered with the reminder list is deleted (S1318) and the connection method instruction process is ended.

<Connection Method Settling Process by Printer 20>

Figure 35:
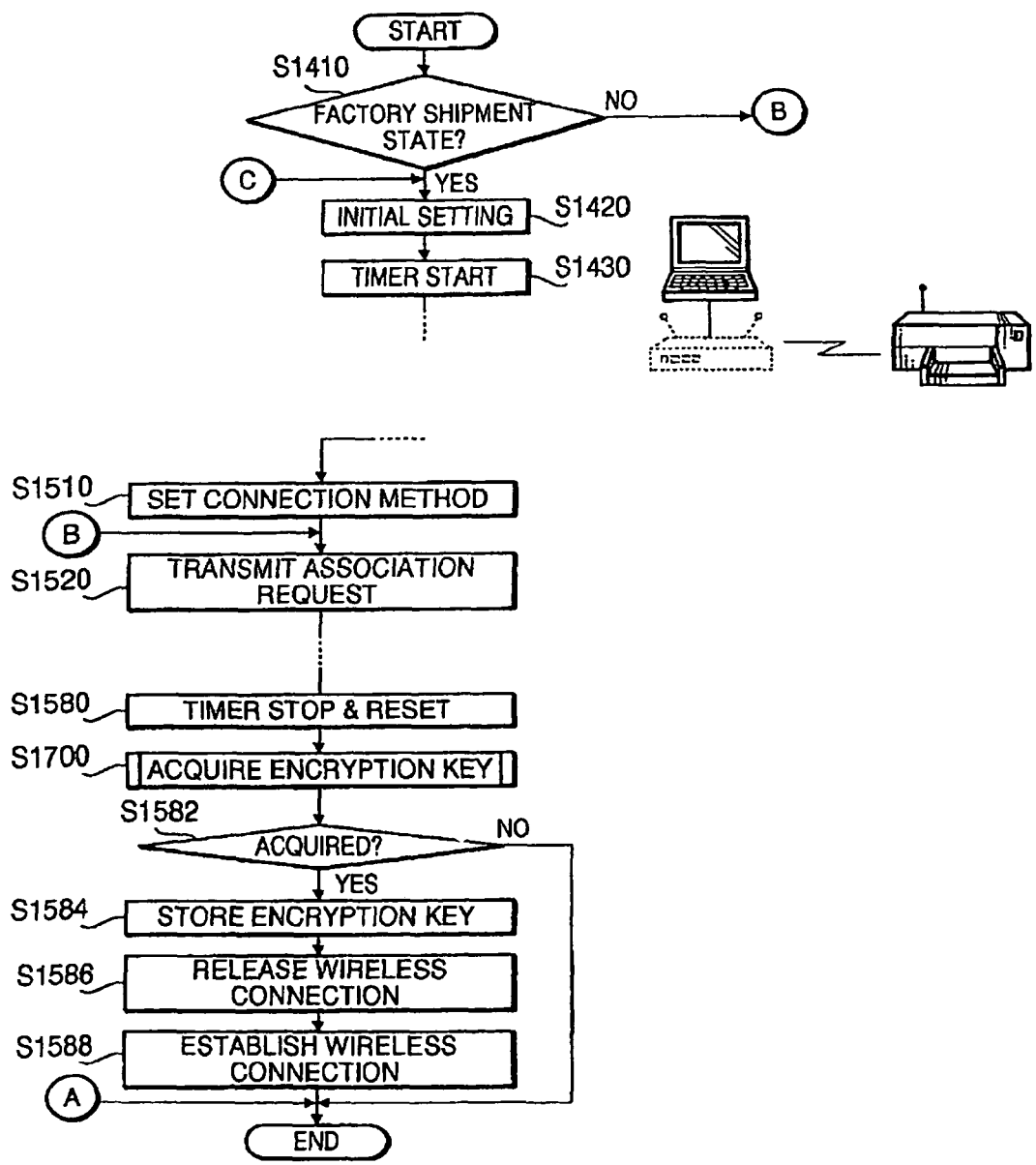
FIG. 35 is a flowchart showing the procedure of a connection method setting process in the eleventh embodiment.

In the following, a "connection method settling process" which is conducted by the CPU 21 of the printer 20 will be described referring to FIG. 35. The connection method settling process is a process configured by adding a sequence explained below after the step S1580 of the connection method setting process of the seventh embodiment (FIG. 27). In the following explanation, steps identical with those of the seventh embodiment will be referred to with the same step Nos. and detailed explanation thereof is omitted for brevity.

First, after receiving the request reminder data in the step S1460 (see FIG. 27), the SSID specified by the request reminder data is stored in the ROM 22 and the tentative encryption key is stored in a storage area of the RAM 23 for the "parameter regarding security" in the step S1464. Thereafter, the connection method is set in the step S1510, by which the data communication with the wireless access point (access point 10) is carried out by encrypting data with the tentative encryption key stored in the storage area for the "parameter regarding security".

Figure 36:
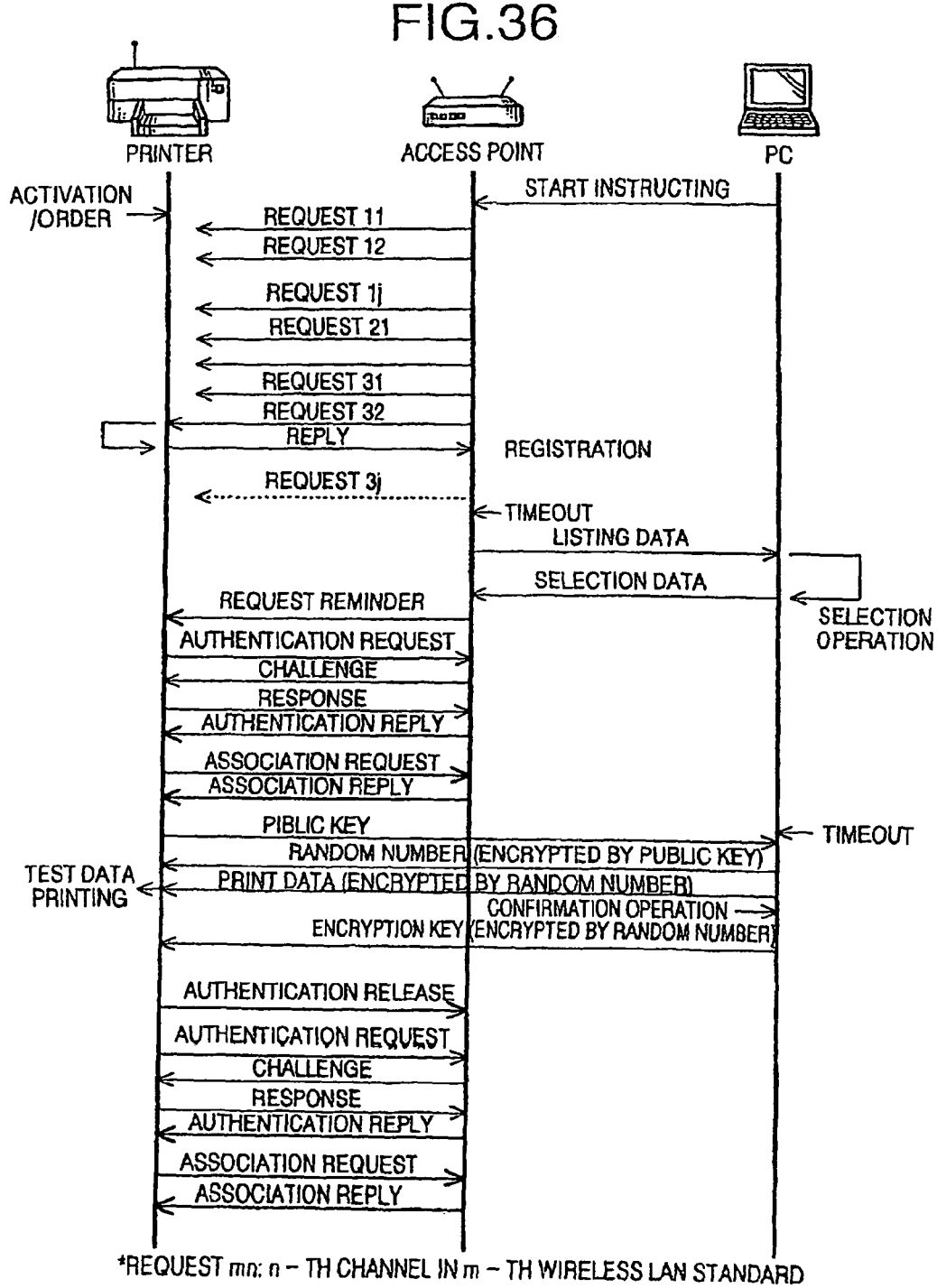
FIG. 36 is a sequence chart showing communication of data between the access point and the printer in the eleventh embodiment.

After finishing the step S1580, the encryption key of the access point 10 is acquired (S1700). The step S1700 is a step for acquiring the encryption key of the access point 10 from the PC 30 by means of the public key cryptosystem (see "ENCRYPTION KEY (ENCRYPTED BY RANDOM NUMBER)" in FIG. 36). The encryption key acquisition process in the step S1700 is similar to that explained above with reference to FIG. 17, and description thereof will not be repeated for the brevity.

If the encryption key is acquired successfully in the step S1700 (S1582:YES), the encryption key is stored in the ROM 22 (S1584). In this step, in addition to the storage of the encryption key in the ROM 22, deletion of the tentative encryption key from the RAM 23 is executed.

Subsequently, the wireless connection with the access point 10 is released (S1586). In this step, the wireless connection with the access point 10 is released by transmitting an authentication release message to the access point 10 (see "AUTHENTICATION RELEASE" in FIG. 36).

Subsequently, the wireless connection with the access point 10 is reestablished (S1588). In this step, the wireless connection is reestablished by exchanging the authentication request/reply with the access point 10 similarly to the aforementioned procedure. Incidentally, the exchange of the authentication request/reply in this step is carried out by means of shared key authentication (based on encryption) using the encryption key transferred to the printer 20. After the wireless connection is established by this step, data communication is executed by encrypting data with the encryption key rewritten in the step S1584.

After the step S5188, or if the encryption key has not been acquired in the step S1582 (S1582: NO), the connection method settling process is ended.

<Setting Instruction Process by PC 30>

In the following, a setting instruction process which is conducted by the PC 30 will be described. The setting instruction process is executed according to a program installed in the PC 30. The setting instruction process is configured by adding the procedure similar to that shown in FIG. 20 after the step S650 of the setting instruction process of the tenth embodiment (FIG. 10).

After the step S650 is finished, the public key transmitted from the printer 20 is waited for until it is received (S810: NO). The public key is the data which is transmitted by the printer 20 in the step S720 of FIG. 17.

When the public key is received (S810: YES), a random number (generated randomly) is encrypted by the public key and the encrypted random number is transmitted to the printer 20. The encrypted random number is the data which is received by the printer 20 in the step S730 of FIG. 17.

Subsequently, the print data representing the message image is encrypted by the random number received in the step S1810 and the encrypted print data is transmitted to the printer 20 (S830). The encrypted print data is the data which is received by the printer 20 in the step S740 of FIG. 17. The printer 20 which received the print data prints the message image, and the user conducts the confirmation operation to the PC 30 after the message image is printed out, as mentioned above. The confirmation operation is done by pressing a particular key/button, pressing keys/buttons in a particular order, etc.

The confirmation operation is waited for until it is done by the user (S840: NO).

When the confirmation operation is conducted (S840: YES), the encryption key is encrypted by the random number generated in the step S820 and the encrypted encryption key is transmitted to the printer 20 (S850). The encrypted encryption key is the data which is received by the printer 20 in the step S770 of FIG. 17. Incidentally, the encryption key is data which has previously been stored in memory, etc.

After finishing the step S850, the setting instruction process is ended.

<Encryption Switching Process by Access Point 10>

The access point 10 is configured to execute an encryption switching process when the time of data communication (transmission/reception of data) with a wireless station has come since its activation. It should be noted that the encryption switching process is similar to that shown in FIG. 19 and description there of will not be repeated for the brevity.

In the wireless LAN system composed as above, the following effects can be achieved in addition to the effects attained by the previous embodiments.

For a wireless station to which the request reminder data has been transmitted, the access point 10 switches its encryption method so as to execute data communication encrypting data with the tentative encryption key (S910 in FIG. 19). Meanwhile, the printer 20 which received the request reminder data sets its encryption method so as to execute the data communication with the access point 10 encrypting data with the tentative encryption key (S1510 in FIG. 35). By the procedure, normal data communication between the access point 10 and the printer 20 encrypting data with the tentative encryption key becomes possible, by which the data communication between the access point 10 and the printer 20 can be realized ensuring a certain security level while maintaining the security level of data communication of the access point 10 with external networks.

Subsequently, if the printer 20 successfully acquires the encryption key by the encryption key acquisition process (FIG. 19), the printer 20 reestablishes the wireless connection with the access point 10 (see steps S1586 and S1588 in FIG. 35), by which the data communication between the access point 10 and the printer 20 will thereafter be carried out by encrypting data with the encryption key transferred from the PC 30 to the printer 20. In the access point 10, the information registered with the reminder list is deleted at this point (see step S1318 in FIG. 34), by which the encryption method of the access point 10 is returned so as to execute the data communication with the printer 20 encrypting data with the encryption key. Therefore, the data communication between the access point 10 and the printer 20 can be realized with a security level equivalent to that of data communication of the access point 10 with other wireless stations or external networks.

Since the transfer of the encryption key from the PC 30 to the printer 20 is conducted by means of the public key cryptosystem, the probability of leak of the encryption key during the transmission to the printer 20 becomes low as a matter of course.

Further, the printer 20 prints the message image represented by the print data transferred from the PC 30 prior to the encryption key (see step S750 in FIG. 17). Thus, the user is allowed to confirm whether or not the printer 20 is a correct wireless station that should receive the encryption key from the PC 30, by checking whether or not the message image is printed by the printer 20. After confirming the message image, the user executes the confirmation operation to the PC 30 (see step S840 in FIG. 18), by which the transfer of the encryption key from the PC 30 to the printer 20 is enabled.

[Modifications]

While the present invention has been described with reference to the above particular illustrative embodiments, the present invention is not to be restricted by those embodiments but can also be implemented in various configurations.

For example, while a printer 20 is employed in the above embodiments as the wireless station of the present invention, any type of device capable of operating as a wireless station can be employed as the wireless station of the present invention.

While the PC 30 is connected to the access point 10 via the cable 100 in the above embodiments, the PC 30 may also be connected to the access point 10 by wireless connection in cases where the PC 30 has the wireless station function.

While all the sequence containing the transmission of the probe reply is not executed by the printer 20 in the above embodiments when the printer 20 is judged not to be in the factory shipment state (see step S1410 in FIGS. 25, 27 and 35), it is also possible to let the printer 20 transmit the probe reply in a state allowing the judgment on the factory shipment state and let the access point 10 cancel the registration regarding the probe reply or the transmission of the request reminder data.

Figure 37:
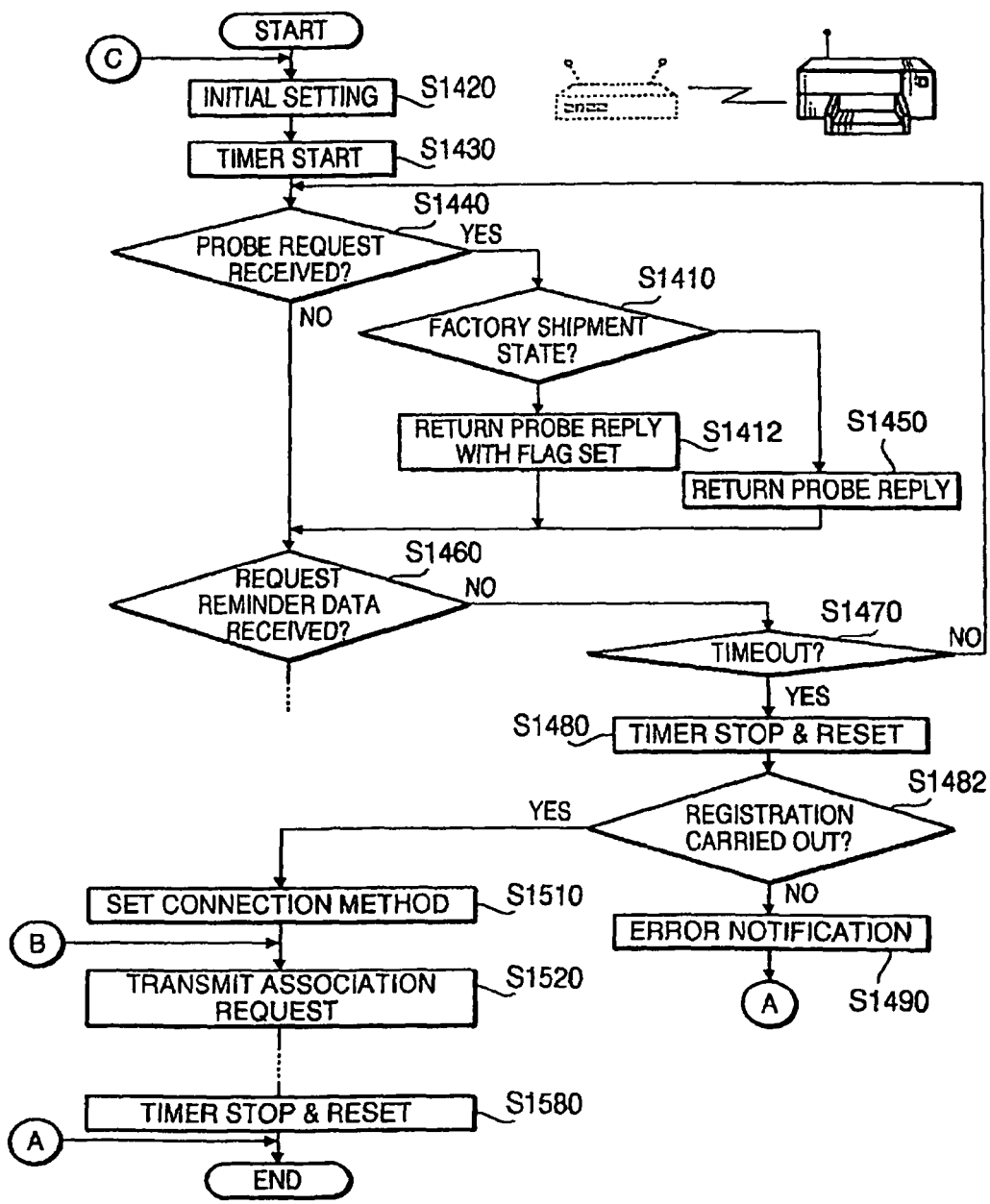
FIG. 37 is a flowchart showing the procedure of a connection method setting process in a modified embodiment.

For this, in the printer 20, the step S1410 is executed after the step S1440 as show in FIG. 37, for example. If "YES" in the step S1410, a probe reply, in which an "Unconfigured device" flag is set (set to "1"), is transmitted (S1412). If "NO" in the step S1410, an ordinary probe reply, in which the "Unconfigured device" flag is not set (set to "0"), is transmitted (S1450) and the process advances to the step S1460.

Figure 38:
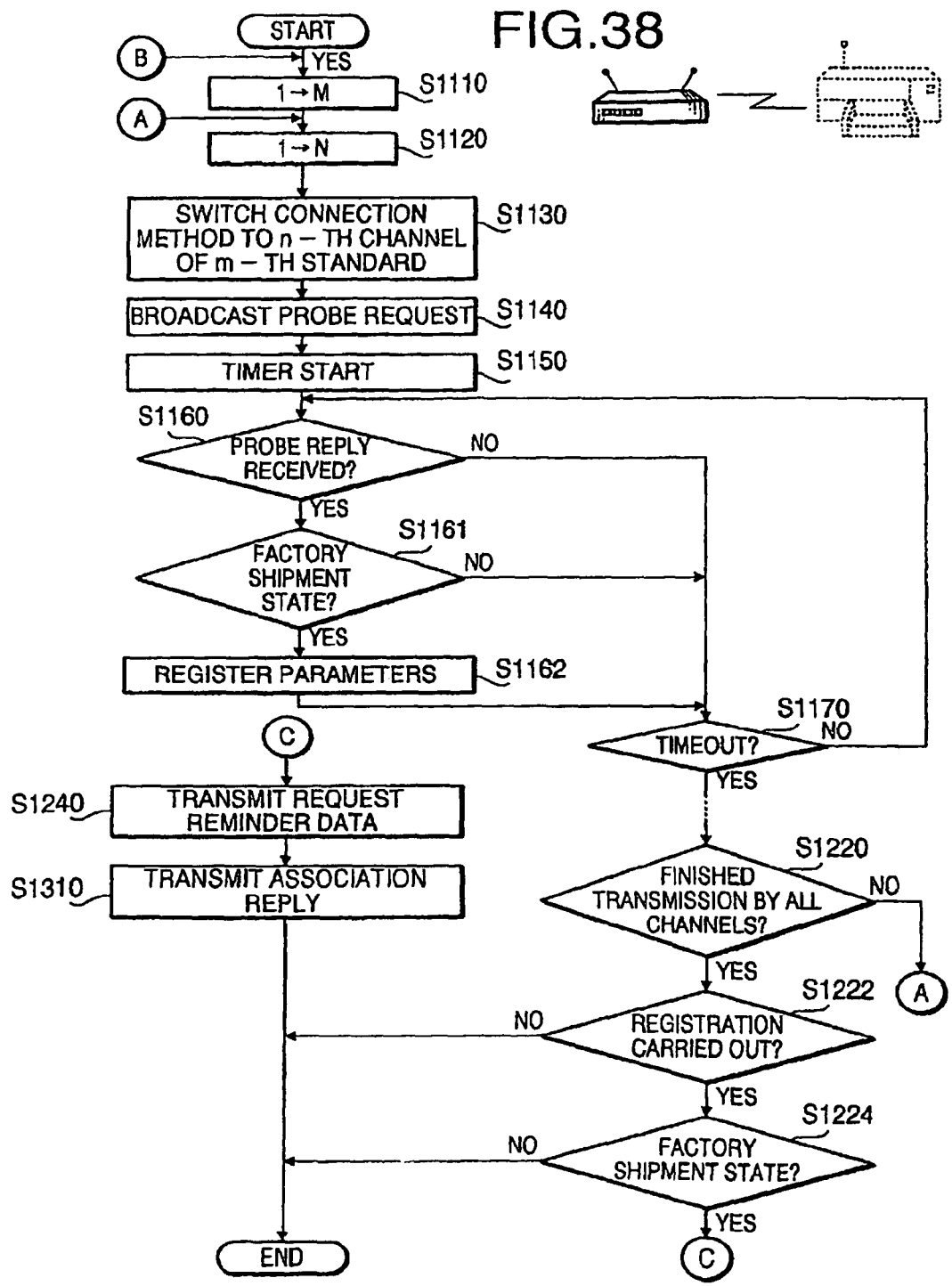
FIG. 38 is a flowchart showing the procedure of a connection method instruction process in the modified embodiment.

Meanwhile, in the access point 10, the following procedure is executed after the step S1160 or the step S1220 (S1222) of FIGS. 23, 26, 29, 30, 31, 33 and 34. For example, as shown in FIG. 38, after the step S1160, if the "Unconfigured device" flag in the received probe reply indicates that the wireless station (printer 20) is in its factory shipment state (S1161: YES), the process advances to the step S1230 (S1162), otherwise (S1161: NO) the process advances to the step S1170. In the case where the judgment in the step S1220 (S1222) is "YES", if the "Unconfigured device" flag in the received probe reply indicates that the wireless station is in its factory shipment state (S1224: YES), the process advances to the step S1240, otherwise (S1224: NO) the connection method instruction process is ended.

By such a configuration, the access point 10 is allowed to set the connection method (by carrying out the registration regarding the probe reply and the transmission of the request reminder data) only when the wireless station is in its factory shipment state.

Embodiment 12

A wireless LAN system in accordance with a twelfth embodiment will be described hereinafter. It should be noted that a hardware configuration of the wireless LAN system according to the sixth embodiment is similar to that shown in FIG. 1 and the description there of is omitted for the brevity.

<Connection Method Instruction Process by Access Point 10>

In the following, a connection method instruction process which is conducted by the CPU 11 of the access point 10 will be described referring to FIG. 39. The connection method instruction process is started when an instructing operation for switching the operation mode of the access point 10 into a "support mode" (for supporting the setting of the connection method of the wireless station) is made by the user to the operation panel 16 (e.g. pressing a particular button). Incidentally, the support mode is an operation mode which is enabled only in the connection method instruction process. When the connection method instruction process is ended, the operation mode of the access point 10 is returned from the support mode to "normal mode".

First, a variable M is initialized (S2110). In this step, a value "1" is set in the variable M (1→M). Incidentally, a character "m" in the following description system the value set in the variable M.

Subsequently, a variable N is initialized (S2120). In this step, a value "1" is set in the variable N (1→N). A character "n" in the following description system the value set in the variable N.

Subsequently, the method of wireless connection to the wireless station (hereinafter referred to as "connection method") is switched to a connection method implemented by the n-th channel of the m-th wireless LAN standard (S2130). In this step, the connection method employed by the wireless LAN controller 15 is switched by storing the parameters (for implementing a communication function by the connection method specified by the n-th channel of the m-th wireless LAN standard) in a storage area of the RAM 13 for the "parameters indicating the connection method" and letting the wireless LAN controller 15 control the connection method according to the memory content of the RAM 13. By this, the connection method will be controlled according to the memory content of the RAM 13 until next switching (for controlling the connection method according to the memory content of the ROM 12) is done in a posterior step (S2150). Incidentally, when the storage area for the "parameters indicating the connection method" already holds parameters, the parameters are overwritten with the new parameters.

Subsequently, a probe request is broadcast (transmitted using a broadcast address as the destination) (S2140). The "probe request" is well-known frame data which is transmitted by the wireless access point for inquiring whether there exists a wireless station located nearby the wireless access point. In this embodiment, the probe request is transmitted for the purpose of supporting the setting of the connection method of wireless stations (see "REQUEST 11"-"REQUEST 3f" in FIG. 40). The probe request contains the SSID used by the access point 10 for data communication with the wireless stations and the parameters indicating the connection method (the 2nd channel of the 1st wireless LAN standard) previously set to the access point 10. From the printer 20 which received the probe request, a probe reply is returned according to the same connection method as that of the access point 10 in the connection method setting process (FIG. 46) which will be explained later (see "REPLY" in FIG. 40).

Subsequently, the connection method is returned to the initial settings (S2150). In this step, the "parameters indicating the connection method" stored in the RAM 13 are deleted and thereafter data communication is carried out based on the "parameters indicating the connection method" stored in the ROM 12. The parameters stored in the ROM 12 are those that have been preset to the access point 10 as the initial settings. Thus, the connection method of the access point 10 is returned to the initial settings.

Subsequently, a timer is started (S2160). The timer started in this step will be used for checking whether or not the probe reply is returned within a preset time limit from a wireless station (printer 20) that should support the wireless connection setting.

Subsequently, whether the probe reply has been returned from a wireless station or not is checked (S2170).

If no probe reply has been returned (S2170: NO), whether or not a timeout has occurred since the transmission (broadcast) of the probe request is checked (S2180). In this step, the timeout is judged to have occurred if the timer which was started in the step S2160 has counted a preset length of time (250 msec in this embodiment).

If the timeout has not occurred (S2180: NO), the process returns to the step S170. If the timeout has occurred (S2180: YES), the timer started in the step S2160 is stopped and reset (S2190) and the variable N is incremented by 1 (n+1→N) (S2200).

Subsequently, whether the transmission of the probe request has been finished by use of all the channels of the m-th wireless LAN standard or not is checked (S2210). Since the number of usable channels is specified and fixed in each wireless LAN standard, the transmission of the probe request by all the channels is judged to have finished in the step S210 if the value n of the variable N has become larger than the number (j) of usable channels of the m-th wireless LAN standard (n>j).

If the transmission of the probe request by all the channels of the m-th wireless LAN standard has not been finished (S2210: NO), the process returns to the step S2130. Thereafter, the sequence from the step S130 to the step S2210 is repeated and thereby the transmission of the probe request is successively carried out by use of each channel of the m-th wireless LAN standard (see "REQUEST 11"-"REQUEST 1j" in FIG. 40).

After repeating the sequence from the step S2130 to the step S2210, if the transmission of the probe request by all the channels of the m-th wireless LAN standard has been finished (S2210: YES), the variable M is incremented by 1 (m+1→M) (S2220).

Subsequently, whether the transmission of the probe request has been finished by use of all the wireless LAN standards or not is checked (S2230). In this step, the transmission of the probe request by all wireless LAN standards is judged to have finished if the value m of the variable M has become larger than the number (i) of wireless LAN standards that can be used by the wireless LAN controller 15 for realizing communication (m>i).

If the transmission of the probe request by all the wireless LAN standards has not been finished (S2230: NO), the process returns to the step S2120.

Thereafter, the transmission of the probe request by use of the next wireless LAN standard is carried out by the sequence from the step S2120. By repeating the sequence from the step S120 to the step S2230, the transmission of the probe request is successively carried out by use of all the wireless LAN standards (see "REQUEST 11"-"REQUEST 3j" in FIG. 40).

After repeating the sequence from the step S2120 to the step S2230, if the transmission of the probe request by all the wireless LAN standards has been finished (S2230: YES), the process returns to the step S2110.

During the repetition of the sequence from the step S2120 to the step S2230, if the probe reply is returned from a wireless station (S2170: YES), the timer started in the step S2160 is stopped and reset (S2240) and a request reminder data is transmitted to the wireless station that returned the probe reply (S2250). The "request reminder data" is frame data which is used for reminding the wireless station (printer 20) to send a request for permission for wireless connection (association request) to the access point 10. The printer 20 which received the request reminder data transmits the association request to the access point 10 in the connection method setting process (FIG. 36) which will be explained later.

Subsequently, another timer is started (S2260). The timer started in this step will be used for checking whether or not the association request is returned from the wireless station (printer 20) within a preset time limit.

Subsequently, whether the association request has been received from the wireless station or not is checked (S2270).

If the association request has not been received (S2270: NO), whether or not a timeout has occurred since the transmission of the request reminder data is checked (S2280). In this step, the timeout is judged to have occurred if the timer started in the step S2260 has counted a preset length of time (250 msec in this embodiment).

If the timeout has not occurred (S2280: NO), the process returns to the step S270. If the timeout has occurred (S2280: YES), the timer started in the step S2260 is stopped and reset (S2290) and the process returns to the step S2110.

In the step S2270, if the association request has been received (S2270: YES), the timer is stopped and reset similarly to the step S2290 (S2300), and an association reply (permitting the wireless connection to the access point 10) is transmitted to the printer 20 that returned the association request (S2310).

As described above, the wireless connection between the access point 10 and the printer 20 is established by the exchange of the association request and association reply.

Figure 40:
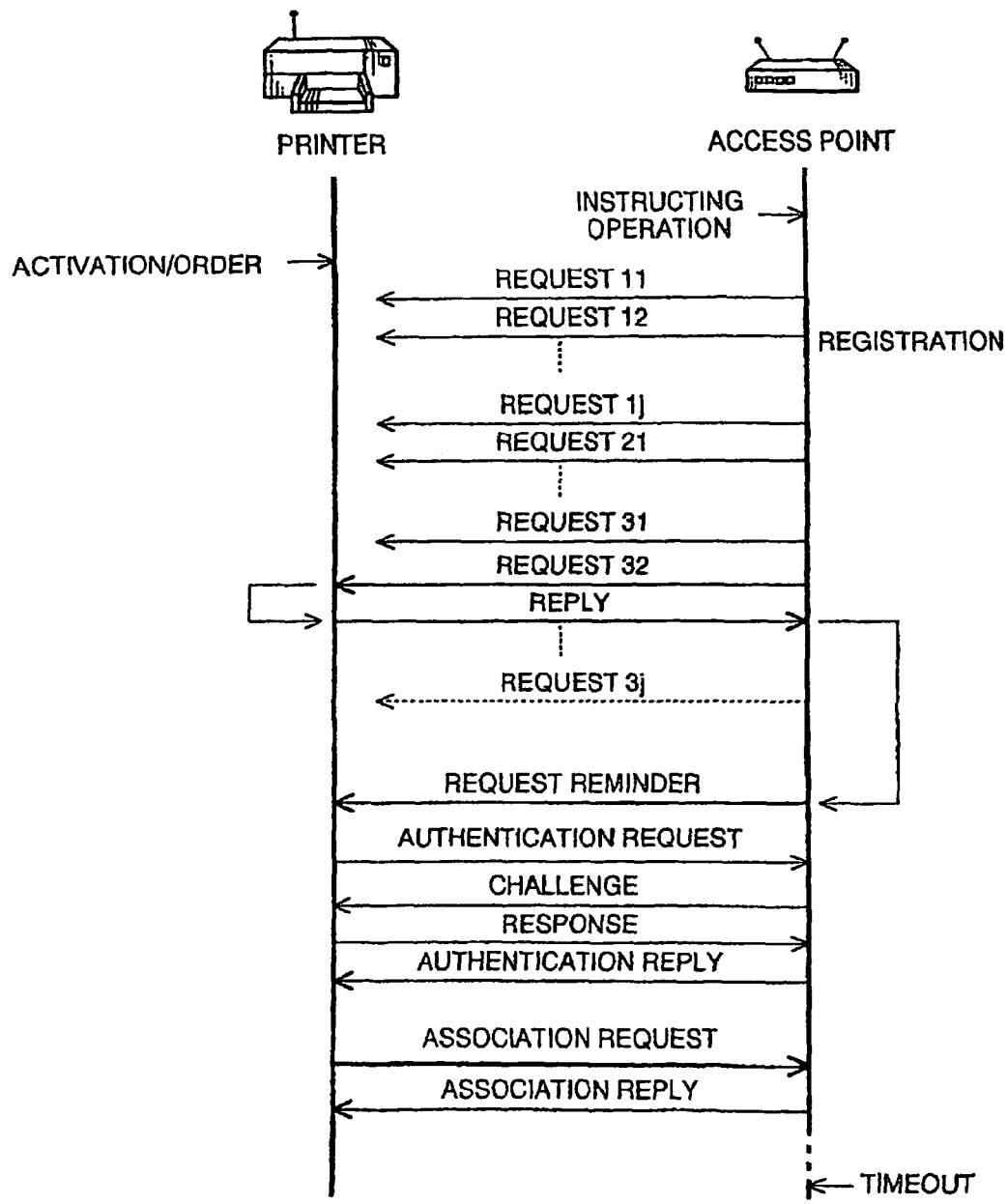
FIG. 40 is a sequence chart showing communication of data between an access point and a printer in the twelfth embodiment.

In this embodiment, although detailed explanation is omitted, before the exchange of the association request and association reply, an authentication request and an authentication reply are exchanged between the printer 20 and the access point 10 (similarly to ordinary wireless connection procedures) after the request reminder data from the access point 10 is received by the printer 20 (see "AUTHENTICATION REQUEST"-"AUTHENTICATION REPLY" in FIG. 40). Incidentally, since the first embodiment does not employ encryption for data communication, the exchange of the authentication request/reply is done as open authentication (authentication without encryption).

<Connection Method Setting Process by Printer 20>

In the following, the connection method setting process which is conducted by the CPU 21 of the printer 20 will be described referring to FIG. 41. The connection method setting process is started when the printer 20 is activated.

First, whether the printer 20 itself is in the factory shipment state or not is checked (S2410). In this step, the printer 20 is judged to be in its factory shipment state if no "parameters indicating the connection method" are stored in the ROM 22.

If in the factory shipment state (S2410: YES), the initial settings are made (S2420). In this step, the initial settings are made by storing parameters that have been preset as the "parameters indicating the connection method" in the ROM 22. In this embodiment, parameters indicating a connection method specified by the 2nd channel of the 3rd wireless LAN standard are stored in the ROM 22 as the "parameters indicating the connection method".

Subsequently, a timer is started (S2430). The timer started in this step will be used for checking whether or not data is transmitted from a wireless access point (that should set the connection method) within a preset time limit. In this embodiment, the "wireless access point that should set the connection method" system the access point 10, and the "data" means data that is transmitted by the access point 10 in the aforementioned connection method instruction process (FIG. 39). Therefore, the user sets the connection method (for the connection to the access point 10) to the printer 20 by activating the printer 20 (i.e. starting this connection method setting process) after letting the access point 10 start the aforementioned connection method instruction process (FIG. 44) (see "INSTRUCTING OPERATION" to the access point 10 and "ACTIVATION" to the printer 20 in FIG. 40).

Subsequently, whether a probe request has been received from a wireless access point or not is checked (S2440). The "probe request" is well-known frame data (MAC frame) which is transmitted by the wireless access point for inquiring whether there exists a wireless station located nearby the wireless access point, that is, data transmitted (broadcast) from the access point 10 in the step S2140 of FIG. 39. Specifically, in the step S2440, whether a probe request according to the connection method that has been set to the printer 20 itself (i.e. the connection method that has been set as the initial settings) has been received or not is checked (see "REQUEST 11"-"REQUEST 3*j*" in FIG. 40).

If a probe request has been received (S2440: YES), the connection method for the connection to the wireless access point is set based on the probe request (S2450). In this step, the connection method for the connection to the wireless access point is set by storing the "SSID" and the "parameters indicating the connection method" stored in the probe request in the ROM 22. By the above process, the printer 20 becomes capable of the wireless connection with the access point 10 and the data communication using the SSID.

Subsequently, a probe reply is returned according to the connection method set in the step S2450 (S2460). The probe reply is the data which is received by the access point 10 in the step S2170 of FIG. 39 (see "REPLY" in FIG. 40).

After finishing the step S2460, or if no probe request has been received (S2440: NO), whether a request reminder data has been received from the wireless access point or not is checked (S2470). The request reminder data is the data which is transmitted by the access point 10 (which received the probe reply transmitted in the step S2460) in the step S2250 of FIG. 39.

If no request reminder data has been received (S2470: NO), whether or not a timeout has occurred regarding the data reception from the wireless access point is checked (S2480). In this step, the timeout is judged to have occurred if the timer started in the step S2430 has counted a preset length of time (30 sec in this embodiment).

If the timeout has not occurred (S2480: NO), the process returns to the step S2440.

After repeating the sequence from the step S2440 to the step S2480, if the timeout has occurred (S2480: YES), the timer started in the step S2430 is stopped and reset (S2490), error notification is executed (S2500), and the connection method setting process is ended. In the step S2500, the user is notified of an error by an error message (indicating, for example, that there exists no wireless access point functioning normally around the printer 20) displayed on the display panel 49.

During the repetition of the sequence from the step S2440 to the step S2480, if a request reminder data is received (S2470: YES), the timer started in the step S2430 is stopped and reset (S2510).

After finishing the step S2510, or if the printer 20 is not in the factory shipment state in the aforementioned step S2410 (S2410: NO), an association request for requesting permission for wireless connection is transmitted to the access point 10 (S2520). The "association request" is frame data (management frame) for requesting wireless connection permission (permission for wireless connection) from the access point 10. In the step S2520, the SSID which was stored in the ROM 22 in the step S2450 is stored in the association request and transmitted (see "ASSOCIATION REQUEST" in FIG. 40). Incidentally, in the header (header information) of the association request, the device ID of the printer 20 (MAC address) is set (stored). From the access point 10 which received the association request, an association reply, as frame data (management frame) indicating the permission for the wireless connection to the access point 10, is returned (see "ASSOCIATION REPLY" in FIG. 40).

Subsequently, another timer is started (S2530). The timer started in this step will be used for checking whether or not the association reply is returned within a preset time limit.

Subsequently, whether or not a timeout has occurred since the transmission of the association request is checked (S2540). In this step, the timeout is judged to have occurred if the timer started in the step S2530 has counted a preset length of time (250 msec in this embodiment).

If the timeout has not occurred (S2540: NO), whether the association reply has been received from the access point 10 or not is checked (S2550). If the association reply has not been received (S2550: NO), the process returns to the step S2540.

Thereafter, the steps S2540 and S2550 are repeated and if the timeout (since the transmission of the association request) has occurred (S2540: YES), the timer started in the step S2530 is stopped and reset (S2570), and the process returns to the step S2420.

On the other hand, if the association reply has been received in the step S2550 (S2550: YES), the timer started in the step S2530 is stopped and reset (S2580), and the connection method setting process is ended.

In the wireless LAN system composed as above, the access point 10 transmits the probe request to the wireless stations (including the printer 20) according to each of a plurality of connection methods (see "REQUEST" in FIG. 40). The probe request is received by the printer 20 to which the same connection method has been set (see "REQUEST 32" in FIG. 40), and the printer 20 sets the connection method specified by the probe request (which is the same as the connection method which has been set to the access point 10) to itself. By setting the printer 20 to the same connection method as the access point 10 as above, wireless connection between the access point 10 and the printer 20 becomes possible.

Figure 41:
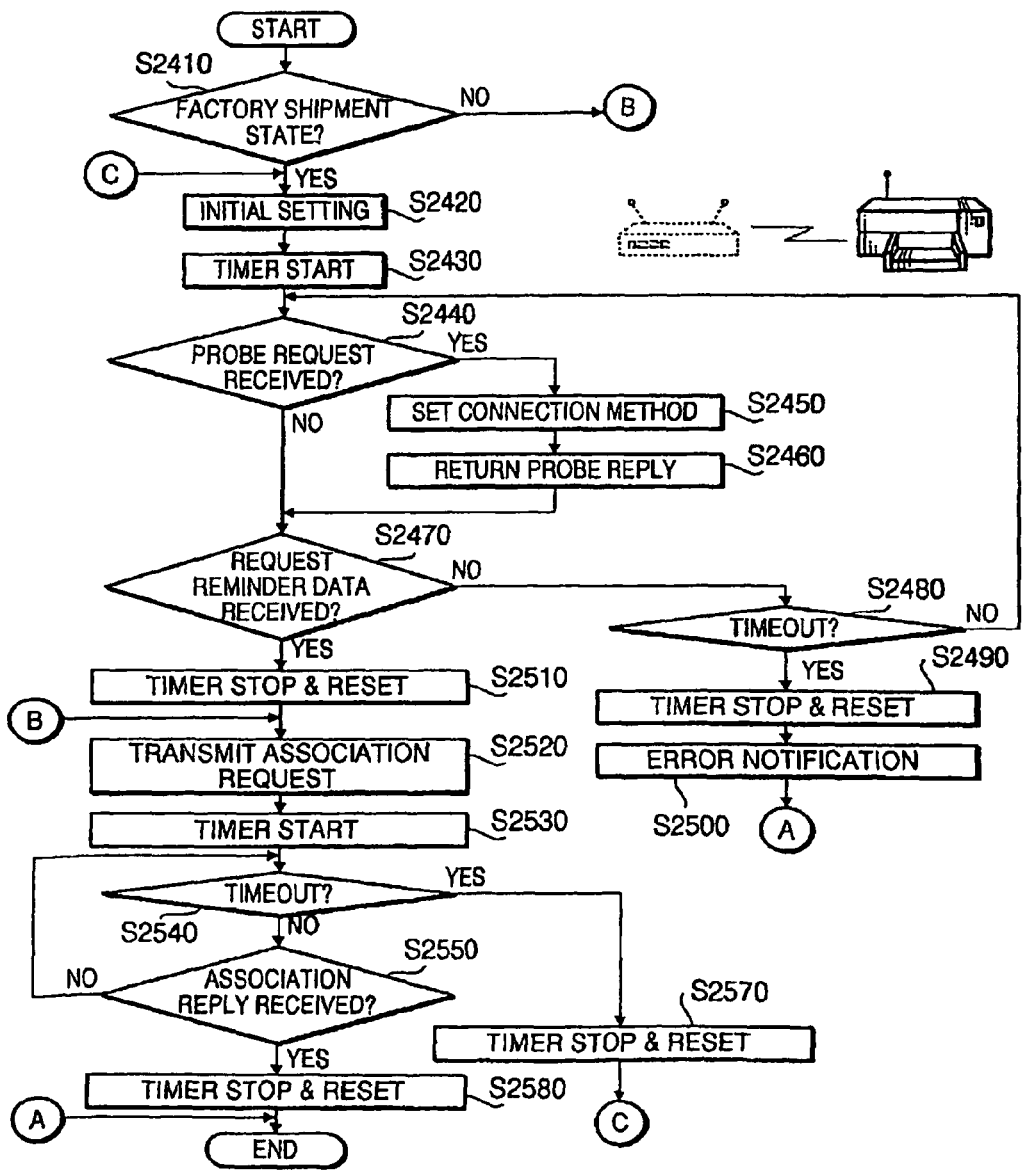
FIG. 41 is a flowchart showing the procedure of a connection method setting process in the twelfth embodiment.

As above, in the printer 20, the connection method for the connection to the access point 10 is set automatically via the reception of the probe request (S2440-S2460 in FIG. 41). Therefore, the load on the user regarding the wireless LAN settings can be lightened remarkably.

After the connection method has been set to the printer 20, the wireless connection between the access point 10 and the printer 20 can be established immediately via the exchange of the association request/reply.

The access point 10 transmits the probe requests while successively switching the connection method in turn at prescribed time intervals (S2110-S2230 in FIG. 39), and if a probe reply is received in a period before the switching to the next connection method (S2170), transmits the request reminder data according to the connection method at the point of the reception of the probe reply (S2250).

As above, the access point 10 can set the connection method (which has been preset to the access point 10 itself) to the printer 20 only by transmitting the probe requests according to each connection method while successively switching the connection method in turn.

Figure 44:
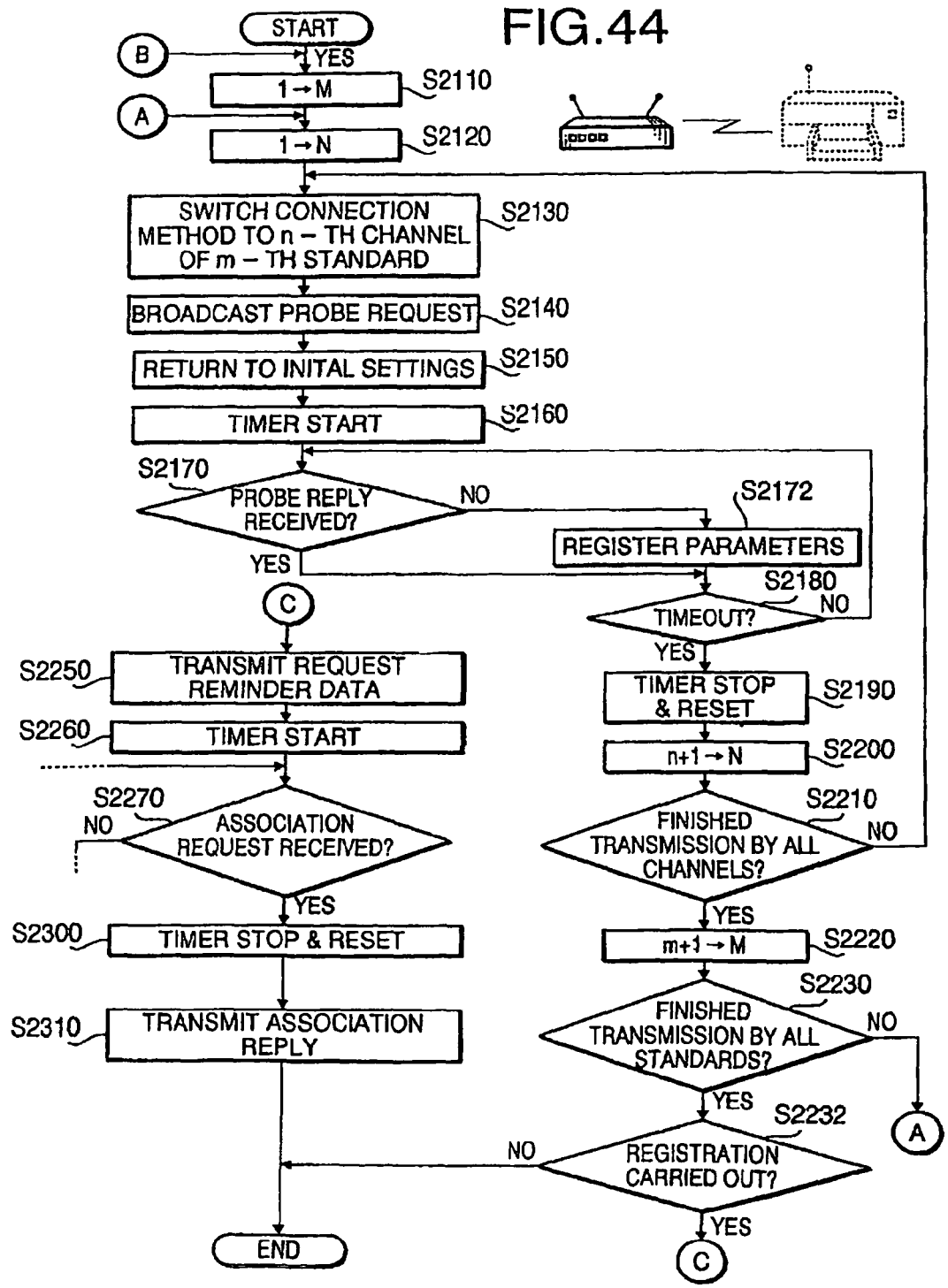
FIG. 44 is a flowchart showing the procedure of a connection method instruction process in a fourteenth embodiment.

The access point 10 is capable of transmitting the probe request according to each connection method by switching and changing the connection method temporarily (S2110-S2230 in FIG. 44). The period of time in which the connection method is changed (S2130-S2150 in FIG. 39) is limited to the period of transmission of the probe request, and the reply is made by the connection method previously set to the access point 10. During the period in which the connection method is changed from the preset connection method (S2130), the access point 10 generally can not carry out data communication which should be conducted according to the preset connection method. Therefore, the shortness of the period (in which the connection method is changed) is advantageous for avoiding the inconvenience of the interruption of data communication which should be conducted according to the preset connection method.

The starting of the connection method instruction process (FIG. 39) by the access point 10 can be ordered explicitly from outside by the instructing operation. Similarly, starting of the connection method setting process (FIG. 46) by the printer 20 can be ordered explicitly from outside by activating the printer 20.

The setting of the connection method to the printer 20 can be executed only when the printer 20 is in its factory shipment state (S2410 of FIG. 41).

Modification of Embodiment 12

The twelfth embodiment can also be implemented with part of its composition altered to other composition as shown below. Incidentally, the composition shown below is also applicable to similar parts of other embodiments.

For example, while the process from the step S2420 is executed only when the printer 20 is in its factory shipment state (S2410 of FIG. 41) in the above embodiment, it is also possible to configure the printer 20 to execute the process from the step S2420 even if it is not in the factory shipment state, in cases where the setting of the connection method is necessary (e.g. when part of the "parameters indicating the connection method" stored in the ROM 22 is lacking). While the step S2410 judges that the printer 20 is in the factory shipment state if no "parameters indicating the connection method" are stored in the ROM 22, it is also possible to set a specific flag at the stage of factory shipment and use the flag for indicating the factory shipment state. In this case, the printer 20 is judged to be in the factory shipment state if the flag is still set. The flag is reset when the "parameters indicating the connection method" are stored in the ROM 22.

While the association request and association reply are exchanged after the exchange of the authentication request and authentication reply in the above embodiment, it is also possible to omit the authentication request/reply and carry out the exchange of the association request/reply only.

While the setting of the connection method to the printer 20 is ordered and started by the activation of the printer 20 in the above embodiment, the order can also be issued by, for example, a particular operation through the operation panel 26 (see "ORDER" in FIG. 40).

While the operation mode of the access point 10 is switched by the instructing operation in the above embodiment, the access point 10 may also be configured to switch its operation mode when instructed by data which is sent from another device capable of communicating with the printer 20.

While the printer 20 in the above embodiment checks whether its in the factory shipment state or not (S2410 in FIG. 41) just after starting the connection method setting process and then executes the process from the step S2420, the timing of the check on the factory shipment state is not limited to the point just after the start of the connection method setting process. Before the step S2440, before the step S2510, etc. are also possible.

While the access point 10 in the above embodiment transmits a probe request as data for supporting the setting of the connection method of the wireless stations, data other than the probe request can also be employed as long as the same purpose can be achieved.

While the access point 10 in the above embodiment switches its connection method in numerical order starting from the 1st channel of the 1st wireless LAN standard, the order of the channel switching is not particularly limited. For example, a proper order for avoiding radio wave interference in the same wireless LAN standard may also be employed.

Figure 42:
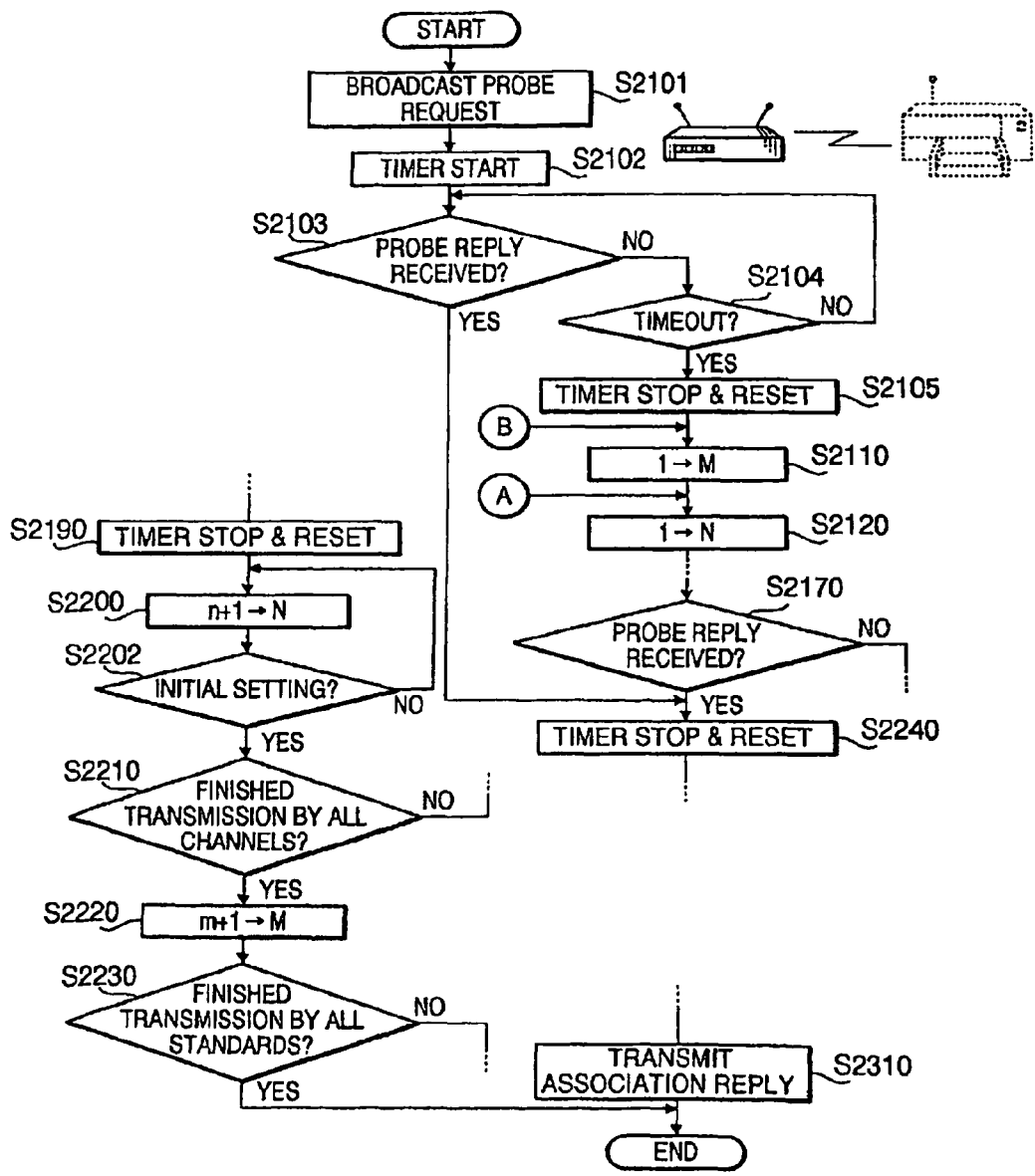
FIG. 42 is a flowchart (No. 2) showing the procedure of a connection method instruction process in the twelfth embodiment.

It is also possible to let the access point 10 first conduct the process from the step S140 with the connection method preset to itself and then repeat the same process by use of each connection method in numerical order starting from the 1st channel of the 1st wireless LAN standard. FIG. 42 shows an example of such a process flow, in which steps S2101-S2105 equivalent to the steps S2140, S2160-S2190 of FIG. 39 are added before the step S2110 of FIG. 39. If a probe reply to the probe request transmitted according to the preset connection method is received (S2103: YES), the process advances to the step S2240. On the other hand, if a timeout occurs without receiving the probe reply (S2104: YES), the timer is stopped and reset (S2105) and the process advances to the step S2110. Preferably, a judgment step may also be provided between the steps S2190 and S2200, by which the process advances to the step S2200 only when the connection method after incrementing the variable N by 1 is not identical with the initial settings, and otherwise (when the connection method after the increment is identical with the initial settings) the process returns to the step S2190.

By such composition, the wireless connection between the access point 10 and the printer 20 can be established immediately in cases where the printer 20 has the initial settings identical with the connection method preset to the access point 10.

Figure 39:
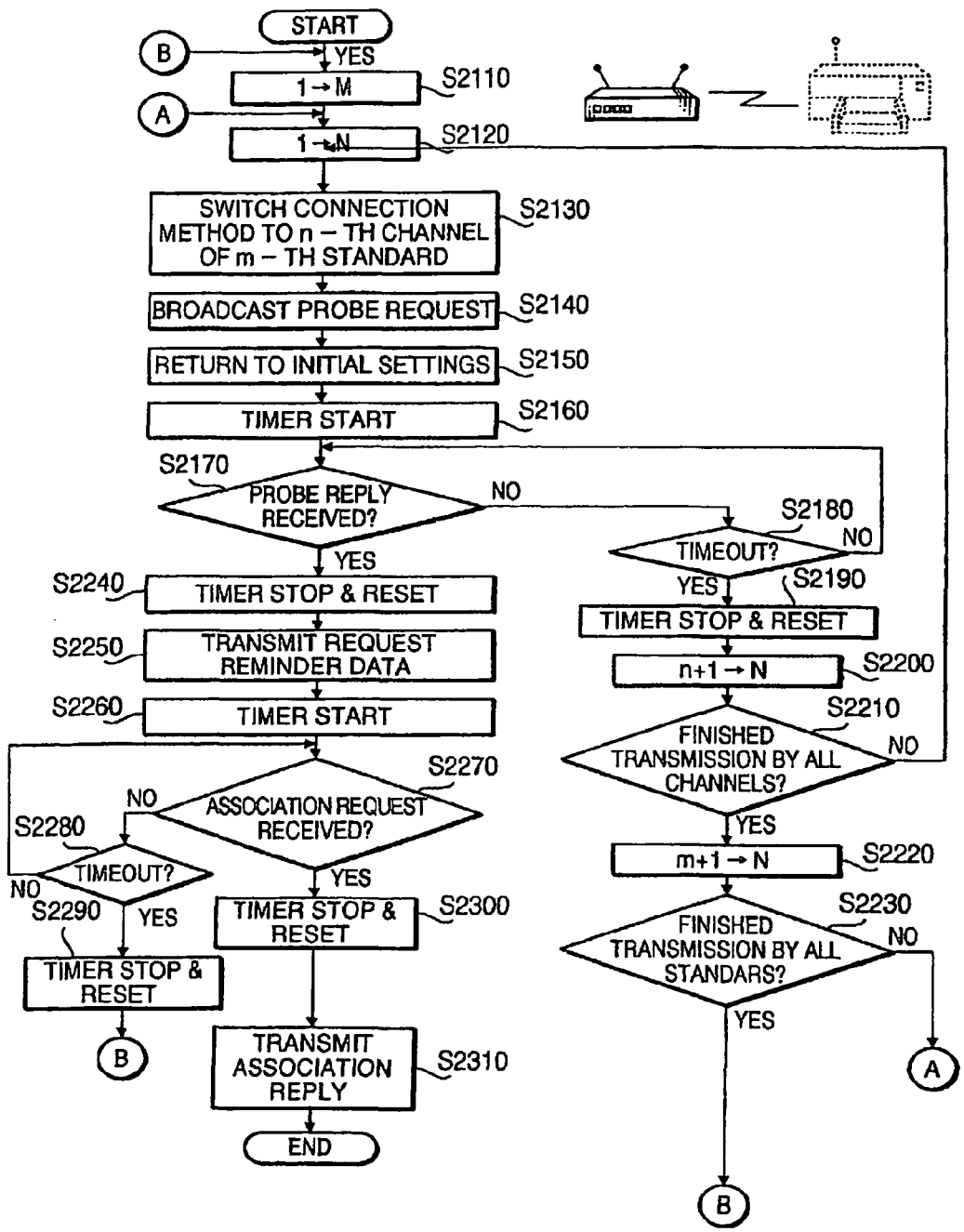
FIG. 39 is a flowchart (No. 1) showing the procedure of a connection method instruction process in a twelfth embodiment.

While the access point 10 returns to the step S2110 when the judgment in the step S2230 of FIG. 39 is "YES" in the above embodiment, the access point 10 may also end the connection method instruction process (FIG. 39) when the judgment is "YES", as shown in FIG. 42. In this case, the access point 10 is allowed to end the connection method instruction process after transmitting the probe requests by use of all the connection methods since the start of the connection method instruction process.

Embodiment 13

A wireless LAN system in accordance with a second embodiment of the present invention is composed similarly to the system of the first embodiment except for some steps executed by the printer 20, therefore, only the point of difference will be explained below.

<Connection Method Setting Process by Printer 20>

Figure 43:
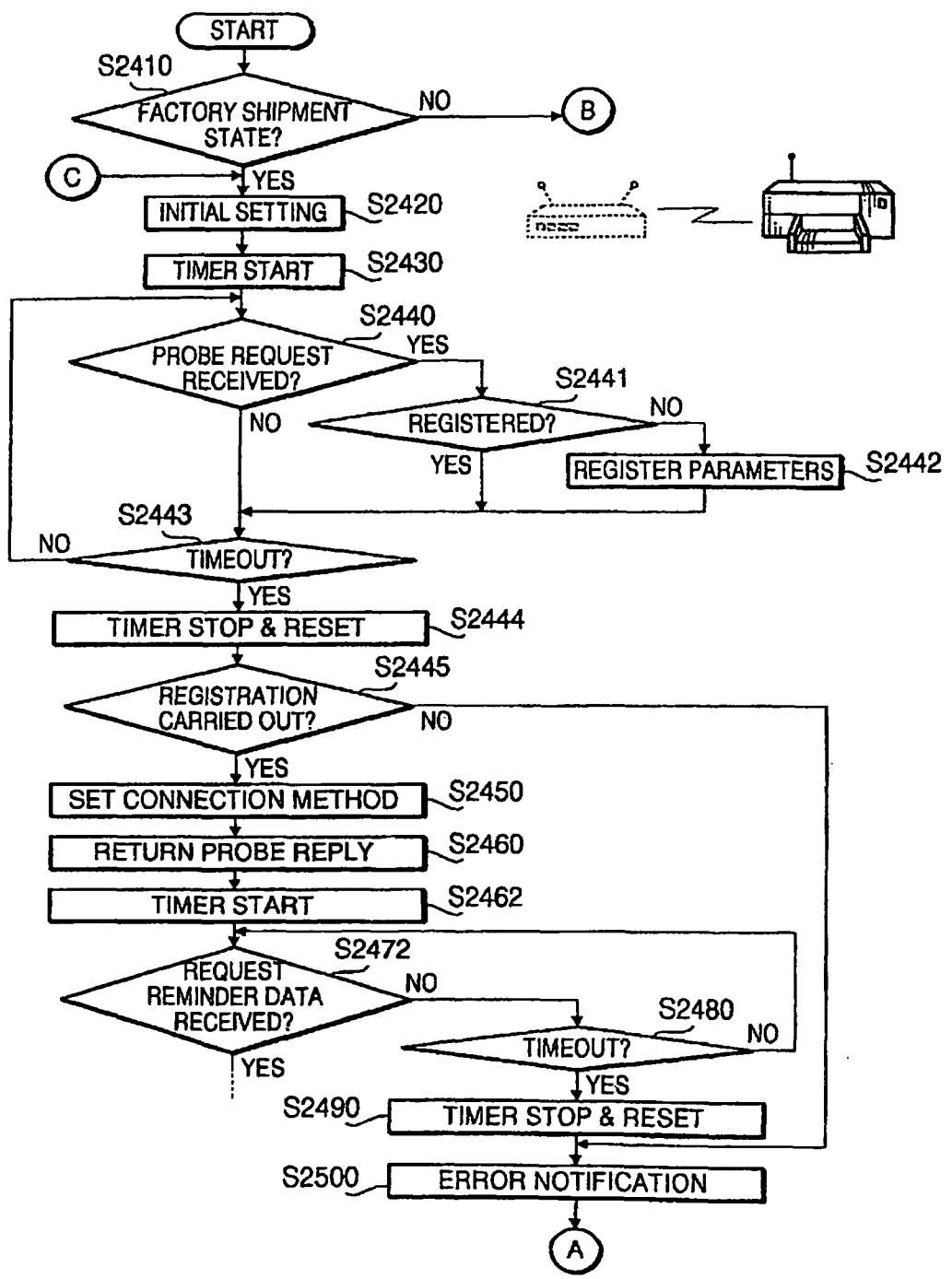
FIG. 43 is a flowchart showing the procedure of a connection method setting process in a thirteenth embodiment.

In the following, the connection method setting process which is conducted by the CPU 21 of the printer 20 will be described referring to FIG. 43. The connection method setting process of FIG. 43 is configured by replacing the steps S2440-S2500 of the connection method setting process in the twelfth embodiment (FIG. 41) with the following procedure, therefore, only the procedure different from the twelfth embodiment will be described in detail. In the following explanation, steps identical with those of the twelfth embodiment will be referred to with the same step Nos. and detailed explanation thereof is omitted for brevity.

If a probe request has been received from the access point 10 in the step S2440 (S2440: YES), whether the probe request has already been registered or not is checked (S2441). In this connection method setting process, parameters specified by the probe request are registered in a posterior step. Therefore, in the step S2441, the received probe request is judged to have already been registered if the parameters specified by the probe request have already been registered.

If the probe request has not been registered yet (S2441: NO), the parameters specified by the probe request are registered, by storing the parameters in a parameter storage area of the RAM 23 (S2442). In this embodiment, the access point 10 is configured to transmit a probe request containing not only the SSID and the connection method but also parameters such as the device ID of the access point 10 in the step S2140 of FIG. 39. In the step S2442, the parameters are registered together with a value indicating the reception level (radio field intensity) when the probe request was received, associating them with one another. An example of a data table with which the parameters specified by the probe request are registered is shown in FIG. 28.

After finishing the step S2442, or if the probe request has already been registered in the step S2441 (S2441: YES), whether or not a timeout has occurred regarding the reception of the probe request from the wireless access point is checked (S2443). In this step, the timeout is judged to have occurred if the timer started in the step S2430 has counted a preset length of time (30 sec in this embodiment).

If the timeout has not occurred (S2443: NO), the process returns to the step S2440. If the timeout has occurred (S2443: YES), the timer which was started in the step S2430 is stopped and reset (S2444).

Subsequently, whether or not the registration of parameters has been carried out in the step S2442 is checked (S2445). In this step, the registration of parameters in the step S2442 is judged to have been carried out if data (data table) indicating the parameters have been stored in the parameter storage area of the RAM 23.

If the parameter registration has not been carried out (S2445: NO), the process advances to the step S2500, otherwise (S2445: YES) the process advances to step S2450.

In the step S2450, from the "parameters indicating the connection method" registered in the step S2442, a set of "parameters indicating the connection method" corresponding to the highest reception level is selected and stored in the ROM 22, by which the connection method is set.

After finishing the steps S2450 and S2460, a timer is started similarly to the step S2430 (S2462) and the process advances to the step S2470. In the step S2470, if the request reminder data has not been received (S2470: NO), the process advances to step S2480. In the step S2480, the process returns not to the step S2440 but to the step S2470 if a timeout has not occurred (S2480: NO).

In the wireless LAN system composed as above, the following effects can be achieved in addition to the effects attained by the twelfth embodiment.

The printer 20 is capable of selecting a connection method that is specified by the probe request having the highest reception level out of the probe requests collected (registered) in a preset time period (S2442 in FIG. 43) and set the selected connection method to itself as the connection method for the connection to the wireless access point (S2450 in FIG. 43).

Such setting of the connection method (for the connection to the wireless access point) specified by the probe request having the highest reception level is advantageous for preventing erroneous setting of the connection method of the printer 20 to a false connection method different from the method for the connection to the correct wireless access point.

If another wireless access point similar to the access point 10 (wireless access point) of the present invention also exists in the vicinity of the printer 20 (e.g. in an adjacent residence) when the connection method (for the connection to the wireless access point) is set to the printer 20, a probe request is sent also from the (other) wireless access point and thus there is a possibility that a connection method identical with the method set to the (other) wireless access point might be set to the printer 20 regardless of the user's intention, depending on the timing of the reception of probe request.

However, since the thirteenth embodiment enables the setting of the connection method (for the connection to the wireless access point) that is specified by the probe request having the highest reception level as above, the erroneous connection method setting based on the probe request from other wireless access points can be avoided only by putting the printer 20 and the access point 10 sufficiently in the vicinity of each other for gaining enough reception level during the radio communication.

Embodiment 14

A wireless LAN system in accordance with a fourteenth embodiment of the present invention is composed similarly to the system of the twelfth embodiment except for some steps executed by the access point 10, therefore, only the point of difference will be explained below.

<Connection Method Instruction Process by Access Point 10>

In the following, a connection method instruction process which is conducted by the CPU 11 of the access point 10 will be described referring to FIG. 44. The connection method instruction process is configured by replacing the step S2240 of the connection method instruction process of the twelfth embodiment (FIG. 43) with a step S2172 which will be explained below and adding a step S2232 (explained below) after the step S230, therefore, only the procedure different from the twelfth embodiment will be described in detail. In the following explanation, steps identical with those of the twelfth embodiment will be referred to with the same step Nos. and detailed explanation thereof is omitted for brevity.

If a probe reply has been received in the step S2170 (S2170: YES), parameters specified by the probe reply are registered by storing them in a parameter storage area of the RAM 13 (S2172). In this embodiment, the printer 20 returns the probe reply which contains the SSID and the device ID in the step S2460 of FIG. 41. In the step S2172, the SSID and the device ID are registered together with parameters indicating the connection method and the reception level at the point when the probe reply was received in the step S2170, associating them with one another.

After finishing the step S172, the process advances to the step S2180, similarly to the case of "NO" in the step S2170.

After the steps S2180-S2230, if the judgment in the step S230 is "YES", whether or not the registration of parameters has been carried out in the step S2172 is checked (S2232). In this step, the registration of parameters in the step S2172 is judged to have been carried out if data indicating the parameters have been stored in the parameter storage area of the RAM 13.

If the parameter registration has been carried out in the step S2232 (S2232: YES), the process returns not to the step S2110 but to step S2250. In the step S2250, the request reminder data is transmitted to a single wireless station only, according to the SSID and the connection method corresponding to (associated with) the highest reception level that are selected from the parameters registered in the step S2172.

On the other hand, if the parameter registration has not been carried out in the step S2232 (S2232: NO), the connection method instruction process is ended.

In the wireless LAN system composed as above, the following effects can be achieved in addition to the effects attained by the twelfth embodiment.

The access point 10 is capable of setting the connection method to the wireless station returning the probe reply of the highest reception level by transmitting the request reminder data to the wireless station.

Therefore, erroneous transmission of the request reminder data to a different wireless station (different from the wireless station (printer 20) to which the connection method should be set) and the setting of the connection method to the different wireless station can be avoided only by putting the access point 10 and the printer 20 sufficiently in the vicinity of each other for gaining enough reception level during the radio communication similarly to the thirteenth embodiment.

Modification of Embodiment 14

The fourteenth embodiment can also be implemented with part of its composition altered to other composition as shown below. Incidentally, the composition shown below is also applicable to similar parts of other embodiments.

While the access point 10 transmits the request reminder data to the wireless station returning the probe reply of the highest reception level in the step S2250 of FIG. 44, the access point 10 may also be configured to transmit the request reminder data to any wireless stations returning the probe reply of a reception level higher than a threshold level in the step S2250.

Embodiment 15

A wireless LAN system in accordance with a fifteenth embodiment of the present invention is composed similarly to the system of the twelfth embodiment except for some steps executed by the access point 10, therefore, only the point of difference will be explained below.

<Connection Method Instruction Process by Access Point 10>

In the following, a connection method instruction process which is conducted by the CPU 11 of the access point 10 will be described referring to FIG. 45. The connection method instruction process is configured by adding steps S2234 and S2236 (explained below) after the step S2232 of the connection method instruction process of the fourteenth embodiment (FIG. 44), therefore, only the procedure different from the twelfth embodiment will be described in detail. In the following explanation, steps identical with those of the fourteenth embodiment will be referred to with the same step Nos. and detailed explanation thereof is omitted for brevity.

In this embodiment, the printer 20 returns the probe reply which contains the SSID, a device name and the device ID in the step S2460 of FIG. 41. In the step S2172 of the connection method instruction process of this embodiment, the SSID, the device name and the device ID are registered together with parameters indicating the connection method and the reception level at the point when the probe reply was received in the step S2170, associating them with one another.

Afterward, if the parameter registration has been carried out in the step S2232 (S2232: YES), a device name list containing the parameters registered in the step S2172 is displayed on the display panel 17 in order to inform the user of the device names. After the list is displayed on the display panel 17, the user can make a selection of a device name from the device names on the list (selection operation) through the operation panel 16.

The selection operation is waited for until it is made by the user (S2236: NO).

When the selection operation is made (S2236: YES), the process advances to the step S2250. Incidentally, to the parameter corresponding to the device name selected by the selection operation, a selection flag indicating the selection by the selection operation is set (initial value "0" is turned into "1").

In the step S2250, the request reminder data is transmitted to the selected wireless station, according to the parameters (SSID and connection method) to which the selection flag has been set (i.e. parameters selected from the parameters registered in the step S2172).

In the wireless LAN system composed as above, the following effects can be achieved in addition to the effects attained by the twelfth embodiment.

Figure 50:
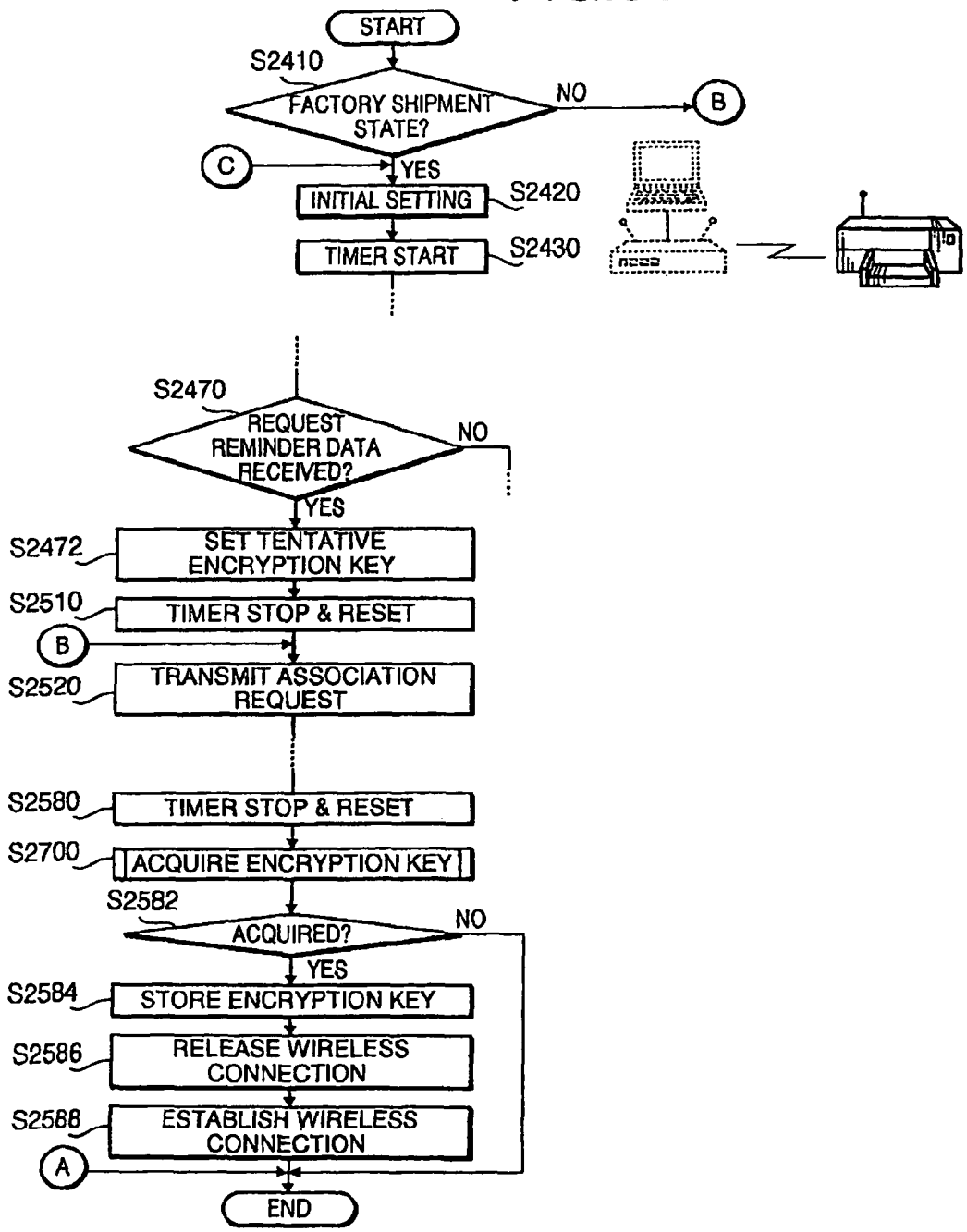
FIG. 50 is a flowchart showing the procedure of a connection method setting process in the seventeenth embodiment.

The access point 10 is capable of setting the connection method only to the wireless station having the device name that is arbitrarily selected by the user (e.g. printer 20) by transmitting the request reminder data to the wireless station (steps S2234, S2236 and S2250 in FIG. 50).

Modification of Embodiment 15

The fifteenth embodiment can also be implemented with part of its composition altered to other composition as shown below. Incidentally, the composition shown below is also applicable to similar parts of other embodiments.

Figure 45:
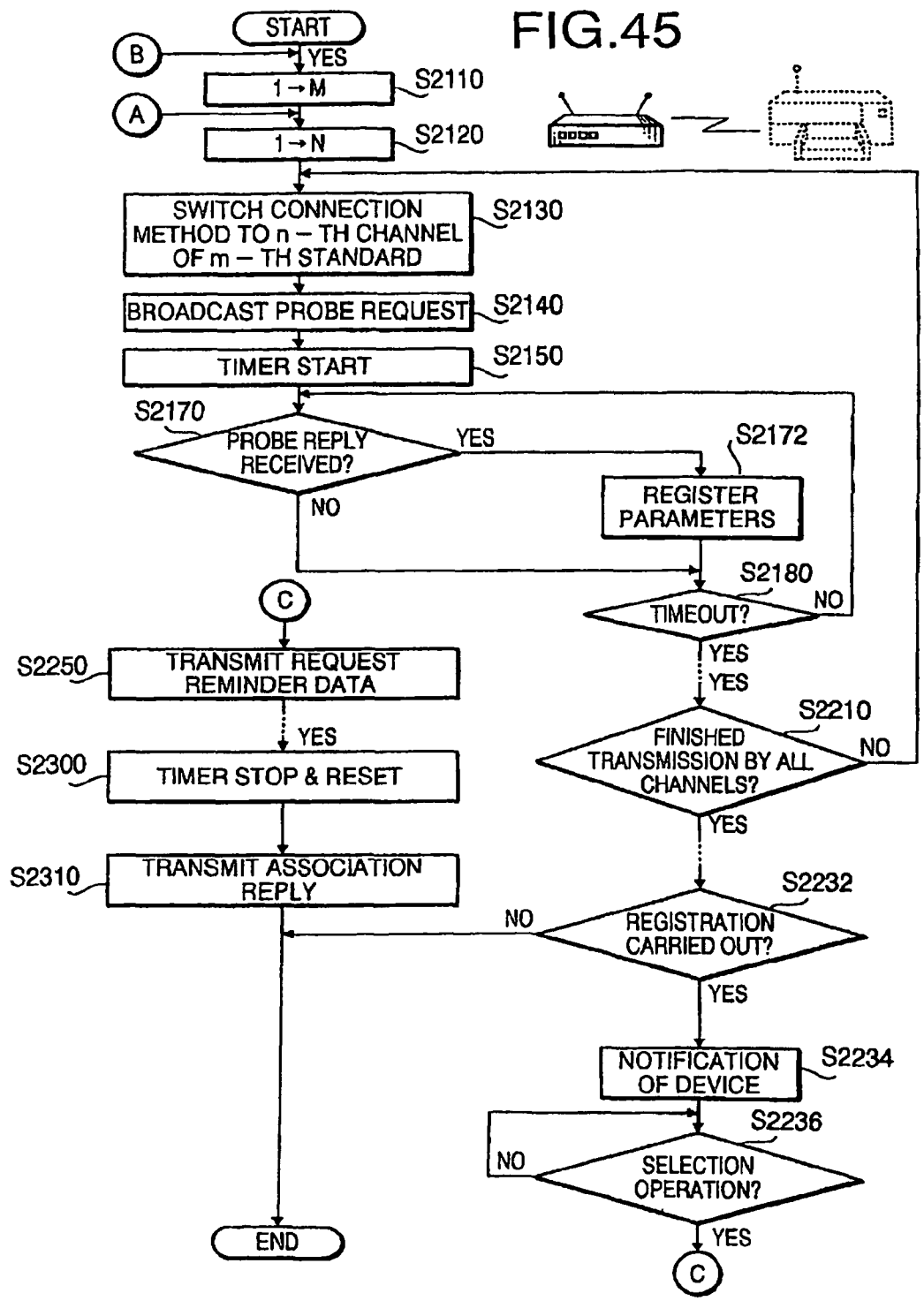
FIG. 45 is a flowchart showing the procedure of a connection method instruction process in a fifteenth embodiment.

While the selection operation by the user in the steps S2234 and S2236 of FIG. 45 is carried out based on the device names, the selection operation may also be carried out based on the device IDs instead of the device names. In this case, the connection method can be set to the wireless station having the device ID arbitrarily selected by the user by transmitting the request reminder data to the wireless station only.

Embodiment 16

A wireless LAN system in accordance with a sixteenth embodiment of the present invention is composed similarly to the system of the sixteenth embodiment. The sixteenth embodiment is configured so that the notification of device names and the selection operation (carried out by the access point 10 in the fifteenth embodiment) can be executed by a commonly used computer system 30 (hereinafter referred to as a "PC 30") which is connected to the access point 10 to communicate data via a cable 100 (see FIG. 1).

<Connection Method Instruction Process by Access Point 10>

In the following, a connection method instruction process which is conducted by the CPU 11 of the access point 10 will be described referring to FIG. 46. The connection method instruction process is configured by replacing the steps S234 and S2236 of the connection method instruction process of the fifteenth embodiment (FIG. 45) with steps S2238 and S2239 which will be explained below, therefore, only the procedure different from the fourth embodiment will be described in detail. The connection method instruction process is started after start instruction data is received from the PC 30 (see "START INSTRUCTION" in FIG. 47).

If the parameter registration has been carried out in the step S2232 (S2232: YES), listing data, representing the list of the device names specified by the registered parameters, is generated and transmitted to the PC 30 (the device which transmitted the start instruction data) (S2238). The PC 30 which received the listing data (see "LISTING DATA" in FIG. 47) displays the list represented by the listing data on its display, by which the user is informed of the device names. Thereafter, when the selection operation (for selecting a device name from the device names on the list) is made by the user, selection data which can specify the selected device name is generated and transmitted to the access point 10 (see "SELECTION DATA" in FIG. 47).

After the transmission of the listing data in the step S2238, reception of the selection data is waited for (S2239: NO). When the selection data is received (S2239: YES), the process advances to step S2250.

In the step S2250, the request reminder data is transmitted to the selected wireless station according to the parameters (SSID and connection method) corresponding to (associated with) the device name specified by the selection data received in the step S2239.

<Setting Instruction Process by PC 30>

In the following, a setting instruction process which is conducted by the PC 30 will be described. It should be noted that the setting instruction process is similar to that shown in FIG. 10. The setting instruction process is executed according to a program installed in the PC 30.

First, the start instruction data is transmitted to the access point 10 (S2610). The access point 10 which received the start instruction data starts the aforementioned connection method instruction process of FIG. 46 (see "START INSTRUCTION" in FIG. 47) and transmits the aforementioned listing data after a while.

The listing data from the access point 10 is waited for until it is received (S620: NO).

When the listing data is received (S620: YES), the content of the listing data is displayed on the display of the PC 30 (S630). After the list of device names represented by the listing data is displayed (see FIG. 13), the user can make the selection operation (for selecting a device name) by use of a keyboard, mouse, etc.

The selection operation is waited for until it is made by the user (S640: NO). When the selection operation is made (S640: YES), the selection data which can specify the device name selected by the selection operation is generated and transmitted to the access point 10 (S650). The access point 10 which received the selection data (see "SELECTION DATA" in FIG. 47) transmits the request reminder data to the wireless station having the device name specified by the selection data (see "REQUEST REMINDER" in FIG. 47).

In the wireless LAN system composed as above, the following effects can be achieved in addition to the effects attained by the fifteenth embodiment.

The access point 10 is capable of setting the connection method only to the wireless station (e.g. printer 20) having the device name that is specified by the selection data received from the PC 30 (i.e. the device name that is arbitrarily selected by the user from the device names which have been registered based on the probe replies) by transmitting the request reminder data to the wireless station.

Modification of Embodiment 16

The sixteenth embodiment can also be implemented with part of its composition altered to other composition as shown below. Incidentally, the composition shown below is also applicable to similar parts of other embodiments.

Figure 46:
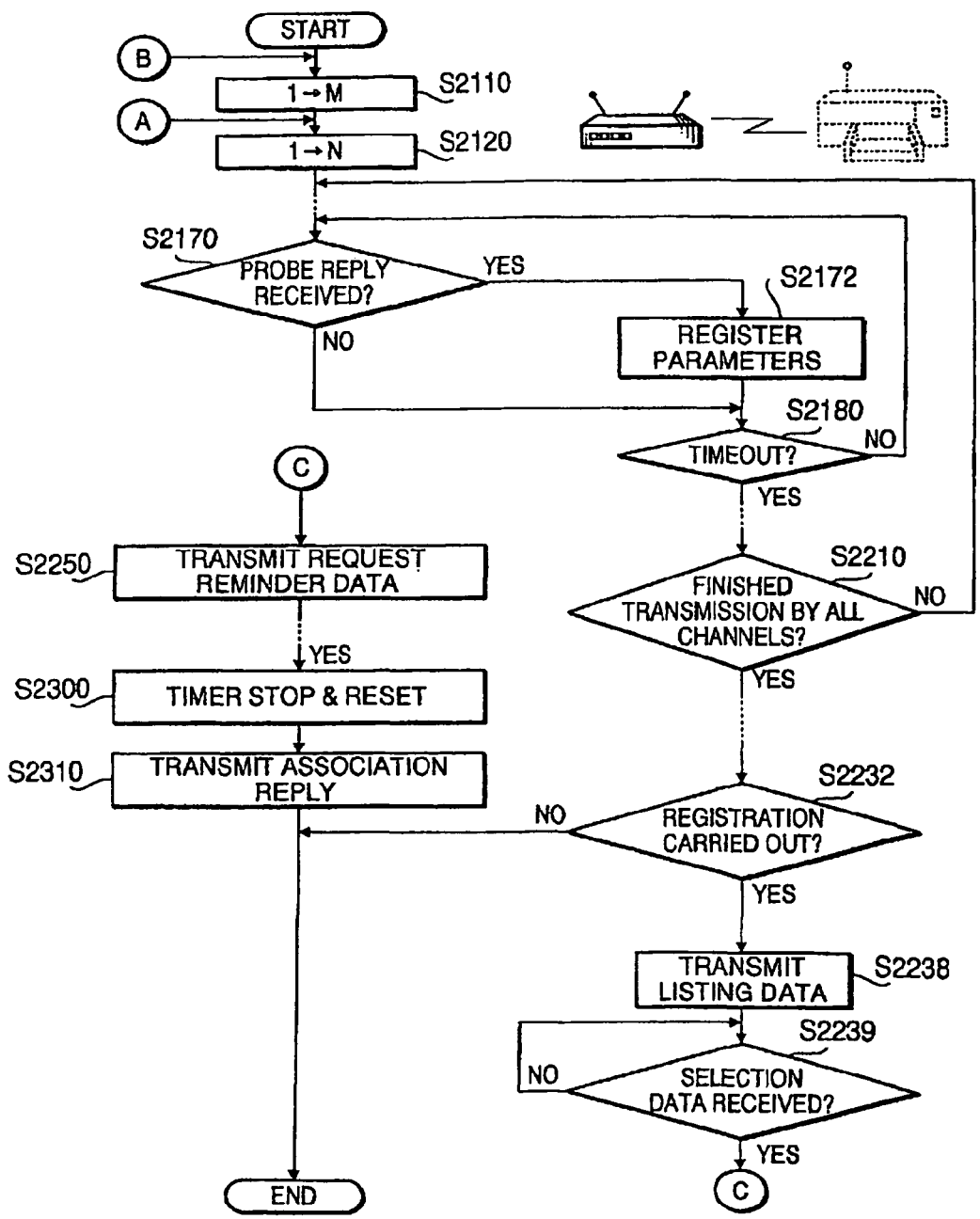
FIG. 46 is a flowchart showing the procedure of a connection method instruction process in a sixteenth embodiment.

For example, while the access point 10 generates the listing data which represents the list of device names in the step S238 of FIG. 46, the access point 10 may also be configured to generate and transmit listing data that represents a list of device IDs, let the user of the PC 30 carry out the selection operation based on the device IDs instead of the device names, and transmit the request reminder data to the selected wireless station according to the parameters (SSID and connection method) corresponding to (associated with) the selected device ID in the step S2250. In this case, the connection method can be set only to the wireless station having the device ID arbitrarily selected by the user of the PC 30 by transmitting the request reminder data to the wireless station.

Figure 47:
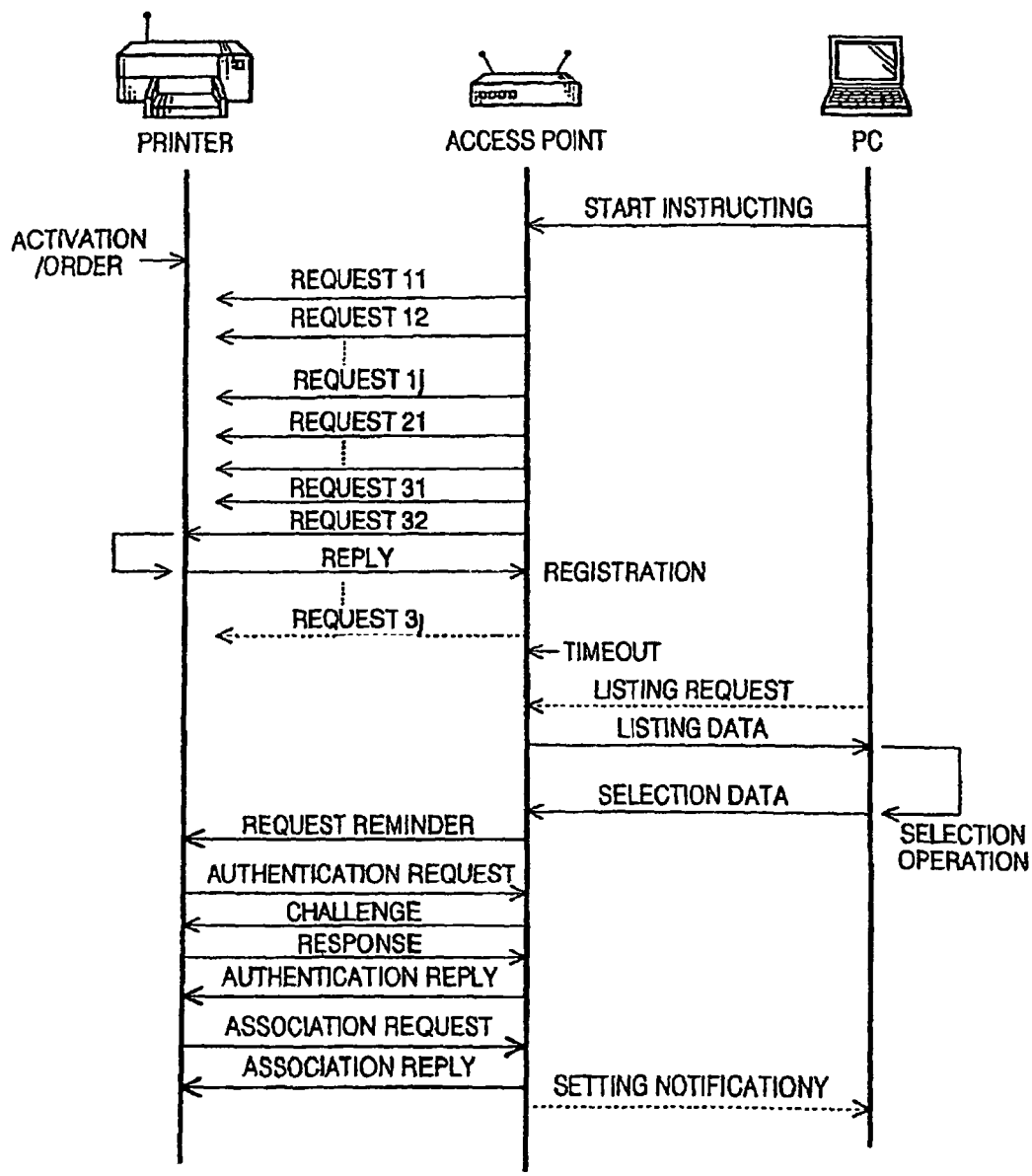
FIG. 47 is a sequence chart showing communication of data between the access point and the printer in the sixteenth embodiment.
Figure 48:
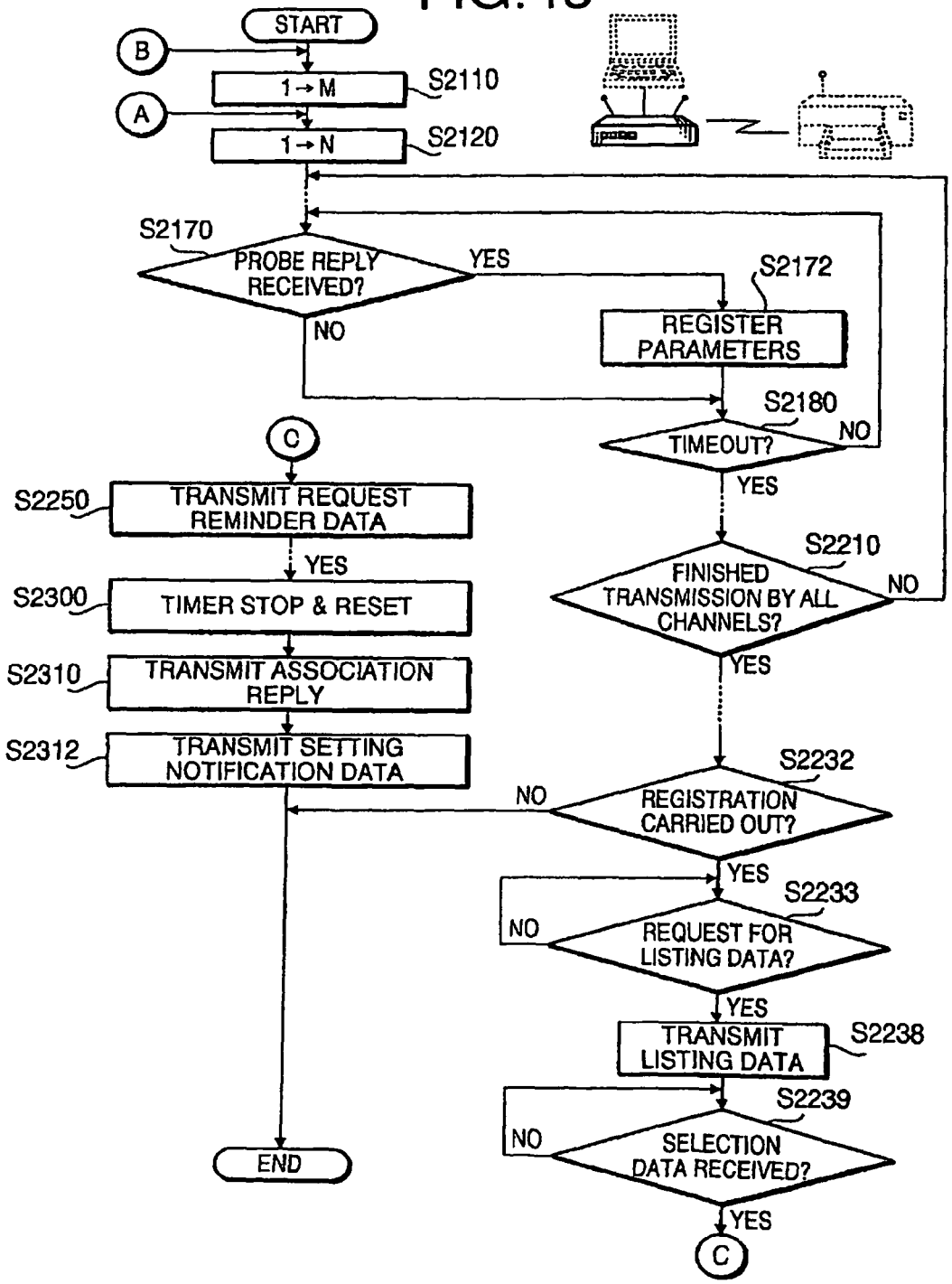
FIG. 48 is a flowchart (No. 2) showing the procedure of a connection method instruction process in the sixteenth embodiment.

While the access point 10 registers (collects) the parameters for a prescribed time period and thereafter transmits the listing data generated based on the collected parameters in the above embodiment, the access point 10 may also be configured to generate and the transmit the listing data at the point when a request for transmission is received from the PC 30 (see "LISTING REQUEST" in FIG. 47). For this configuration, similar to the process shown in FIG. 14, a step for waiting for an operation requesting the listing data (step S612) is added between the steps S610 and S620 of FIG. 13 and a step for requesting (the transmission of) the listing data in response to the above operation (step S2614) is added after the step S2612 as shown in FIG. 14, and a step for waiting for the request from the PC 30 (step S2233) is added between the steps S2232 and S2238 of FIG. 46 as shown in FIG. 48, for example. Also in this configuration, the selection operation may also be carried out based on the device IDs instead of the device names, similarly to the configuration mentioned above.

It is also possible in the above embodiment to configure the access point 10 to notify the PC 30 that the connection method has been set (or will be set) to the wireless station after the access point 10 has transmitted the request reminder data to the wireless station (printer 20). For this configuration, a step for transmitting setting notification data (for the notification of the execution of the setting) to the PC 30 (S2312) is added after the step S2310 of FIG. 46 as shown in FIG. 48, and a step for waiting for the setting notification data (S2652) and a step for notifying the user that the connection method has been set to the wireless station in response to the reception of the setting notification data (S2654) are added after the step S2650 of FIG. 12 as shown in FIG. 14, for example.

Embodiment 17

In some embodiments described above, even if the printer 20 is connected to the access point 10 by wireless connection, if the access point 10 is configured to carry out data communication employing encryption, normal data communication is generally impossible without similarly configuring the printer 20 to execute the data communication employing the encryption. Therefore, the wireless LAN system of this embodiment is designed for letting the wireless LAN system of the above sixteenth embodiment carry out data communication normally without the need of operations by the user.

First, if a "parameter regarding security" is stored in the ROM 12, the access point 10 starts executing communication with security measures based on the parameter. As the "parameter regarding security", an encryption key for carrying out the communication in an encrypted state (e.g. WEP (Wired Equivalent Privacy) key in this embodiment) can be employed for example. If an encryption key has been stored in the ROM 12, the access point 10 (CPU 11) carries out the communication with the wireless station by encrypting data with the encryption key. Incidentally, the encryption key is generated and stored in the ROM 12 by the aforementioned remote setup.

Meanwhile, if a "parameter regarding security" is stored in the ROM 22, the printer 20 starts executing communication with security measures based on the parameter. As the "parameter regarding security", an encryption key can be employed similarly to the case of the access point 10. If an encryption key has been stored in the ROM 22, the printer 20 (CPU 21) carries out the communication with the wireless access point by encrypting data with the encryption key.

<Connection Method Instruction Process by Access Point 10>

Figure 49:
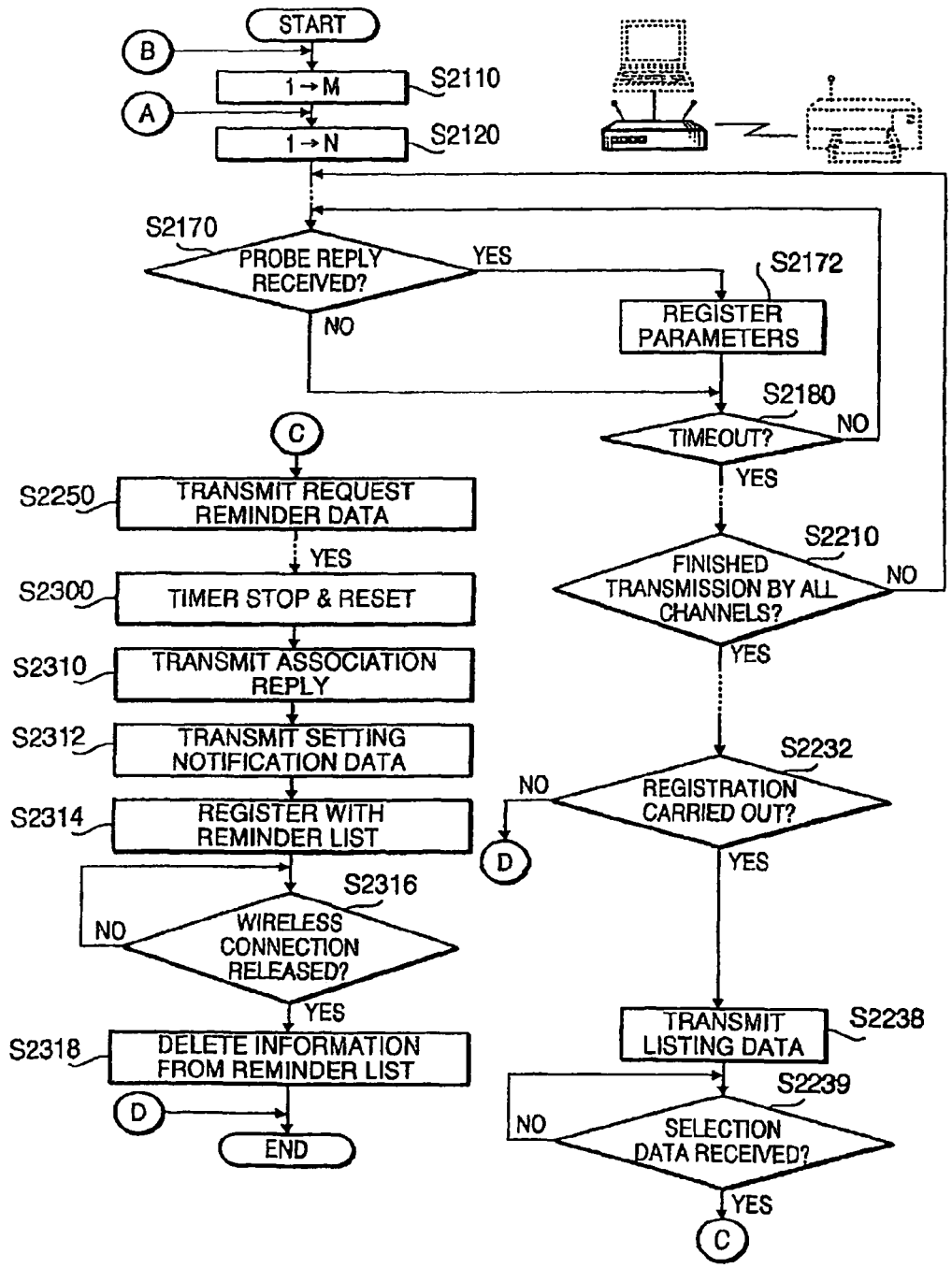
FIG. 49 is a flowchart showing the procedure of a connection method instruction process in a seventeenth embodiment.

In the following, a connection method instruction process which is conducted by the CPU 11 of the access point 10 will be described referring to FIG. 49. The connection method instruction process is configured by adding steps S2314, S2316 and S2318 (explained below) after the step S2310 of the connection method instruction process of the sixteenth embodiment (FIG. 46), therefore, only the procedure different from the sixteenth embodiment will be described in detail.

In the step S2250 in this embodiment, an encryption key that is different from the ordinary encryption key stored in the ROM 12 (hereinafter referred to as a "tentative encryption key") is generated randomly, and a request reminder data to which the tentative encryption key is attached is transmitted to the wireless station without encrypting the data with the encryption key.

After finishing the sequence to the step S2310 after transmitting the request reminder data in the step S2250, the device name and the device ID of the wireless station (to which the request reminder data was transmitted in the step S2250) are registered with a reminder list associating them with the tentative encryption key attached to the request reminder data in the step S2250 (S2314). The "reminder list" is a data table which is generated in the RAM 13 for the registration of the data.

The release of the wireless connection with the wireless station registered with the reminder list in the step S2314 is waited for (S2316: NO). When the wireless connection is released (S2316: YES), the information registered with the reminder list is deleted (S2318) and the connection method instruction process is ended.

<Connection Method Settling Process by Printer 20>

In the following, a "connection method settling process" which is conducted by the CPU 21 of the printer 20 will be described referring to FIG. 50. The connection method settling process is a process configured by adding a step S2472 (explained below) after the step S2470 of the connection method setting process of the sixteenth embodiment (FIG. 42) and adding a sequence explained below after the step S2580. In the following explanation, steps identical with those of the sixteenth embodiment will be referred to with the same step Nos. and detailed explanation thereof is omitted for brevity.

First, the tentative encryption key attached to the request reminder data received in the step S2470 is set (S2472). In this step, the tentative encryption key is stored in a storage area of the RAM 23 for the "parameter regarding security", by which subsequent data communication with the wireless access point (access point 10) will be carried out by encrypting data with the tentative encryption key.

Figure 51:
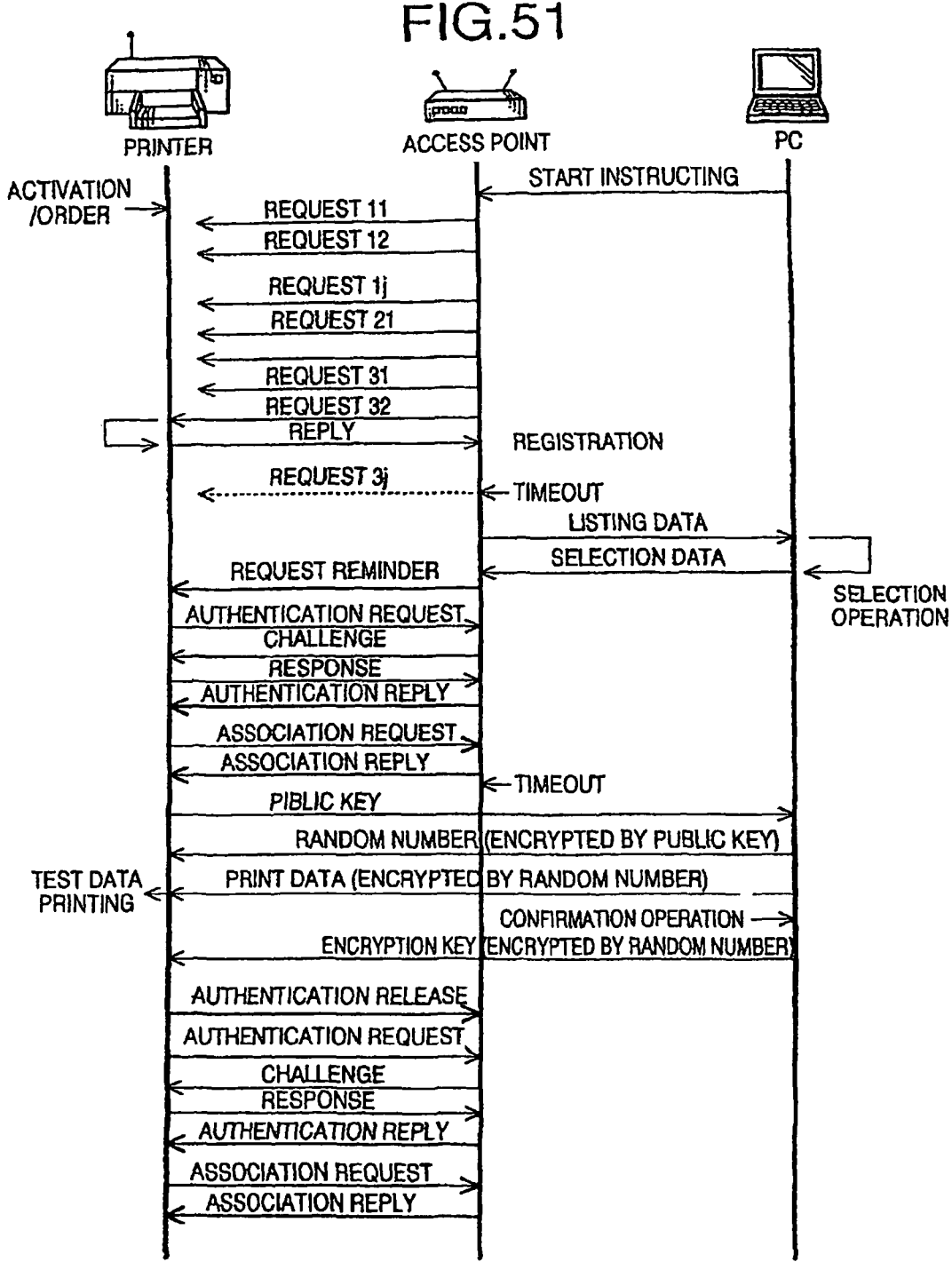
FIG. 51 is a sequence chart showing communication of data between the access point and the printer in the seventeenth embodiment.

After finishing the step S2580, the encryption key of the access point 10 is acquired (S2700). The step S2700 is a step for acquiring the encryption key of the access point 10 from the PC 30 by means of the public key cryptosystem (see "ENCRYPTION KEY (ENCRYPTED BY RANDOM NUMBER)" in FIG. 51). The encryption key acquisition process in the step S2700 is similar to that explained above with reference to FIG. 17, and description thereof will not be repeated for the brevity.

If the encryption key is acquired successfully in the step S2700 (S2582: YES), the encryption key is stored in the ROM 22 (S2584). In this step, in addition to the storage of the encryption key in the ROM 22, deletion of the tentative encryption key from the RAM 23 is executed.

Subsequently, the wireless connection with the access point 10 is released (S2586). In this step, the wireless connection with the access point 10 is released by transmitting an authentication release message to the access point 10 (see "AUTHENTICATION RELEASE" in FIG. 51).

Subsequently, the wireless connection with the access point 10 is reestablished (S2588). In this step, the wireless connection is reestablished by exchanging the authentication request/reply with the access point 10 similarly to the aforementioned procedure. Incidentally, the exchange of the authentication request/reply in this step is carried out by means of shared key authentication (based on encryption) using the encryption key transferred to the printer 20. After the wireless connection is established by this step, data communication is executed by encrypting data with the encryption key rewritten in the step S2584.

After the step S2588, or if the encryption key has not been acquired in the step S2582 (S2582: NO), the connection method settling process is ended.

<Setting Instruction Process by PC 30>

In the following, a setting instruction process which is conducted by the PC 30 will be described. The setting instruction process is executed according to a program installed in the PC 30. The setting instruction process is configured by adding the procedure similar to that shown in FIG. 20 after the step S2650 of the setting instruction process of the sixteenth embodiment (FIG. 48).

After the step S650 is finished, the public key transmitted from the printer 20 is waited for until it is received (S810: NO). The public key is the data which is transmitted by the printer 20 in the step S720 of FIG. 17.

When the public key is received (S810: YES), a random number (generated randomly) is encrypted by the public key and the encrypted random number is transmitted to the printer 20. The encrypted random number is the data which is received by the printer 20 in the step S730 of FIG. 17.

Subsequently, the print data representing the message image is encrypted by random number received in the step S2810 and the encrypted print data is transmitted to the printer 20 (S830). The encrypted print data is the data which is received by the printer 20 in the step S740 of FIG. 17. The printer 20 which received the print data prints the message image, and the user conducts the confirmation operation to the PC 30 after the message image is printed out, as mentioned above. The confirmation operation is done by pressing a particular key/button, pressing keys/buttons in a particular order, etc.

The confirmation operation is waited for until it is done by the user (S840: NO).

When the confirmation operation is conducted (S2840: YES), the encryption key is encrypted by the random number generated in the step S2820 and the encrypted encryption key is transmitted to the printer 20 (S850). The encrypted encryption key is the data which is received by the printer 20 in the step S770 of FIG. 17. Incidentally, the encryption key is data which has previously been stored in memory, etc.

After finishing the step S850, the setting instruction process is ended.

<Encryption Switching Process by Access Point 10>

The access point 10 is configured to execute an encryption switching process when the time of data communication (transmission/reception of data) with a wireless station has come since its activation. It should be noted that the encryption switching process is similar to that shown in FIG. 19 and description there of will not be repeated for the brevity.

In the wireless LAN system composed as above, the following effects can be achieved in addition to the effects attained by the previous embodiments.

For a wireless station to which the request reminder data has been transmitted, the access point 10 switches its encryption method so as to execute data communication encrypting data with the tentative encryption key (S910 in FIG. 19). Meanwhile, the printer 20 which received the request reminder data sets its encryption method so as to execute the data communication with the access point 10 encrypting data with the tentative encryption key (S2472 in FIG. 50). By the procedure, normal data communication between the access point 10 and the printer 20 encrypting data with the tentative encryption key becomes possible, by which the data communication between the access point 10 and the printer 20 can be realized ensuring a certain security level while maintaining the security level of data communication of the access point 10 with external networks.

Subsequently, if the printer 20 successfully acquires the encryption key by the encryption key acquisition process (FIG. 19), the printer 20 reestablishes the wireless connection with the access point 10 (see steps S2586 and S588 in FIG. 50), by which the data communication between the access point 10 and the printer 20 will thereafter be carried out by encrypting data with the encryption key transferred from the PC 30 to the printer 20. In the access point 10, the information registered with the reminder list is deleted at this point (see step S2318 in FIG. 49), by which the encryption method of the access point 10 is returned so as to execute the data communication with the printer 20 encrypting data with the encryption key. Therefore, the data communication between the access point 10 and the printer 20 can be realized with a security level equivalent to that of data communication of the access point 10 with other wireless stations or external networks.

Since the transfer of the encryption key from the PC 30 to the printer 20 is conducted by means of the public key cryptosystem, the probability of leak of the encryption key during the transmission to the printer 20 becomes low as a matter of course.

Further, the printer 20 prints the message image represented by the print data transferred from the PC 30 prior to the encryption key (see step S2750 in FIG. 17). Thus, the user is allowed to confirm whether or not the printer 20 is a correct wireless station that should receive the encryption key from the PC 30, by checking whether or not the message image is printed by the printer 20. After confirming the message image, the user executes the confirmation operation to the PC 30 (see step S2840 in FIG. 18), by which the transfer of the encryption key from the PC 30 to the printer 20 is enabled.

[Modifications]

While the present invention has been described with reference to the above particular illustrative embodiments, the present invention is not to be restricted by those embodiments but can also be implemented in various configurations.

For example, while a printer 20 is employed in the above embodiments as the wireless station of the present invention, any type of device capable of operating as a wireless station can be employed as the wireless station of the present invention.

While the PC 30 is connected to the access point 10 via the cable 100 in the above embodiments, the PC 30 may also be connected to the access point 10 by wireless connection in cases where the PC 30 has the wireless station function.

While all the sequence containing the transmission of the probe reply is not executed by the printer 20 in the above embodiments when the printer 20 is judged not to be in the factory shipment state (see step S2410 in FIGS. 41, 43 and 50), it is also possible to let the printer 20 transmit the probe reply in a state allowing the judgment on the factory shipment state and let the access point 10 cancel the registration regarding the probe reply or the transmission of the request reminder data.

Figure 52:
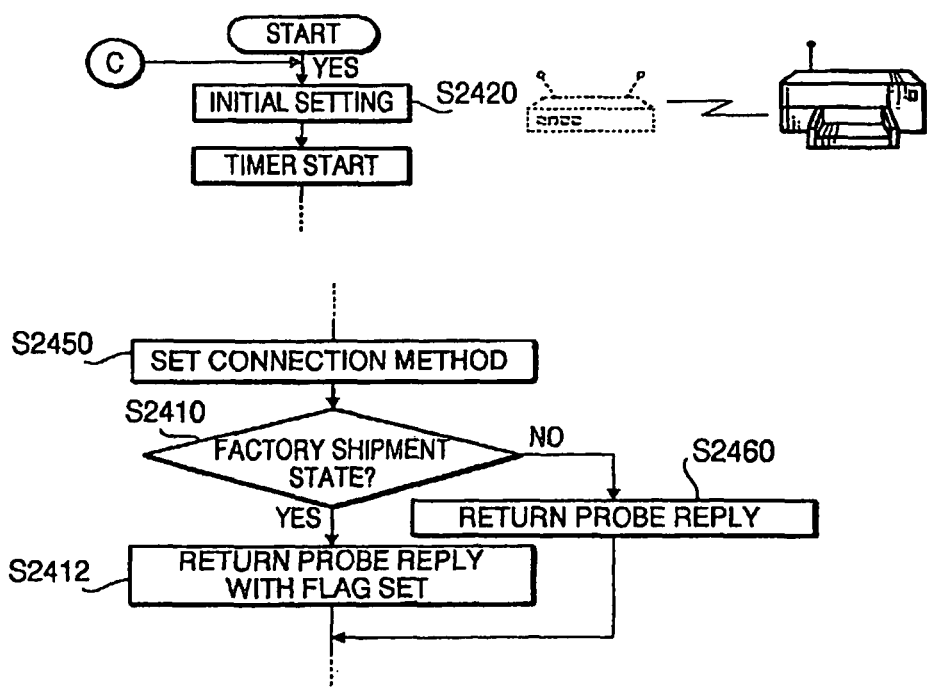
FIG. 52 is a flowchart showing the procedure of a connection method setting process in a modified embodiment.

For this, in the printer 20, the step S2410 is executed after the step S2450 as show in FIG. 52, for example. If "YES" in the step S2410, a probe reply, in which an "Unconfigured device" flag is set (set to "1"), is transmitted (S2412). If "NO" in the step S410, an ordinary probe reply, in which the "Unconfigured device" flag is not set (set to "0"), is transmitted (S2414) and the process advances to the step S2470.

Figure 53:
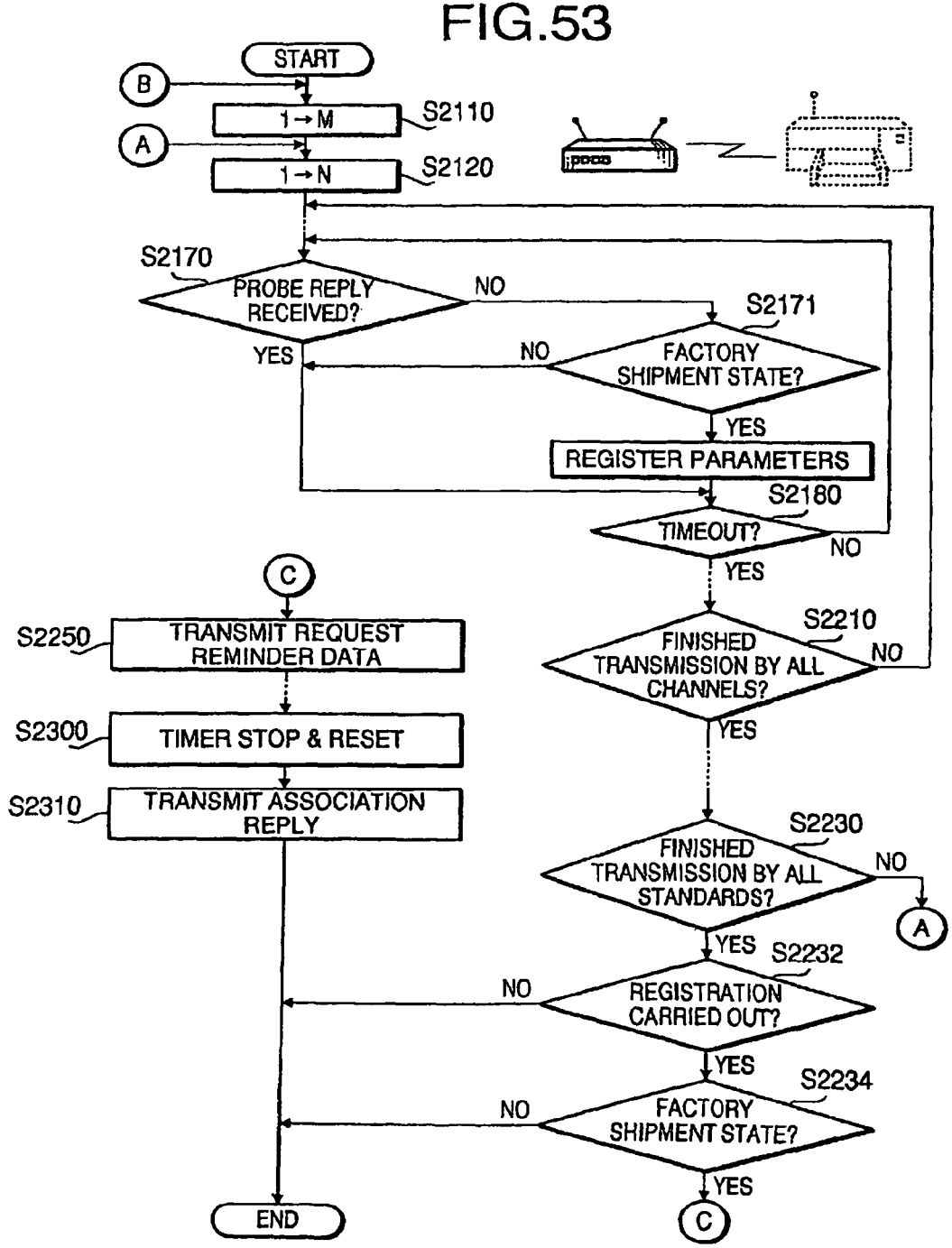
FIG. 53 is a flowchart showing the procedure of a connection method instruction process in the modified embodiment.

Meanwhile, in the access point 10, the following procedure is executed after the step S2170 or the step S2230 (S2232) of FIGS. 39, 42, 44, 45, 46, 48 and 49. For example, as shown in FIG. 53, after the step S2170, if the "Unconfigured device" flag in the received probe reply indicates that the wireless station (printer 20) is in its factory shipment state (S2171: YES), the process advances to the step S2240 (S2172), otherwise (S2171: NO) the process advances to the step S2180. In the case where the judgment in the step S2230 (S2232) is "YES", if the "Unconfigured device" flag in the received probe reply indicates that the wireless station is in its factory shipment state (S2234:YES), the process advances to the step S2250, otherwise (S2234: NO) the connection method instruction process is ended.

By such a configuration, the access point 10 is allowed to set the connection method (by carrying out the registration regarding the probe reply and the transmission of the request reminder data) only when the wireless station is in its factory shipment state.

While the printer 20 which received the probe request is thereafter kept in the same connection method (specified by the probe request) after the transmission of the probe reply in the above embodiments, the printer 20 may also be configured to once return the connection method to the initial settings after the transmission of the probe reply and set the connection method again after receiving the request reminder data. Such a configuration is desirable for preventing the printer 20 from erroneously switching its connection method according to a probe request transmitted by a different wireless access point. For this purpose, the following specific configuration can be employed, for example.

Figure 54:
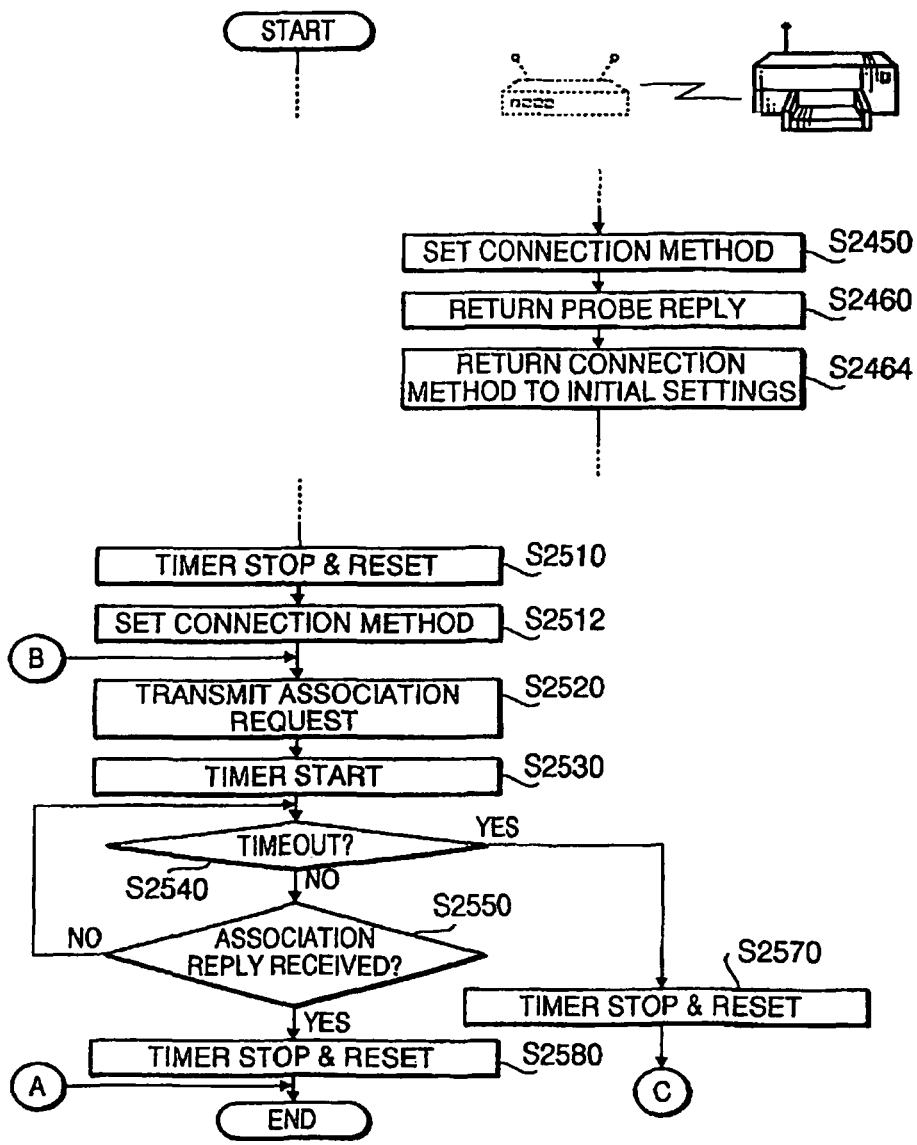
FIG. 54 is a flowchart showing the procedure of a connection method setting process in the modified embodiment.
Figure 55:
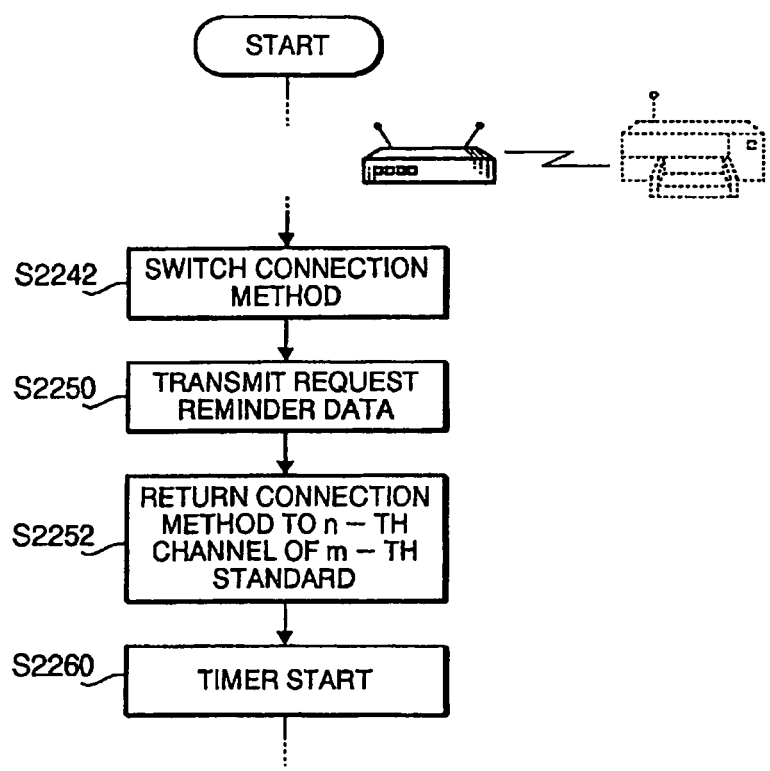
FIG. 55 is a flowchart showing the procedure of a connection method instruction process in the modified embodiment.

As shown in FIG. 54, in the printer 20, a step for returning its connection method to the initial settings (step S2464) is added between the step S2460 and the next step in the connection method setting process (FIGS. 43, 50 and 52), and a step for setting its connection method (step S2512 (similar to the step S2450)) is added between the step S2510 and the next step. In the step S2460, the probe reply is transmitted in a state capable of specifying the connection method preset to the printer 20. In this configuration, the printer 20 executes the transmission of the probe reply according to the connection method of the access point 10 and thereafter executes the reception of the request reminder data according to the connection method preset to the printer 20 itself. As shown in FIG. 55, in the access point 10, a step for switching its connection method to the method specified by the probe reply received in the step S2170 (step S2242) is added between the step S2250 and the immediately precedent step in the connection method instruction process (FIGS. 46, 49-51, 56, 57 and 64), and a step for returning its connection method to the method based on the n-th channel of the m-th wireless LAN standard (step S2252) is added between the step S2250 and the next step. In this configuration, the access point 10 executes the reception of the probe reply according to the connection method preset to the access point 10 itself and thereafter executes the transmission of the request reminder data according to the connection method of the printer 20.

In the above-described embodiments, the printer 20 is used as the wireless station. However, the invention need not be limited to this configuration, and various other devices such as scanner, facsimile, copier, camera device, audio-visual device, household electric appliance and storage device may be employed optionally or alternatively as the wireless station.

The present disclosure relates to the subject matters contained in Japanese Patent Applications No. 2003-362230, No. 2003-362231 and No. 2003-362232, all filed on Oct. 22, 2003, which are expressly incorporated herein by reference in their entireties.

The invention claimed is:

1. A wireless station capable of communicating with a wireless access point,
   the wireless station comprising a controller that is configured to:
   transmit first wireless station data including an identification data of the wireless station in response to a user operation through a specific channel of a plurality of channels;
   transmit second wireless station data including the identification data of the wireless station through a channel that is identical to the specific channel;
   switch the specific channel of the plurality of channels;
   in case where the wireless station has received SSID data including an SSID through the specific channel used to transmit the first wireless station data and the second wireless station data within a predetermined period of time after the user operation, store the SSID included in the SSID data transmitted from the wireless access point which received the first wireless station data and the second wireless station data; and
   transmit an association request to a wireless LAN network built by the wireless access point, using the SSID stored in the wireless station.

2. The wireless station according to claim 1, wherein the controller of the wireless station switches the specific channel to a channel different from the channel used to send the first wireless station data, and thereafter switches the specific channel to the channel used to send the first wireless station data.

3. The wireless station according to claim 1, wherein a communicable distance of the wireless station is not changed by:
   the wireless station transmitting the first wireless station data or the second wireless station data;
   the wireless station receiving the SSID data; and
   the wireless station transmitting the association request to the wireless LAN network built by the wireless access point.

4. The wireless station according to claim 1, further comprising a print engine.

5. The wireless station according to claim 1, further comprising an operation panel configured to receive the user operation.

6. The wireless station according to claim 1, wherein the controller transmits a probe request as the first wireless station data.

7. The wireless station according to claim 4, wherein, in case where the wireless station has received data sent from a communication terminal which transmits instruction for setting up a wireless communication of the wireless station to the wireless access point, the print engine prints out an image based on the received data.

8. A wireless access point capable of communication with a wireless station,
   the wireless access point comprising a controller that is configured to:
   store an SSID;
   store identification data of a host of first wireless station data in case where the wireless access point has received the first wireless station data from the wireless station through a preset channel after the wireless access point has received a user operation;
   in case where the wireless access point has received second wireless station data including the identification data of the host of the first wireless station data through the preset channel within a predetermined period after the wireless access point received a user operation, transmit SSID data including the SSID stored in the wireless access point to the wireless station, being the host of the first wireless station data and the second wireless station data, through the preset channel; and
   involve the wireless station, being a host of an association request, to a wireless LAN network built by the wireless access point when the association request is received from the wireless station using the SSID stored in the wireless access point.

9. The wireless access point according to claim 8, wherein the controller of the wireless access point transmits the SSID data to the wireless station, being the host of the second wireless station data, in case where the wireless access point has received the second wireless station data through the preset channel, and thereafter transmit an association reply to the wireless station for involving the wireless station, being the host of the association request, to the wireless LAN network built by the wireless access point.

10. The wireless access point according to claim 8, wherein a communicable distance of the wireless access point is not changed by:
   the wireless access point receiving the first wireless station data or the second wireless station data;
   the wireless access point transmitting the SSID data transmission; or
   the wireless access point involving the wireless station to the wireless LAN network.

11. The wireless access point according to claim 8, wherein, after the first wireless station data transmitted through the preset channel is received, the controller of the wireless access point transmits the SSID data to the wireless stations which has transmitted the second wireless station data through a channel which is identical to a channel used to transmit the first wireless station data.

12. The wireless access point according to claim 11, wherein the controller of the wireless access point transmits the SSID only to a wireless station which has sent the second wireless station data including identification data identical to the same included in the first wireless station data.

13. The wireless access point according to claim 8,
wherein a communication terminal is communicably connected to the wireless station, and
wherein the controller of the wireless station is further configured to:
acquire a first encryption key from the communication terminal via the wireless access point by a public key cryptosystem, the wireless access point executing a first wireless connection with the wireless station; and
alter settings of the wireless station so that data communication with the wireless access point is executed employing the encryption with the first encryption key, by releasing the first wireless connection with the wireless access point and establishing a second wireless connection employing the encryption with the first encryption key when the first encryption key is acquired from the communication terminal by the wireless station, and
wherein the communication terminal is configured to transfer the first encryption key to the wireless station via the wireless access point by the public key cryptosystem.

14. The wireless access point according to claim 13,
wherein the communication terminal transfers an authentication message to the wireless station by the public key cryptosystem prior to the transfer of the first encryption key,
wherein the communication terminal is further configured to:
let a user who confirmed the authentication message outputted by the wireless station carry out a confirmation operation after the authentication message is transferred to the wireless station by communication terminal, and
transfer the first encryption key when the confirmation operation is carried out through the communication terminal, and
wherein the controller of the wireless station is further configured to:
acquire the authentication message which is transferred from the communication terminal by the public key cryptosystem prior to the first encryption key,
output the authentication message acquired by the wireless station, and
acquire the first encryption key which is transferred from the communication terminal after the confirmation operation to the communication terminal is carried out by the user confirming the authentication message outputted by the message output system.

15. The wireless access point according to claim 8, the controller of the wireless access point switches the operating mode of the wireless access point to either one selected from:
a support mode supporting setting of the SSID of each wireless station by executing a transmission of the SSID data by the wireless access point; and
a normal mode not supporting setting of the SSID without executing the transmission of the SSID data by the wireless access point.

16. The wireless access point according to claim 15, wherein the controller of the wireless access point switches the operating mode in response to an instruction from outside.

17. The wireless access point according to claim 15, wherein the controller of the wireless access point switches the operation mode to the normal mode when a predetermined period of time has elapsed since the operation mode being switched to the support mode.

18. The wireless access point according to claim 15, wherein the controller of the wireless access point switches the operation mode to the normal mode, after being switched to the support mode, in response to the SSID data being transmitted once.

19. The wireless access point according to claim 8, wherein the user operation is a push of a specific button.

20. A wireless station capable of communication with a wireless access point,
the wireless station comprising a controller that is configured to:
transmit a first wireless station data including an identification data of the wireless station through a specific channel of a plurality of channels in case where an instruction has been received from a communication terminal communicably connected to the wireless station;
transmit a second wireless station data, including the identification data of the wireless station, through the specific channel;
switch the specific channel of the plurality of channels;
in case where the wireless station has received SSID data including an SSID through the specific channel used to transmit the first wireless station data and the second wireless station data, store the SSID included in the SSID data sent from a wireless access point which has received the first wireless station data and the second wireless station data within a predetermined period after the instruction from the communication terminal has been received; and
transmit an association request to a wireless LAN network built by the wireless access point, using the SSID stored in the wireless station.

21. A wireless LAN system comprising a wireless station capable of functioning as a wireless LAN station and a wireless access point capable of functioning as a wireless LAN access point,
the wireless station comprising a controller that configured to:
transmit first wireless station data including identification data of the wireless station through a specific channel of a plurality of channels in case where the wireless station has received a user operation, and to further transmit second wireless station data including the identification data of the wireless station through the specific channel;
switch the specific channel of the plurality of channels;
in case where the wireless station has received SSID data including an SSID from the wireless access point which has received the first wireless station data and the second wireless station data through the specific channel used to transmit the first wireless station data and the second wireless station data within a predetermined period of time after the wireless station has received the user operation, store the SSID included in the SSID data; and
transmit an association request to a wireless LAN network built by the wireless access point using the SSID stored in the wireless station, and
the wireless access point comprising a controller configured to:
store an SSID;
store identification data of a host of the first wireless station data in case where the wireless access point has received the first wireless station data through the preset channel after the wireless access point has received a user operation;

in case where the wireless access point has received the second wireless station data including the identification data of the host of the first wireless station data through the preset channel within a predetermined period after the wireless access point has received a user operation, transmit the SSID data including the SSID stored in the wireless access point to the wireless station, being the host of the first wireless station data and the second wireless station data, through the preset channel; and involve the wireless station, being a host of the association request, to the wireless LAN network built by the wireless access point when the association request is received from the wireless station using the SSID stored in the wireless access point.

\* \* \* \* \*